United States Patent
Iwamura et al.

(10) Patent No.: US 6,396,814 B1
(45) Date of Patent: May 28, 2002

(54) NETWORK CONSTRUCTION METHOD AND COMMUNICATION SYSTEM FOR COMMUNICATING BETWEEN DIFFERENT GROUPS VIA REPRESENTATIVE DEVICE OF EACH GROUP

(75) Inventors: Kazuaki Iwamura, Kobe; Takeo Horiguchi, Ibaraki; Shogo Yamaguchi, Kobe; Takuya Kawamura; Shinzo Matsubara, both of Ashiya; Fumihiko Ikegami, Kobe, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/152,058

(22) Filed: Sep. 11, 1998

(30) Foreign Application Priority Data

| Sep. 12, 1997 | (JP) | 9-248713 |
| Sep. 12, 1997 | (JP) | 9-249097 |
| Sep. 17, 1997 | (JP) | 9-252157 |
| Sep. 18, 1997 | (JP) | 9-253868 |

(51) Int. Cl.$^7$ ................................. H04L 12/56

(52) U.S. Cl. ................ 370/256; 370/230; 370/235; 370/238

(58) Field of Search ............................. 370/230, 235, 370/252, 254, 255, 321, 322, 326, 337, 347, 400, 401, 402, 432, 442, 464, 498, 256, 257, 238, 238.1; 714/1, 748

(56) References Cited

U.S. PATENT DOCUMENTS

| 4,918,690 A | * | 4/1990 | Markkula, Jr. et al. ..... 370/445 |
| 5,355,371 A | * | 10/1994 | Auerbach et al. ........... 370/401 |
| 5,541,927 A | * | 7/1996 | Kristol et al. ............... 370/256 |

OTHER PUBLICATIONS

Gerla et al., Multicluster, mobile, multimedia radio network, Baltzer Journals, pp. 1–26, Jul. 12, 1995.*
Corson, et al., A Distributed Routing Algorithm For Mobile Radio Networks, IEEE, pp. 210–213, 1989.*
Krisna, et al., Cluster–based Approach for Routing in Ad–Hoc Networks, USENIX Symposium, pp. 1–13, Apr. 10–11, 1995.*
Biswas, Handling Realtime Traffic in Mobile Networks, Dissertation, University of Cambridge, pp. 1–198, Aug. 1994.*
Sally Floyd, et al., Proc. of ACM SIGCOMM, pp. 342–356, "A Reliable Multicast Framework for Light–Weight Sessions and Application Level Framing", 1995.
James R. Yee, et al., Proc. of ICC, pp. 50.1.1 to 50.1.5, "An Algorithm to Find Global Optimal Routing Assignments for Class of PRNS", 1991.

* cited by examiner

Primary Examiner—Wellington Chin
Assistant Examiner—Frank Duong
(74) Attorney, Agent, or Firm—Oblon, Spivak, McClelland, Maier & Neustadt, P.C.

(57) ABSTRACT

A communication network construction method comprises the steps of grouping the communication devices belonging to a communication network into one or a plurality of communication groups. In a selection step, one or a plurality of representative devices are selected in each communication group formed in the grouping step. In a communication step, each communication device communicates directly with the communication devices belonging to the same group, and communicates with the communication devices belonging to a different group by first transmitting data to the representative device of the same communication group and then causing the representative device to transfer a part or the whole of the data to the representative device of the different communication group.

30 Claims, 43 Drawing Sheets

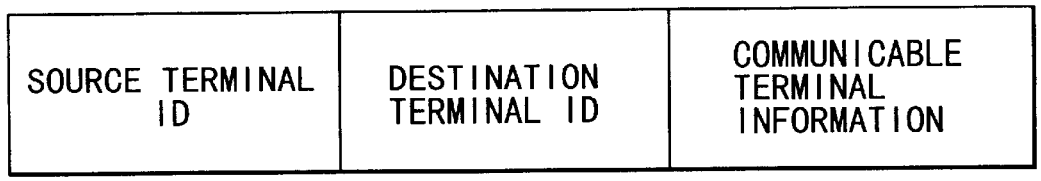
FIG. 9
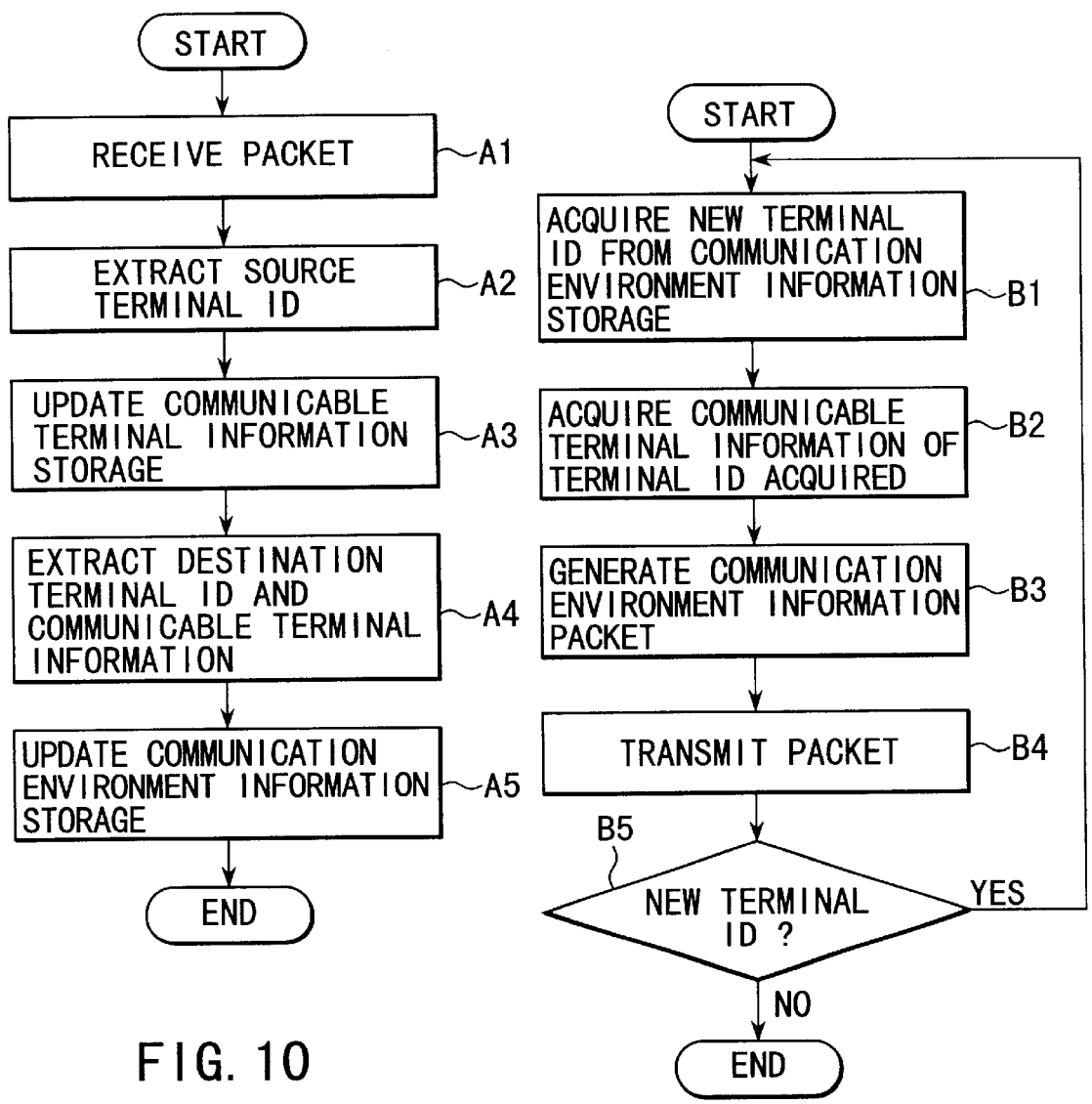
FIG. 10
FIG. 11

| TERMINAL ID | COMMUNICABLE TERMINAL | UPDATE TIME |
|---|---|---|
| A1 | A2, A3, X | 15:18 |
| A2 | A1, A3, X | 15:20 |
| A3 | A1, A2, X | 15:22 |
| B1 | B2, B3, X | 15:15 |
| B2 | B1, B3, X | 15:20 |
| B3 | B1, B2, X | 15:23 |

FIG. 15

| TERMINAL ID | COMMUNICABLE TERMINAL | UPDATE TIME |
|---|---|---|
| X | A1~A3, B1~B3 | 15:18 |
| A2 | A1, A3, X | 15:20 |
| A3 | A1, A2, X | 15:22 |
| B1 | B2, B3, X | 15:15 |
| B2 | B1, B3, X | 15:20 |
| B3 | B1, B2, X | 15:23 |

FIG. 16

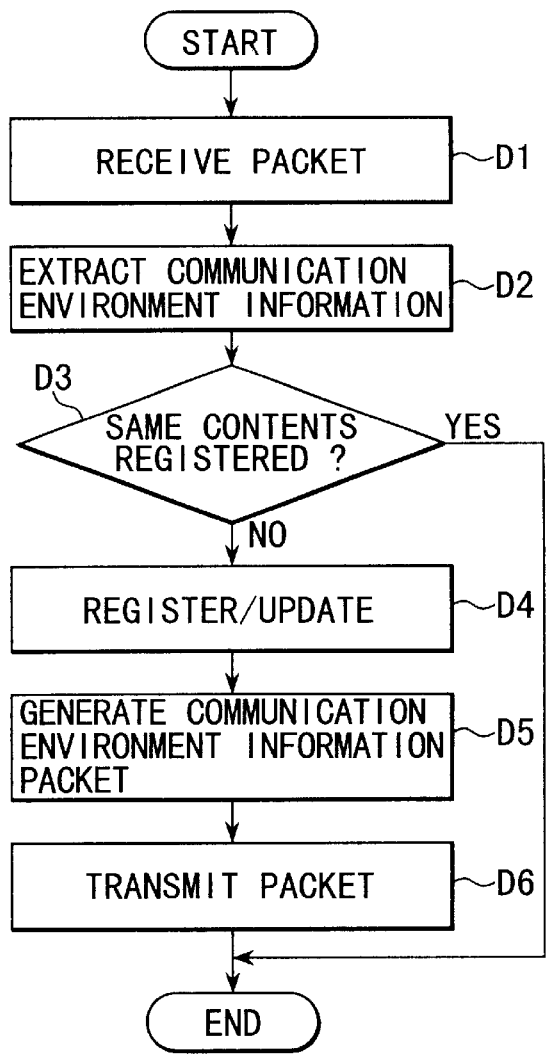
FIG. 24
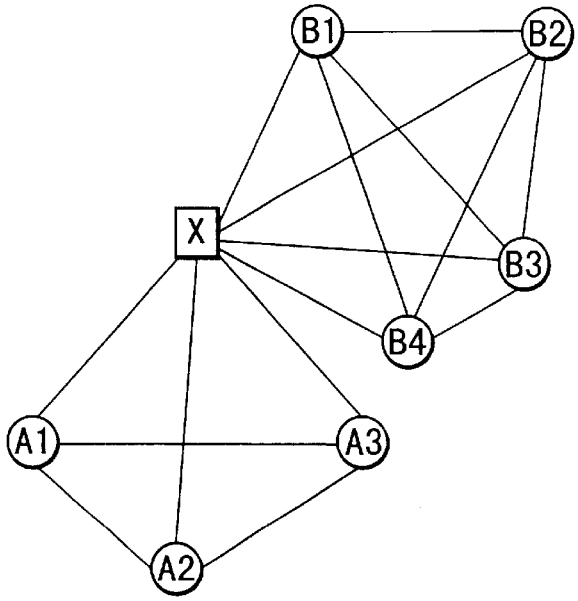
FIG. 25
FIG. 26
| B4 | B4 | NON |
FIG. 27
| X | B4 | NON |
FIG. 28
| B4 | B4 | X, B1, B2, B3 |
FIG. 29
| X | B4 | X, B1, B2, B3 |

| A1 | 1 | A1 | A2, A3, A4 |

| TERMINAL ID | COMMUNICABLE TERMINAL | UPDATE TIME |
|---|---|---|
| A2 | A1, A3, A4 | 15:18 |
| A3 | A1, A2, A4 | 15:20 |
| A4 | A1, A2, A3 | 15:22 |

| B1 | 4 | B1 | B2, B3, B4 | B2 | B1, B3, B4 | B3 | B1, B2, B4 | B4 | B1, B2, B3 |

| TERMINAL ID | COMMUNICABLE TERMINAL | UPDATE TIME |
|---|---|---|
| A2 | A1, A3, A4 | 15:18 |
| A3 | A2, A3, A4 | 15:20 |
| A4 | A1, A2, A3 | 15:22 |
| B1 | B2, B3, B4 | 15:15 |
| B2 | B1, B3, B4 | 15:20 |
| B3 | B1, B2, B4 | 15:23 |
| B4 | B1, B2, B3 | 15:25 |

FIG. 35

| TERMINAL ID | COMMUNICABLE TERMINAL | UPDATE TIME |
|---|---|---|
| A2 | A1, A3, A4 , B1~B4 | 15:18 |
| A3 | A2, A3, A4 , B1~B4 | 15:20 |
| A4 | A1, A2, A3 , B1~B4 | 15:22 |
| B1 | A1~A4, B2, B3, B4 | 15:15 |
| B2 | A1~A4, B1, B3, B4 | 15:20 |
| B3 | A1~A4, B1, B2, B4 | 15:23 |
| B4 | A1~A4, B1, B2, B3 | 15:25 |

FIG. 36

| BROADCAST GROUP | PARENT DEVICE ID | 1 | |
|---|---|---|---|
| | DEVICE ID | CHILD DEVICE ID (ID OF DEVICES MANAGED BY EACH DEVICE) | RECEIVING SEQUENCE NO. |
| | DEVICE 1 | 2, 3, 9 | 100 |
| | DEVICE 2 | 10, 11, 12 | 500 |
| | DEVICE 3 | 4, 5, 6 | — |
| | DEVICE 4 | — | 700 |
| | DEVICE 5 | — | 1000 |
| | DEVICE 6 | — | 300 |
| | DEVICE 7 | — | 200 |
| | DEVICE 8 | — | 200 |
| | DEVICE 9 | 7, 8 | 1000 |
| | DEVICE 10 | — | 600 |
| | DEVICE 11 | — | 500 |
| | DEVICE 12 | — | 800 |

DEVICE 4

| DEVICE ID | ACKNOWLEDGE RECEIVING-DELIVERY NO. |
|---|---|
| DEVICE 1 | 100 |
| DEVICE 2 | 500 |
| DEVICE 3 | 300 |
| DEVICE 4 | – |
| DEVICE 5 | 1000 |
| DEVICE 6 | 300 |
| DEVICE 7 | 200 |
| DEVICE 8 | 200 |
| DEVICE 9 | 1000 |
| DEVICE 10 | 600 |
| DEVICE 11 | 500 |
| DEVICE 12 | 800 |

DEVICE 5

| DEVICE ID | ACKNOWLEDGE RECEIVING-DELIVERY NO. |
|---|---|
| DEVICE 1 | 100 |
| DEVICE 2 | 500 |
| DEVICE 3 | 300 |
| DEVICE 4 | 700 |
| DEVICE 5 | – |
| DEVICE 6 | 300 |
| DEVICE 7 | 200 |
| DEVICE 8 | 200 |
| DEVICE 9 | 1000 |
| DEVICE 10 | 600 |
| DEVICE 11 | 500 |
| DEVICE 12 | 800 |

DEVICE 6

| DEVICE ID | ACKNOWLEDGE RECEIVING-DELIVERY NO. |
|---|---|
| DEVICE 1 | 100 |
| DEVICE 2 | 500 |
| DEVICE 3 | 300 |
| DEVICE 4 | 400 |
| DEVICE 5 | 1000 |
| DEVICE 6 | – |
| DEVICE 7 | 200 |
| DEVICE 8 | 200 |
| DEVICE 9 | 1000 |
| DEVICE 10 | 600 |
| DEVICE 11 | 500 |
| DEVICE 12 | 800 |

| DESTINATION ADDRESS | SOURCE ADDRESS |
|---|---|
| PACKET TYPE | NOT USED |
| DEVICE 1 | MINIMUM ACKNOWLEDGE DELIVERY NO. RECEIVED FROM MANAGED DEVICE |
| DEVICE 2 | MINIMUM ACKNOWLEDGE DELIVERY NO. RECEIVED FROM MANAGED DEVICE |
| .... | .... |
| DEVICE 12 | MINIMUM ACKNOWLEDGE DELIVERY NO. RECEIVED FROM MANAGED DEVICE |

NETWORK CONSTRUCTION METHOD AND COMMUNICATION SYSTEM FOR COMMUNICATING BETWEEN DIFFERENT GROUPS VIA REPRESENTATIVE DEVICE OF EACH GROUP

BACKGROUND OF THE INVENTION

The present invention relates to a method of constructing a communication network and a communication system constructed by such a method.

First, a first conventional method art will be described. A technique for constructing a network ad hoc using a plurality of devices is disclosed in Jpn. Pat. Appln. No. 07-87937. In the network constructed based on Jpn. Pat. Appln. No. 07-87937, each device broadcasts a device message and exchanges the device message with each other. The device message contains the information on the device that has transmitted the message and the information on the devices recognizing that the communication is possible. By exchanging the device messages, therefore, the information can be collected on the status of the communication link between the surrounding devices. Thus a network can be constructed without a special setting. For actual data exchange and communication, a group is configured of a plurality of communicating devices, to which data are multicast to carry out efficient data transmission between a plurality of devices.

With the increase in the number of surrounding devices, however, an increased data amount is required for the device message exchanged through the network, thereby posing the problem of imposing a heavier burden on the band of the network.

Also, for a group to be formed as required for data exchange, a procedure is necessary to assure that the status of the devices constituting each group is coincident with each other and that required parameters such as a multicast address is set.

FIG. 7 shows an example of the procedure. First, a device attempting to form a group transmits a message 910 requesting other devices to form a group. The devices that have received the request message 910 send back a response message 911 to the first device. The first device, upon receipt of the response message 911 from all the other devices, transmits again an acknowledge message 912 to all the other devices. The procedure shown in FIG. 7 is for forming a new group. A message is also exchanged in similar fashion between a requesting device and the other devices when a device joins a group or a group is disbanded.

In the example shown in FIG. 7, the device that has transmitted the requesting message 910 is required to process the response message 911 transmitted thereto from all the other devices. This poses the problem that a single device assumes a heavy load. This imbalance increases with the number of devices constituting a group.

Also, in many computer systems, when a network interface card receives a message from a network, an interrupt signal is generated to a CPU. In the CPU, upon detection of the interrupt signal, the operating system executes a dispatch routine for the interrupt, and reads a message from the network interface card to execute the required process. Generally, the network interface card or the operating system has a buffer for holding data before the message is read out and processed. A succession of messages which may arrive at the buffer of insufficient capacity may overflow and may be disposed of.

Especially with the increase in the transmission speed of the network, more and more messages come to be disposed of. Consider the procedure shown in FIG. 7. The response messages 911 returned to the first device arrive in a great number in a short time. With the increase in the number of devices, therefore, the increased number of messages are disposed of. In the case where the first device is unable to receive all the response messages 911 within a predetermined time T from the transmission of the requesting message 910, the first device retransmits the requesting message 910. By repeating the retransmission of the requesting message 910, substantially all the response messages 911 can be received.

If the predetermined time T is set excessively short, the requesting message 910 is undesirably retransmitted before it becomes necessary, resulting in a wasteful use of the band. The time required before completion of the procedure includes the retransmission intervals and the number of times the message is retransmitted. An increased number of response messages 911 that are disposed of and hence an increased number of retransmissions, therefore, leads to the problem of a lengthened time required for the procedure. Even in the case where the time before completion of the procedure is not a problem, the increased number of retransmissions increases the amount of information required to be transmitted for the procedure, thereby posing the problem of wasting the band of the network.

As described above, in the case where an ad hoc network is constructed based on Jpn. Pat. Appln. No. 07-87937 according to the prior art first above mentioned, the problem is that with the increase in the number of the devices constituting the network or the devices making up each group in the network, the number of the messages required for managing the device configuration or executing the procedure increases. At the same time, the band available for use by applications decreases or the time required before completion of the procedure lengthens beyond the practical application.

The second conventional approach will be described. In the case of communication between terminals using the conventional network including the rapidly-extending internet, it is necessary to determine an identifier such as an address in advance for specifying the destination device with which to communicate. An IP address and a host name for the internet are examples. In other words, communication has so far been impossible for the user without determining the IP address or the host name of the destination device.

On the other hand, the reference function of the Microsoft network proposed by Windows95 of Microsoft, U.S.A., for example, makes it possible for the user to determine the terminal connected with the Microsoft network simply by clicking an icon without any preparation, and thus to start the communication with the remote device simply by selecting the desired party. In the reference function of the Microsoft network, one processor included in the network acts as a reference server, and the terminals connected to the network notify the reference server of the presence thereof at the time of starting, while the presence of the other terminals can be determined by making inquiry of the server.

The reference function of the Microsoft network assumes that a terminal capable of communicating with a reference server can directly communicate with other terminals. Nevertheless, in the case where a network is constructed using a radio LAN, for example, the communicability with the reference server does not necessarily mean the communicability between terminals. What is called a hidden terminal may exist. In such a case, the reference function of the Microsoft network incapable of determining a hidden terminal poses the problem that the communication, though started without the knowledge of a hidden terminal, is impossible with Also, a portable terminal having a radio communication function may be moved without shutting down the operating system (OS). In such a case, the Microsoft network may take as long as several tens of minutes for detecting the impossibility of communication due to the movement. Thus the reference function of the Microsoft network cannot meet the ever-changing network environment with rapidity.

On the other hand, Jpn. Pat. Appln. No. 7-232459 discloses a method by which each terminal can determine whether or not communication is possible between terminals. According to this method, the identifiers of the terminals with which a local terminal can communicate are transmitted by each local terminal together with the identifier of the local terminal. As a result, each local terminal is in a position to determine whether the other terminals are communicable or not as well as the local terminal. In this method, however, all the terminals exchange information on communicable terminals. With the increase in the number of terminals included in a network, therefore, the increased traffic of the network is the problem. Another problem is that only the information on communicability between a local terminal and a terminal one hop away (the remote device with no other terminals in-between) can be received but no information on communicability with a terminal several hops away can be acquired.

As described above, the second conventional approach such as the reference function of the Microsoft network poses the problem that the presence of a hidden terminal cannot be determined and the communication is started without a knowledge of the presence of the hidden terminal and that the change in the network environment cannot be followed with rapidity. Also, the method disclosed in Jpn. Pat. Appln. No. 7-232459 by which each terminal can determine whether or not terminals can communicate with each other encounters the problem that an increased number of terminals in the network increases the traffic for notifying the communicability information between terminals or the information on the communicability with a terminal several hops away cannot be acquired.

A third conventional approach will be described. A network such as a local network is rapidly extending. For the devices constituting a network to recognize each other, it is usually necessary for each device to transmit a signal with ID information added thereto for identifying a local terminal or to receive a signal with ID information transmitted from other devices. Consider a communication device capable of transmission and receiving of information using a single communication path, for example. Each device transmits ID information whenever possible without collision by use of an access scheme such as CSMA/CD (Carrier Sense Multiple Access with Collision Detection). Also, in the case of a local area network using radio called a radio LAN, an access scheme such as CSMA/CA (Carrier Sense Multiple Access with Collision Avoidance), ID information is transmitted whenever possible without collision.

In a communication system capable of using a plurality of communication paths, on the other hand, one of them is set beforehand as a common control communication path through which a signal with ID information can be transmitted and received by all the devices in the system and through which each device transmits and receives a signal with ID information added thereto whenever possible using such an access scheme as CSMA/CD.

As compared with a device group having a single communication path by which information can be transmitted and received, a device group in which one of a plurality of communication paths available is set as a common control communication path can transmit data more efficiently since the ID information and other data can be transmitted and received using different communication paths.

With the device group capable of transmitting and receiving information through a single communication path, the necessity of transmission of all the data including the ID information using a single communication path increases the traffic volume with the increase in the number of devices.

The problem of the device group capable of using a plurality of communication paths, in contrast, that though the control communication path for transmitting ID information can be separated from the data communication path for transmitting other data, the traffic volume of ID information increases along the control communication path and the traffic volume of other data than ID information for the data communication path.

In either case, an excessive number of devices using the communication path increases the traffic volume thereof.

Also, consider a communication system in which all the devices exchange ID information with each other in constructing a network. For N devices to recognize the presence thereof with each other, single-path transmission of a signal is necessary which contains N pieces of ID information for a communication system which transmits ID information by broadcasting, and N(N−1) pieces of ID information for a communication system which transmits ID information by unicasting. In the case where an acknowledge (ACK) signal is returned upon receipt of ID information, a correspondingly increasing number of transmission signals is required for exchanging ID information.

As described above, in a communication system in which ID information is exchanged, receipt and management of ID information from other devices is possible if the number of devices constructing a network is as few as several to several and tens. With the increase in the number of devices constituting the network to several tens, several hundreds or several thousands, however, it becomes difficult for each device to receive and manage the ID information and the system is liable to break down.

According to the third conventional approach, the excessively increased number of devices using a communication path for exchanging ID information among all the devices deteriorates the data transmission efficiency due to the resulting increase in traffic volume while at the same time often breaking down the system constructing the network.

Now, a fourth conventional approach will be explained.

Data and information exchanged between communication devices, unlike the aural or visual information sent in real time, are required to be transmitted correctly without such errors as dropouts or the reversed order. The data herein is defined as information a collection of which constitutes an operation or a meaning such as an electronic file (text file, voice file, image file, program, etc.) of the computer.

A device that has received data transmits an acknowledge delivery packet (hereinafter referred to as "the ACK packet") in order to notify the source device of the correct arrival of the data. The source device thus can know that the transmitted data has been delivered correctly upon receipt of the ACK packet from the receiving device. In the case where the ACK fails to arrive at the source device within a predetermined time, the source device judges that the data has not been delivered correctly and retransmits the data and waits for an ACK packet.

In another method, the receiving device noticing an error or a dropout of the received data transmits a retransmission request packet (hereinafter referred to as "the NAK packet") to the source device in order to be notified that the data has arrived erroneously. The source device that has received the NAK packet retransmits the data.

In the case where data are broadcast among a plurality of devices, the data reliability is secured basically by the method described above.

With the increase in the number of devices, however, the ACK packets and NAK packets are concentrated on the data transmitting device, on which a heavier load is imposed.

In view of this, a conventional approach is available in which a logical tree is constructed with a data transmitting device as a root among the devices belonging to the same broadcasting group (multicasting group). In such a system, the ACK packet or the NAK packet is transmitted toward a node (device) located nearer to the root of the tree, and the node that has received the ACK packet or the NAK packet from the node located on a branch thereof retransmits the data.

This conventional logical tree structure is so static that nodes located as leaves of the tree may be added or removed but nodes constituting the trunk thereof are never changed once the tree is constructed.

As a result, no means has thus far been available to restructure a tree, if imbalanced. Under the circumstances, the number of devices located nearer to the branch of a given device and the number of devices located nearer to the branch of another device are liable to be considerably different. The load unequally imposed on a given device cannot be redistributed to other devices thereby reducing the throughput of the system as a whole.

As described above, the fourth conventional approach has the problem that when the devices managed by a present unit exceeds a certain number or otherwise the balance of the tree is destroyed, the balance of the tree cannot be restored.

BRIEF SUMMARY OF THE INVENTION

A first object of the present invention is to provide a method of constructing a communication network and a communication system constructed by the method, in which the number of messages or the time required for executing a procedure is not increased with the increase in the number of component devices.

A second object of the invention is to provide at least a communication device group in which each of a multiplicity of devices included in a network can acquire the communicability information of other devices without increasing the traffic volume and also can acquire the communicability information of a device a plurality of hops away.

A third object of the invention is to provide at least a communication device group in which the device selects one of a plurality of communication paths available for communication and cannot directly communicate with a device, which has selected a different communication path, thereby reducing the number of the devices communicating using a single communication path at the same time.

A fourth object of the invention is to provide a communication device group in which even when the devices managed by a present unit exceed a predetermined number or otherwise the condition is met to destroy the tree balance, the tree balance can be restored.

In order to achieve the first object described above, according to this invention, there is provided a method of constructing a communication network, comprising the steps of:

grouping communication devices belonging to a communication network into one or more communication groups;

selecting one or a plurality of representative devices from each communication group thus grouped; and after selecting step, causing each communication device to communicate directly with the communication devices belonging to the same group and to communicate with a communication device belonging to a different communication group by first transmitting data to the representative device of the same communication group which in turn transfers a part or the whole of the data to the representative device of the different communication group.

In order to achieve the second object described above, according to this invention, there is provided a method of constructing a communication network, in which the terminal selected as a representative device executes the steps of:

receiving the terminal ID information transmitted by a different terminal transmitting the particular ID information;

receiving the communicable terminal information transmitted by a different terminal indicating a terminal communicable with the different terminal;

relating the terminal ID information and the communicable terminal information received from the same terminal to each other and storing them as communication environment information; and transmitting the stored communication environment information to the different terminal.

In order to achieve the third object described above, according to this invention, there is provided a method of constructing a communication network, in which the communication device executes the steps of:

selecting one of a plurality of communication paths;

transmitting the information of the communication path selected by the communication device;

receiving the information on the communication path selected by a different communication device;

storing the information on the communication path assigned by a different communication device; and comparing the information on the stored communication path selected by the different communication device with the information on the communication path selected by the present unit, and in the case where there exists no communication device that has selected the same communication path as the present unit, reselecting a communication path other than the communication path selected by the present unit from among a plurality of the communication paths.

In order to achieve the fourth object of the invention described above, there is provided a method of constructing a communication network, in which the communication device executes the steps of:

storing at least the management information including an identifier (ID) of a child device managed by a present unit and the acknowledge delivery information received from the child device;

storing the ID of a parent device which manages the present unit;

transmitting and receiving information between all the child devices stored in the step of storing the management information or with the parent device stored in the step of storing the parent device ID;

comparing the acknowledge delivery (ACK) information indicating the receipt of the information and the management information from the child device transmitting the information in the step of transmission/receiving and acknowledging delivery the transmitted information; and transmitting the ACK information to the parent device in the case where the transmitted information can be acknowledged in the step of acknowledgment.

In order to achieve the first object described above, according to the invention, there is provided a communication system comprising:

a grouping processing section for grouping communication devices belonging to a communication network into one or a plurality of communication groups;

a selection processing section for selecting one or a plurality of representative devices in each communication group formed in the grouping processing section;

a communication processing section, after selecting the representative device in the selection processing section, causing each communication device to communicate directly with the communication devices belonging to the same group and causing each communication device to communicate with the communication devices belonging to a different group by first transmitting data to the representative device of the same group and then causing the representative device to transfer a part or the whole of the data to the representative device of the different group.

In order to achieve the second object, according to this invention, there is provided the above-mentioned communication system wherein the terminal selected as a representative device includes:

a terminal ID information receiving section for receiving the terminal ID information from a different terminal for identifying the different terminal;

a communicable terminal information receiving section for receiving the communicable terminal information from a different terminal indicating the communicability of the different terminal;

a communication environment information storage section for relating the terminal ID information and the communicable terminal information received from the same terminal to each other and storing the information as communication environment information; and a communication environment information transmission section for transmitting the stored communication environment information to the different terminal.

In order to achieve the third object described above, according to this invention, there is provided the above-mentioned communication system, wherein the communication device includes:

communication path selection means for selecting a communication path used for communication from among a plurality of communication paths;

communication path selection transmission means for transmitting information to the communication path selected by the communication path selection means;

communication path selection receiving means for receiving the information from the communication path selected by the communication path selection means and detecting the occupancy rate of other communication paths than the selected communication path; and communication path storage means for storing the information on the occupancy rate of the communication path detected by the communication path selection receiving means.

In order to achieve the fourth object described above, according to this invention, there is provided the above-mentioned communication system, wherein the communication device comprises:

a management information storage function for storing management information including at least an identifier (ID) of at least a child device managed by the present communication device and the acknowledge delivery information received from the child device;

an ID storage function for storing the ID of a parent device managing the present communication device;

an information communication section for transmitting and receiving information to and from selected one of all the child devices with the IDs thereof stored by the management information storage function and the parent device with the ID thereof stored by the ID storage function;

an acknowledge delivery section for comparing the acknowledge delivery information indicating the receipt of information from a child device transmitting the information by the information communication section with the management information and acknowledging the transmitted information; and an acknowledge delivery information transmission section for transmitting the acknowledge delivery information to the parent device when the acknowledge delivery section acknowledges the transmitted information.

In order to achieve the first object described above, according to this invention, there is provided a recording medium for storing a program executed in constructing a communication network, the program being executed for performing the steps of:

grouping communication devices belonging to a communication network into one or a plurality of communication groups;

selecting one or a plurality of representative devices in each communication group thus grouped; and after the selection step, causing each communication device to communicate directly with the communication devices belonging to the same group and causing each communication device to communicate with a communication device belonging to a different group by first transmitting data to the representative device of the same group and then causing the representative device to transfer a part or the whole of the data to the representative device of the different group.

In order to achieve the second object described above, according to this invention, there is provided the above-mentioned recording medium, wherein the communication device executes the steps of:

receiving the terminal ID information transmitted from a different terminal for identifying the different terminal;

receiving the communicable terminal information transmitted from a different terminal indicating that the particular different terminal is communicable;

relating the terminal ID information and the communicable terminal information received from the same terminal to each other and storing the relation; and causing the computer to operate for transmitting the stored communication environment information to the different terminal.

In order to achieve the third object described above, according to this invention, there is provided the above-mentioned recording medium, wherein the communication device executes the steps of:

selecting one communication path from among a plurality of communication paths;

transmitting the information of the communication path selected by the communication device;

receiving the information of the communication path selected by a different communication device;

storing the information of the communication path assigned by the different communication device; and comparing the information of the communication path selected by the different communication device stored in the communication path storage step with the information of the communication path selected by the present communication device, and upon judgment of the absence of a different communication device that has selected the same communication path as the present communication device, reselecting a communication path other than the communication path selected by the present communication device from among a plurality of the communication paths.

In order to achieve the fourth object described above, according to this invention, there is provided the above-mentioned recording medium, wherein the communication device executes the steps of:

storing the management information including at least an identifier (ID) of at least a child device managed by the present communication device and the acknowledge delivery information received from the child device;

storing the ID of a parent device managing the present communication device;

transmitting and receiving information to and from selected one of all the child devices stored in the management information storage step or the patent device stored in the parent device ID storage step;

comparing the management information with the acknowledge delivery information indicating the receipt of information from the child device that has transmitted the information in the transmission/receiving step; and transmitting the acknowledge delivery information to the parent device when the information transmitted is acknowledged in the acknowledge step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a diagram showing a format of a communicable terminal information packet according to the fourth embodiment;

FIG. 10 is a flowchart showing the process for receiving a packet of the communicable terminal information and the communication environment information transmitted by a different terminal according to the fourth embodiment;

FIG. 11 is a flowchart showing the process for activation started by a timer (1) according to the fourth embodiment;

FIG. 15 is a diagram showing a specific example of the communication environment information stored in a terminal X according to the fourth embodiment;

FIG. 16 is a diagram showing a specific example of the communication environment information stored in a terminal A1 according to the fourth embodiment;

FIG. 24 is a flowchart showing the process for receiving a packet of the communicable terminal information and the communication environment information transmitted by a different terminal according to the eighth embodiment;

FIG. 25 is a diagram showing an example configuration of the network according to the eighth embodiment;

FIG. 26 is a diagram showing a specific example of the communicable terminal information packet broadcast immediately after the activation of the terminal B4 according to the eighth embodiment;

FIG. 27 is a diagram showing a specific example of the communicable terminal information packet for the terminal B4 broadcast upon receipt of the communicable terminal information of FIG. 26 by the terminal X according to the eighth embodiment;

FIG. 28 is a diagram showing a specific example of the communicable terminal information packet transmitted after receipt of the packet of the communicable terminal information of X, B1 to B3 by the terminal B4 according to the eighth embodiment;

FIG. 29 is a diagram showing a specific example of the communicable terminal information packet for the terminal B4 broadcast upon receipt of the communicable terminal information of FIG. 28 by the terminal X according to the eighth embodiment;

FIG. 35 is a diagram showing a specific example of the communication environment information stored in the terminal A1 after receiving the communication environment packet of FIG. 34 according to the ninth embodiment;

FIG. 36 is a diagram showing a specific example of the communication environment information stored in the terminal A1 after transmitting and receiving sufficient communication environment information according to the ninth embodiment;

FIG. 62 is a diagram showing an example of a management table 2 shown in FIG. 59;

FIG. 63 is a diagram showing an example of a management table 2 shown in FIG. 59;

DETAILED DESCRIPTION OF THE INVENTION

Embodiments of the invention will be explained in detail below with reference to the accompanying drawings.

[First Embodiment]

Reference is made to a first embodiment of the invention. In the first embodiment, the devices are assumed to have a radio LAN interface. The radio LAN interface is, for example, the one specified under IEEE 802.11.

Figure 2:
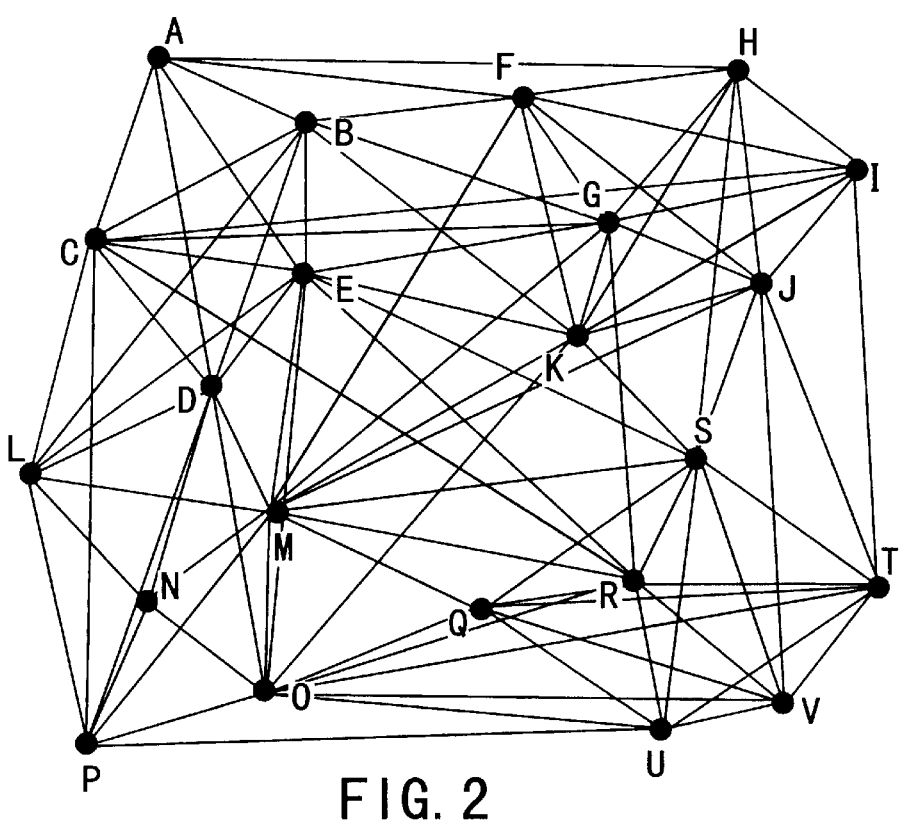
FIG. 2 is a graph plotted assuming that an edge exists between devices constituting nodes directly communicable with each other.

FIG. 2 is a graph produced assuming that an edge exists between directly communicable devices constituting nodes. In FIG. 2, characters A to V designate devices. The device A, for example, can communicate with the six devices C, D, E, B, F, H. This graph is considered to represent the status of the network at a given time point. The operation will be explained below with reference to this graph presentation. Another form of expression equivalent to this graph can of course be used with equal effect.

First, in order to produce the graph of FIG. 2, each device broadcasts a device message. The device message includes the information on the device broadcasting it and the information on the communicable devices determined taking the device messages from other devices into consideration. Each device judges whether it can or cannot communicate with other devices by receiving a device message from them. Further, the information on the communicable devices thus identified is broadcast with a device message, upon receipt of which each device can collect the data required for constructing the graph of FIG. 2.

Upon successful collection of the data required for constructing the graph, each device segments the is graph according to a predetermined standard. According to this embodiment, the graph is so segmented that the number of the devices belonging to each of the segmented groups is substantially equal to a predetermined number N. By setting the value N in accordance with the processing capacity of the device, the number of messages that the devices are required to receive can be reduced with minimum increase of the overhead.

Further, a group is set in such a manner that the devices belonging to the same group constitute a complete partial graph. If a complete graph cannot be formed with N devices including a given device, a group is formed by a mass of the devices capable of producing a complete graph.

Figure 1:
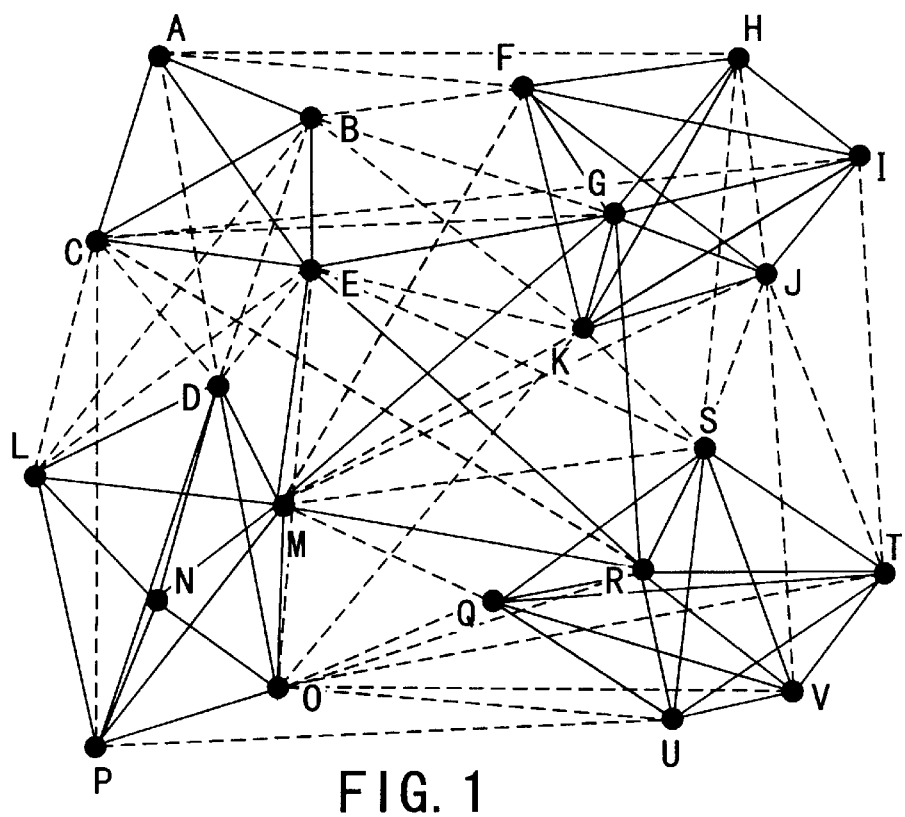
FIG. 1 is a diagram for explaining the basic concept of the present invention and showing an arrangement of devices with a graph segmented with N=6.

FIG. 1 shows an example of graph segmentation for N=6. In FIG. 1, however, the devices which are communicable in FIG. 2 and have come to belong to a different group are connected by dotted line. Specifically, in FIG. 1, the four devices A, B, C, E, the six devices D, L, M, N, O, P, the six devices F, G, H, I, J, K and the six devices S, R, Q, U, V, T each constitute a group, respectively. The devices associated with the same group can communicate directly with each other. In this case, only 22 devices are provided in all and therefore one group contains four devices.

Then, one device is selected as a representative device in each group. In FIG. 1, a link between the representative devices is also plotted. The devices E, G, M, R are representative devices. A broadcast address is determined for each group, and the devices in each group communicate with each other using the broadcast address thus determined. In addition to the broadcast address used for communication between the devices in the same group, a broadcast address is set for communication between representative devices.

Upon complete grouping and selection of the representative devices, each device transmits a device message to the other devices in the same group. Each representative device transmits a device message to the other representative devices as well as to the devices of the same group. The device message transmitted from a representative device to other representative devices however is the information solely on the representative devices. Similarly, the device message exchanged in each group is the one relating to the devices belonging to the particular group.

However, upon detection of a change in the same group or such an event that a given device belonging to the same group becomes incommunicable, for example, the representative device also transmits this information to other representative devices. In this way, the communication mode between representative devices and the communication mode within each group are separately managed. As far as a representative device is communicable, the information on the devices belonging to the same group as the particular representative device is always transmitted, thereby making it possible to reduce the number of device messages to be handled.

The representative devices not only reduce the device messages providing the configuration management information but also, in the handshake between the devices of different groups, have the function to consolidate the response messages and to prevent the increase in the number of messages that a device is required to receive at a time. As an example, explanation will be made about the case in which the device A forms a group with the devices B, C, L, O, P, S, T, U, V.

Figure 3A:
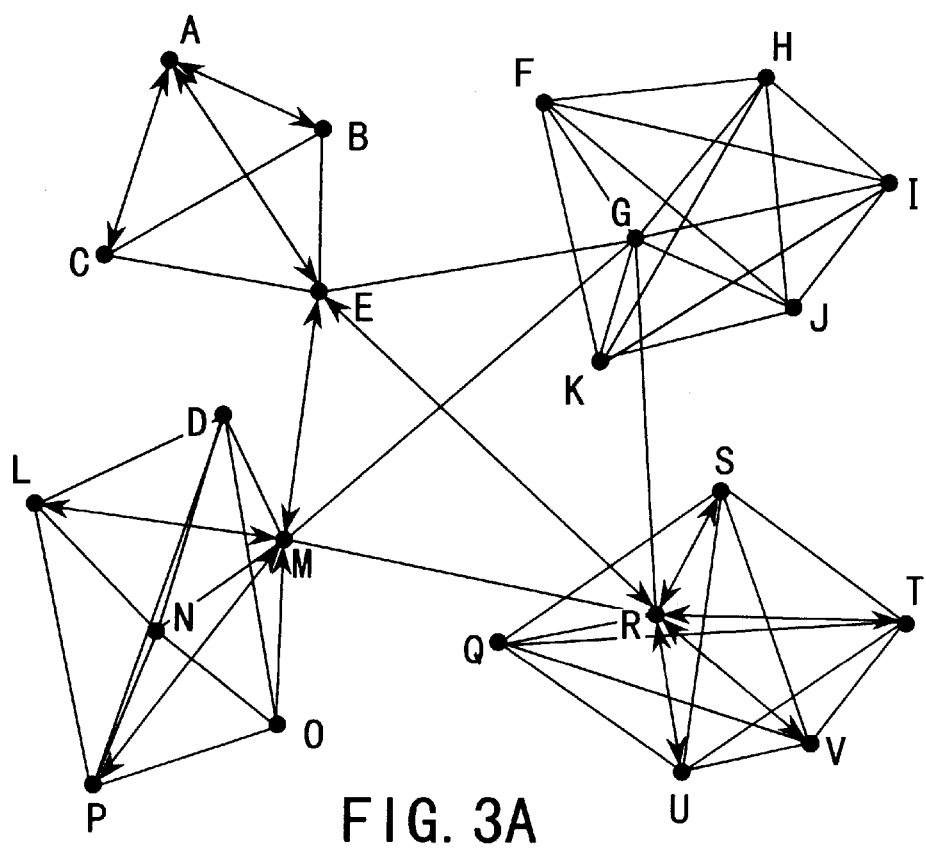
FIG. 3A is a diagram showing the flow of a message when a device A forms a group with devices B, C, L, O, P, S, T, U, V.

FIG. 3A is a diagram showing a flow of messages in this case. First, the device A transmits a request message to other devices using a broadcast address of the group. The devices B, C, upon receipt of the request message, returns a response message to the device A. The device E representing the group to which the device A belongs to, upon receipt of a request message from the device A, transmits and stores a request message to the devices M, R representing the group of other devices using the broadcast address determined between representative devices. At the same time, the device E stores the same request.

The representative devices M, R that have received the request message from the device E broadcast using the broadcast addresses for the respective groups. In this way, the request message can be delivered to all the devices after all. Further, the devices that have received the request message return a response message to the device A along the reverse route of transmission of the received message. Specifically, the device O sends a response message to the representative device M. The representative device M consolidates the contents of the response message received from the device O and the response messages sent from the devices L, P and producing a single message, sends it to the representative device E.

The representative device E further consolidates the response message from the representative device M and the contents of the response messages from the representative device R which consolidates the contents of the response messages from the devices S, T, U, V, and transmits the resulting message to the device A. The device A, upon receipt of the response message from the representative device E and the response messages from the devices B, C, judges that the response messages are received from all the devices. Although the device A forms a group with nine devices, it receives only three messages. The processing load of the device A, therefore, is not extremely increased as compared with the load of other devices. As a result, the situation is avoided in which data are repeatedly retransmitted and an impractically long time is consumed before response messages are completely received from all the devices.

Figure 3B:
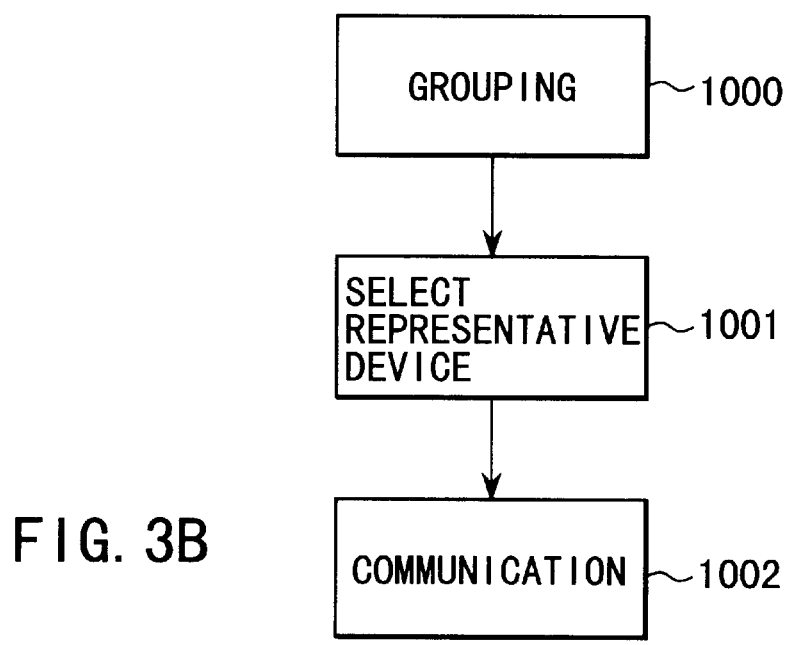
FIG. 3B is a diagram briefly showing a method of constructing a communication network according to an embodiment.

FIG. 3B is a schematic diagram briefly showing a method of constructing a communication network according to this embodiment. First, a grouping step 1000 groups the communication devices belonging to a communication network into one or a plurality of communication groups. Then, a representative device selection step 1001 selects one or a plurality of representative devices in each communication group formed as above. After that, in a communication step 1002, each communication device establishes direct communication with other communication devices in the same group. In the case of communicating with a communication device of a different group, the first step is to transmit data to the representative device of the same group, which representative device transfers a part or the whole of the data to the representative device of the different group.

In the manner described above, a message is transferred through representative devices, and each representative device consolidates the response messages from each device of the same group and returns them as a single message. The number of messages that each device is required to receive can thus be reduced, with the result that the number of packets disposed of without being appropriately processed is reduced, thereby leading to a rapid progress of the procedure. The procedure for forming a group according to this embodiment was described. In similar fashion, the same effect is secured by exchanging a message through representative devices also for other procedures or when transmitting other data.

In the case of the foregoing configuration, it may happen for some reason or other that a message fails to be processed normally. In such a case, the message loss can be met by retransmitting the message from the device which has transmitted the request message. In the case where a representative device judges that a message is not received from a device from which the same is to be received, i.e. a device belonging to the same group, however, the representative device retransmits the request message. Thus, a more efficient and rapid processing of the procedure is made possible. In the process, it is necessary for the representative device to set a proper time-out value along the route. In the case where the same time-out value is set for the devices on a route, for example, a plurality of devices may have developed a time-out on the route for the same message, thus generating an unnecessary message. The chance of the same retransmission message being generated in a plurality of devices is reduced, however, by employing an approach in which the time-out value of a device nearer to the requesting device is set larger than the time-out value of a downstream device by about a time length allowing the downstream device to time out, retransmit a message and receive a response to the message. By doing so, a message is retransmitted only to the minimum required number of devices thereby minimizing the increase in the traffic volume of the network while at the same time improving the response characteristic.

Also, after a response message is returned, the efficiency can be further improved by storing the response message received by the representative device before an appropriate time point. The appropriate time point is the one before which a different type of message, if scheduled to arrive following the preceding message, is received, or the time point by which a retransmitted message is considered to fail to arrive. In this way, the relaying of the unnecessary retransmitted message is eliminated and an efficient protocol execution is made possible.

The explanation was made about this embodiment referring to the case in which devices are divided into two classes including representative devices and other devices. It is also possible, however, that the representative devices are configured hierarchically so that the network is classified into more hierarchical levels. Also, although this embodiment refers to the case in which communication is conducted between devices of the same group by setting a broadcast address for each group, various other communication forms can be available for each group. Assume that a plurality of communication channels using different frequencies can be used as a network interface card, for example. One communication channel can be assigned to each group, thereby further reducing the effect of the messages transmitted by devices of different groups.

It should be noted that the present embodiment is independent of the algorithm for grouping, and can be used in combination with other arbitrary grouping algorithms.

[Second Embodiment]

A second embodiment of the invention will be explained below. According to the second embodiment of the invention, the maximum number of devices constituting a group providing an upper limit of the number of devices capable of belonging to the same group is broadcast together with a device message.

Figure 4:
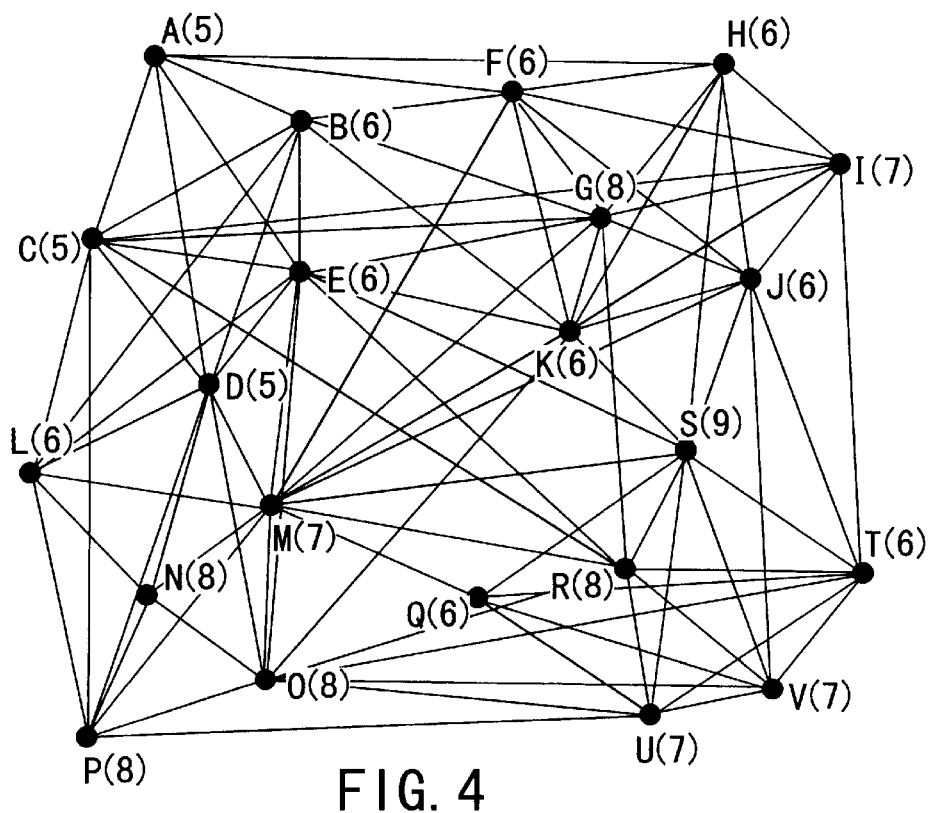
FIG. 4 is a diagram:including a graph produced with an edge displayed between communicable devices and showing the maximum number of devices of the group to which each device broadcasts according to a second embodiment of the invention.

FIG. 4 is a diagram including a graph produced by displaying edges between communicable devices as in the first embodiment, together with the maximum number of devices of a group to which each device broadcasts. For example, the maximum number of devices of a group to which the device D broadcasts is 5. In this embodiment, the devices are divided into groups in such a manner as to meet the maximum number of devices of a group.

Figure 5:
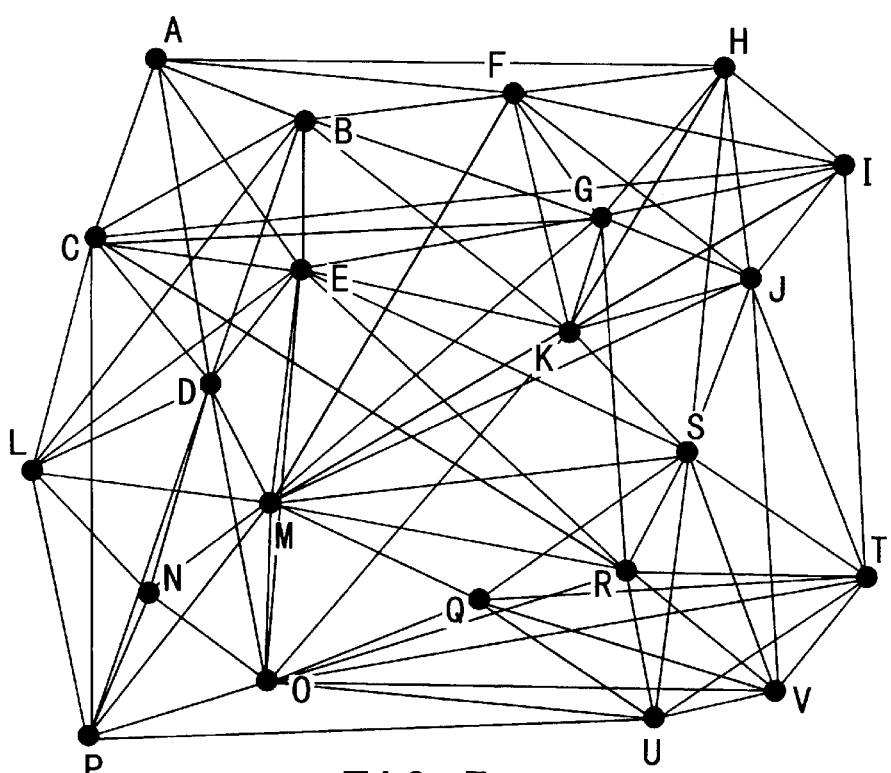
FIG. 5 is a diagram showing an example of forming a group including not more than five devices to which the device D belongs in FIG. 4.

Specifically, in FIG. 4, the number of devices of a group to which the device D belongs is set to not more than 5. An actual example of grouping is shown in FIG. 5. FIG. 5 also shows a representative device as in the first embodiment. As compared with FIG. 1, the group to which the device D belongs is modified in accordance with the limitation of the maximum number of devices of a group to which the device D belongs. The operation after complete grouping and complete selection of representative devices is similar to that of the first embodiment.

In the configuration according to this embodiment, each device determines the maximum number of devices of a group in accordance with the processing capacity thereof or the like, so that the maximum number of devices of a group to which a particular device belongs is not more than the maximum number of devices of a group, thus making it possible to limit the number of messages required to be processed at a time. As a result, even in the case where devices of different processing capacities coexist, a group can be formed in accordance with the processing capacity, thereby making it possible to optimize the general efficiency of the whole system.

[Third Embodiment]

Figure 6:
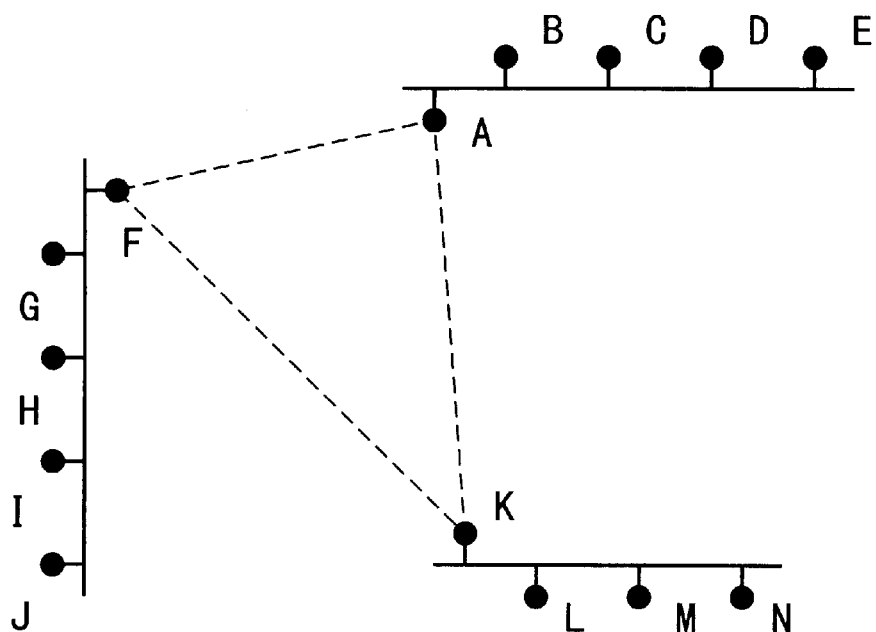
FIG. 6 is a diagram showing an arrangement of devices according to a third embodiment of the invention.
Figure 7:
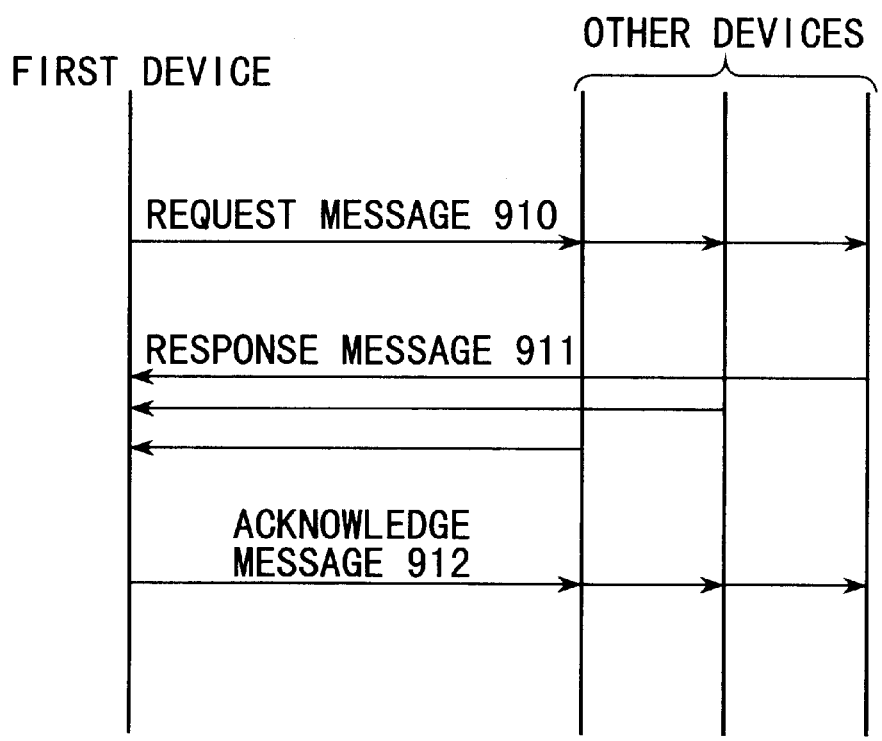
FIG. 7 is a diagram showing the procedure for producing a group required for exchanging data.

Now, a third embodiment of the invention will be explained. FIG. 6 is a diagram showing an arrangement of devices according to the third embodiment of the invention. As shown in FIG. 6, the five devices A, B, C, D, E, the five devices F, G, H, I, J and the four devices K, L, M, N are connected by a wired LAN. Further, the three devices A, F, K have an interface for a radio LAN in addition to a wired LAN interface, and are communicable with each other.

In FIG. 6, the connection by the wired LAN is indicated by solid line, and the connection by the radio LAN by dotted line. According to this embodiment, the grouping operation and the determination of representative devices in each group are conducted in accordance with a physical network configuration. Specifically, devices connected to the same wired LAN constitute a group, and the devices A, F, K act as representative devices of the respective groups. The procedure for setting a group or exchange of device information is followed the same way as in the first embodiment. In this embodiment, however, the communication means of each group are separated in the form of wired LAN and radio LAN. Therefore, the intragroup communication can be accomplished simply by broadcasting.

Also, in view of the fact that it is not necessary to set a group, the initial message exchange between all the devices is not necessary. Even in such a case, however, a message is exchanged with other groups through a representative device which consolidates the required messages or retransmits a message. In this way, the inconvenience can be obviated which otherwise occur as in the case where a great amount of messages beyond the processing capacity are received.

The third embodiment explained above refers to the case in which both the wired LAN and the radio LAN are used. In spite of this, the only requirement is to assure the separation between the intragroup communication and the communication between representative devices. An infrared ray or other various means can be used as a communication medium for this purpose.

According to the first to third embodiments described above, assume that a multiplicity of devices make up a network ad hoc and that the devices belonging to the network form groups for communication. In such a case, management information is exchanged efficiently, and the number of messages that each device is required to receive at a time is reduced. Thus, the communication can be conducted efficiently.

[Fourth Embodiment]

Now, a fourth embodiment of the invention will be explained.

Figure 8:
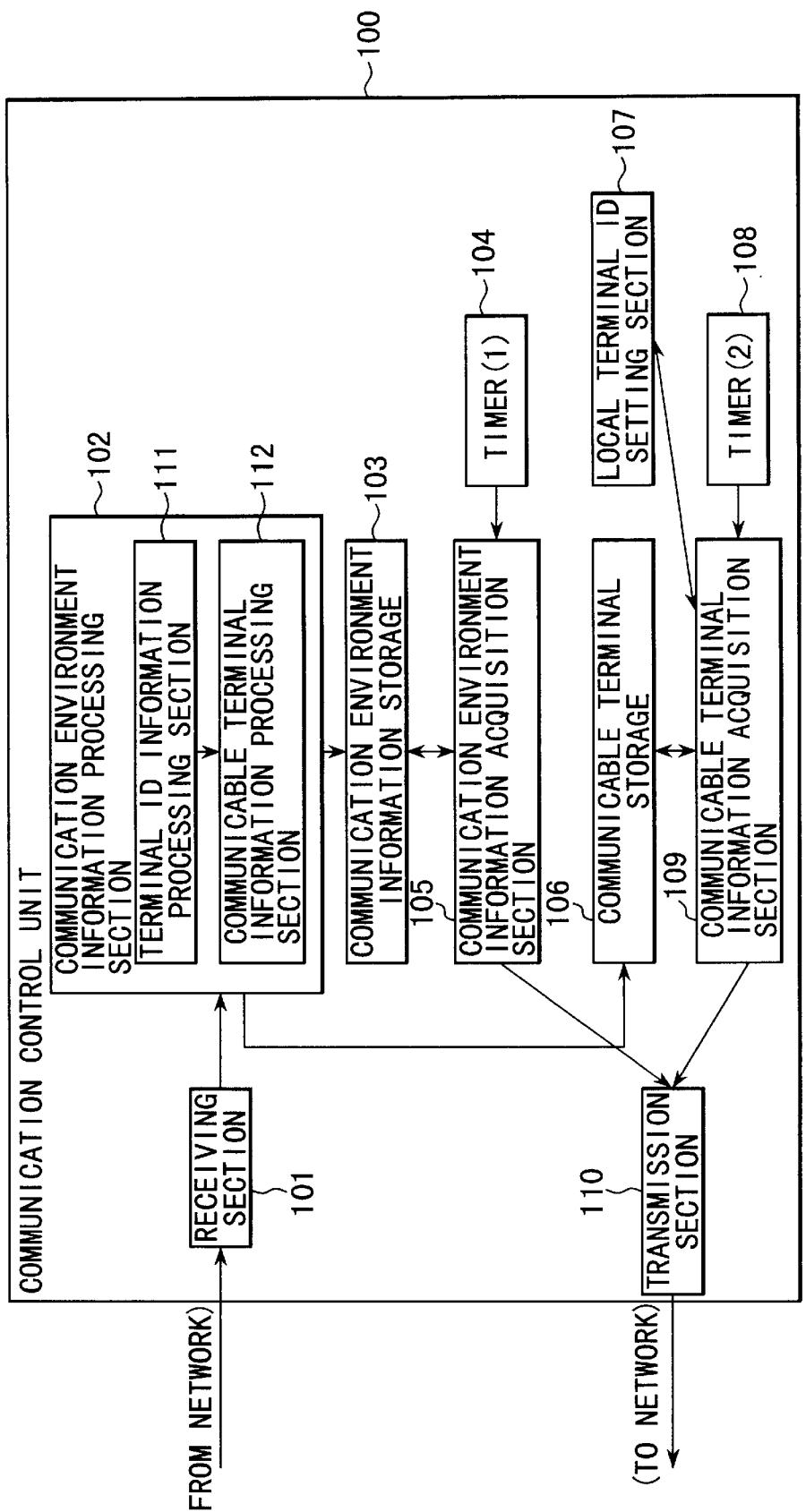
FIG. 8 is a diagram showing a configuration of a communication control unit according to a fourth embodiment of the invention.

FIG. 8 is a diagram showing a configuration of a communication control unit according to the fourth embodiment.

A receiving section 101 is connected to a network and receives a packet addressed to the local terminal from a different terminal. Among the received packets, those relating to the information of the terminal ID indicating the presence of a terminal, the information on the communicable terminal indicating the communicability of a terminal and the communication environment information constituting the communicable terminal information of the different terminal are sent to a communication environment information processing section 102.

The communication environment information processing section 102 includes a terminal ID information processing section 111 and a communicable terminal information processing section 112. The terminal ID information processing section 111 extracts the terminal ID from the packet delivered thereto from the receiving section 101. The communicable terminal information processing section 112 extracts the communicable terminal information relating to a terminal having a terminal ID extracted by the terminal ID information processing section 111. The extracted terminal ID and the communicable terminal information are notified to a communication environment information storage section 103. Also, the source terminal ID included in the packet is transmitted to the communicable terminal storage section 106 as an ID of the communicable terminal.

The communication environment storage section 103 relates the terminal ID notified from the communication environment information processing section 102 and the communicable terminal information of the particular terminal to each other and stores them.

A timer (1) 104 sends a signal regularly to a communication environment information acquisition section 105.

The communication environment information acquisition section 105, upon receipt of a signal from the timer (1) 104, acquires the terminal ID of each terminal stored in the communication environment information storage section 103 and the communicable terminal information related thereto, generates a packet carrying the information thus acquired and sends it to a transmission section 110 with the designation of an address. The address can be most simply determined by broadcasting but the method of determining an address not is limited to such an approach.

The communicable terminal storage section 106 stores the terminal ID of the communicable terminal notified from the communication environment information processing section 102.

The local terminal ID setting section 107 determines and stores the ID of the local terminal. The method of determining the ID of the local terminal is not specifically limited but such an ID can also be designated by the user.

The timer (2) 108 sends a signal regularly to the communicable terminal information acquisition section 109. The communicable terminal information acquisition section 109, upon receipt of a signal from the timer (2) 108, acquires the communicable terminal information stored in the communicable terminal information storage section 106, generates a packet carrying the acquired information and sends it to the transmission section 110 designating an address. The address can be determined simply by broadcasting but can also be determined by another method.

The transmission section 110 sends out to the network the packet arriving from the communication environment information acquisition section 105 or the communicable terminal information acquisition section 109 with a designated terminal address added thereto.

A packet format for transmitting and receiving the communicable terminal information and the communication environment information is shown in FIG. 9. The source terminal ID is the one indicating the terminal transmitting the packets and the destination terminal ID is the one of the terminal carrying the communicable terminal information. The communicable terminal information is a ID list of communicable terminals having a destination terminal ID.

FIG. 10 is a flowchart showing the process for receiving the packet of the communicable terminal information and the communication environment information transmitted by a different terminal.

Upon receipt of the packet (step A1), the first step is to extract the ID of the source terminal (step A2). The terminal ID thus extracted is registered in the communicable terminal storage section 106 (step A3). Then, the ID of the terminal constituting the communicable terminal information and the communicable terminal information of the particular terminal are extracted (step A4) and registered in the communication environment information storage section 103 (step A5).

FIG. 11 is a flowchart showing the process for activation with the timer (1) 104.

Upon activation with the timer (1) 104, the first step is to acquire the communication environment information from the communication environment information storage section 103 (step B1). Then, the communication environment information packet is produced for each terminal from the information thus acquired (steps B2 to B3), and transmitted to the network (step B4).

Figure 12:
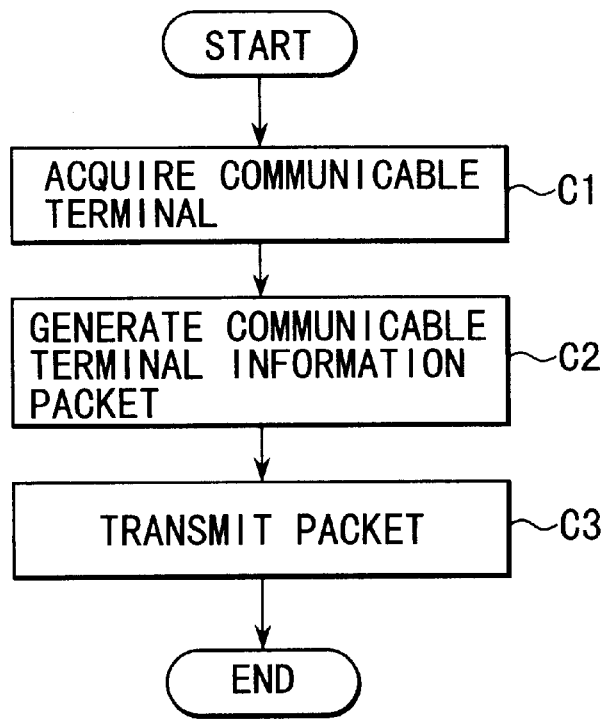
FIG. 12 is a flowchart showing the process for activation started by a timer (2) according to the fourth embodiment.

FIG. 12 is a flowchart showing the process conducted upon activation by the timer (2) 108.

Upon activation by the timer (2) 18, first, the communicable terminal is acquired from the communicable terminal storage section 106 (step C1). From the information thus acquired, the communicable terminal information packet is generated (step C2) and transmitted to the network (step C3).

Figure 13:
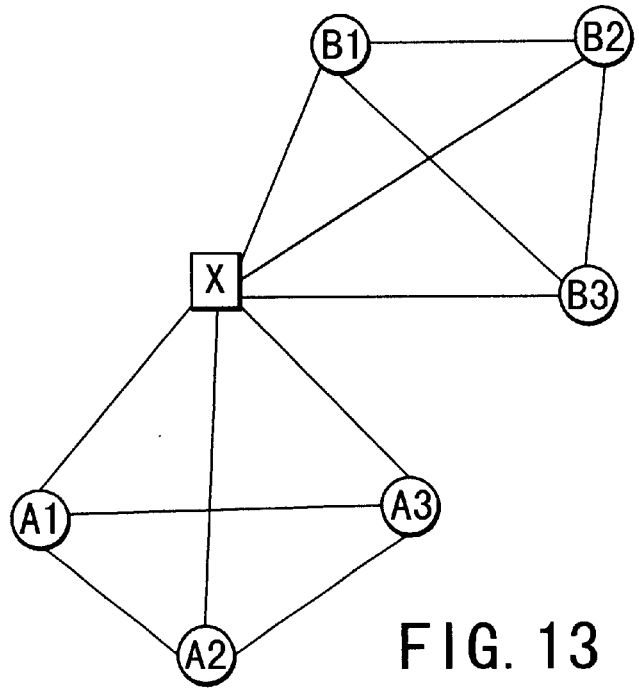
FIG. 13 is a diagram showing an example configuration of a network according to the fourth embodiment.

The contents of the specific operation of a communication control unit according to the fourth embodiment will be described with reference to a specific example configuration of the network. A specific network configuration example is shown in FIG. 13. In FIG. 13, characters X, A1 to A3, B1 to B3 designate terminals used for the communication control unit according to the fourth embodiment. Assume that except for the terminal X, the timer (1) 104 is not set and therefore the communication environment information is not transmitted. The timer can be set or reset as designated by the user. The solid line between terminals in FIG. 13 indicates that direct communication is possible. Specifically, the four devices X, A1, A2, A3 are communicable with each other. Although the four devices X, B1, B2, B3 are communicable with each other, on the other hand, the devices A1 and B1 are not directly communicable with each other.

Each terminal broadcasts the local terminal ID information and the communicable terminal information. There is no communicable terminal recognized at the initial activation time, but by receiving the packet of the communicable terminal information from other terminals, a communicable terminal comes to be recognized. By receiving the packets from A2, A3, X, for example, the device A1 recognizes that communication is possible with the devices A2, A3, X. A specific example of the communicable terminal information packet sent by A1 after this recognition is shown in FIG. 14.

Figure 14:
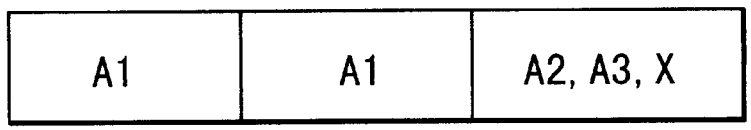
FIG. 14 is a diagram showing a specific example of a communicable terminal information packet according to the fourth embodiment.

The device X receives a packet similar to the one shown in FIG. 14 from A2, A3, B1, B2, B3 as well as from A1. The information thus received is stored in the communication environment information storage section 103 of X. A specific example of the storage information of X is shown in FIG. 15.

Due to the function of the communication environment information acquisition section 105, the device X generates and transmits the communication environment information for each terminal stored regularly as shown in FIG. 15 according to the packet format of FIG. 9. This transmission may be broadcasting. As an alternative, only the information on the terminals B1 to B3 are transmitted to the terminals A1 to A3, and only the information on the terminals A1 to A3 are transmitted to the terminals B1 to B3. In this way, the amount of communication can be reduced. The terminals A1, A2, A3, B1, B2, B3, by receiving the communication environment information sent from X, are informed of the directly communicable terminals. The terminal A1, for example, upon receipt of the information on B2 from X, is informed that a terminal B2 is present, the terminals B1, B3 are directly communicable but the terminals A1, A2, A3 are not. A specific example of the contents stored in the communication environment information storage section 103 of A1 is shown in FIG. 16.

[Fifth Embodiment]

Now, a fifth embodiment of the invention will be explained.

Figure 17:
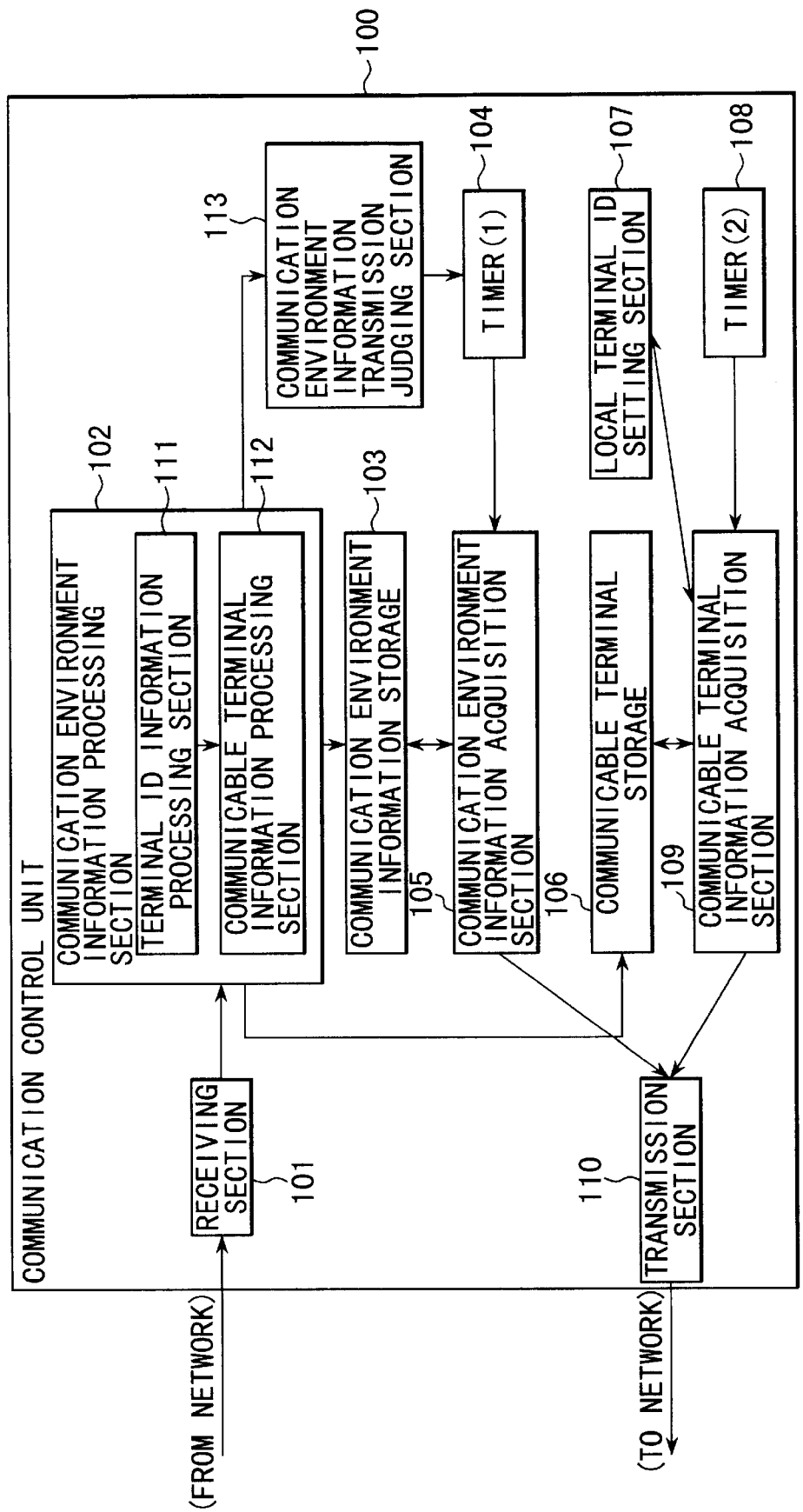
FIG. 17 is a diagram showing a configuration of the communication control unit according to a fifth embodiment of the invention.

FIG. 17 is a diagram showing a configuration of a communication control unit according to the fifth embodiment of the invention.

The difference between the communication control unit according to the fifth embodiment and the communication control unit according to the fourth embodiment described above lies in that a communication environment information transmission judging section 113 is newly added. The explanation that follows will be made mainly about the communication environment information transmission judging section 113.

The communication environment information processing section 102, in addition to the processing described in the fourth embodiment, compares the source terminal ID in the packet with the destination terminal ID in the packet. In the case where the two are different from each other, the information is known to be the communicable terminal information, i.e. the communication environment information on the terminal different from the packet transmission terminal. In such a case, the fact is notified to the communication environment information transmission judging section 113.

The communication environment information transmission judging section 113 judges whether or not the communication environment information is transmitted, and in the case where it is transmitted, sets the timer (1) 104. The judgment as to whether or not the communication environment information is to be sent or not can follow the method described below, for example. Waiting for some time after activating the terminal, it is ascertained whether there is any other terminal transmitting the communication environment information. In the case where there is any terminal transmitting the communication environment information, a notification should be received from the communication environment information processing section 102. Upon receipt of such notification, the timer (1) 104 is not set. In the case where the notification is not received within a predetermined time, in contrast, the timer (1) 104 is set to transmit the communication environment information.

Figures 18, 19, 20, 21:
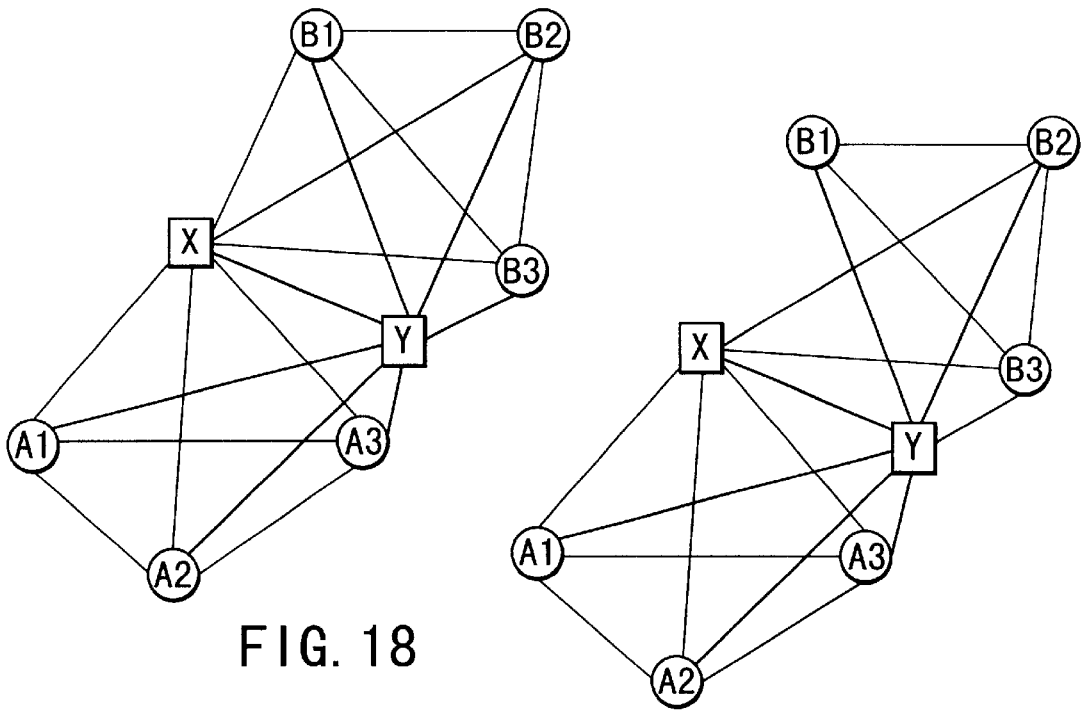
FIG. 18 is a diagram showing an example configuration of the network according to the fifth embodiment.
FIG. 19 is a diagram showing an example configuration of the network after status change according to the fifth embodiment.
FIG. 20 is a diagram showing a format of the communicable terminal information packet of a communication control unit according to a sixth embodiment of the invention.
FIG. 21 is a diagram showing a specific example of the communicable terminal information packet according to the sixth embodiment.

The contents of specific operation of the communication control unit according to the fifth embodiment will be explained with reference to a specific configuration example of the network. FIG. 18 shows an example of a specific configuration of the network. In FIG. 18, characters X, Y, A1 to A3, B1 to B3 designate terminals used with the communication control unit according to the fifth embodiment. For other than the terminals X, Y, however, the timer (1) 104 is not set and therefore the communication environment information is not sent. Also, the solid line between the terminals in FIG. 18 shows that the devices connected thereby are directly communicable with each other. Specifically, the five devices X, Y, A1 to A3 can communicate with each other, and the five devices X, Y, B1 to B3 can communicate with each other but the devices A1 and B1 cannot directly communicate with each other.

First, assume that X and Y are not activated but A1, A2, A3, B1, B2, B3 are activated. After activation of X, the packets continue to be received for some time. In the process, the packets having the communicable terminal information in which the source terminal ID and the destination terminal ID are coincident with each other are received from A1, A2, A3, B1, B2, B3, but not the communication environment information having the source terminal ID and the destination terminal information not coincident with each other. In other words, the terminals transmitting the communication environment information can be judged to be absent, and X begins to send the communication environment information by itself.

Now, assume that Y has been activated. Y continues to receive the packets for some time after activation. At the same time, since the packets are received from X in which the source terminal ID and the destination terminal ID are different, the communication environment information is not transmitted by Y. For this reason, the wastefulness of the same communication environment information being transmitted by a plurality of terminals is eliminated.

Also, as shown in FIG. 19, for example, assume that X and B1 cease to be directly communicable with each other. Then, Y can recognize from the communicable terminal information from X or B1 that the link between X and B1 has broken off. In such a case, Y can start to transmit to B1 the communication environment information on A1 to A3.

A method of judging by the communication environment information transmission judging section 113 consists, other than the above-described method, in making inquiry of the user at the time of activation of a terminal whether or not the communication environment information is to be transmitted or not or in determining the transmission or no transmission as a default value which is modifiable by the user at any time.

[Sixth Embodiment]

Now, a sixth embodiment of the invention will be explained. The difference between the communication control unit according to the sixth embodiment and the communication control unit according to the fourth embodiment described above resides in that the communication environment information acquisition section 105 shown in FIG. 8 generates a packet including a collection the communication environment information for a plurality of terminals. The packet format used for this purpose is shown in FIG. 20. As shown in FIG. 20, the format has a field indicating the number of destination terminals carrying the communicable terminal information and as many destination terminal IDs and as many communicable terminal information in the number corresponding to the fields.

The communication environment information processing section 102 of the terminal that has received a packet, after extracting the number of the destination terminal IDs, extracts as many pairs of the destination terminal ID and the communicable terminal information, which are processed the same way as in the fourth embodiment.

FIG. 21 shows the contents of a specific packet used by X to transmit to A1 to A3 the communication environment information for B1 to B3 with the network configuration of FIG. 13 with reference to which the fourth embodiment was explained. It is seen that the amount of processing for transmission and receiving of packets and the traffic volume for transmission to the network can be reduced as compared with the case in which the terminals A1 to A3 receive the information on the terminals B1 to B3 in separate packets.

[Seventh Embodiment]

Now, a seventh embodiment of the invention will be explained.

Figure 22:
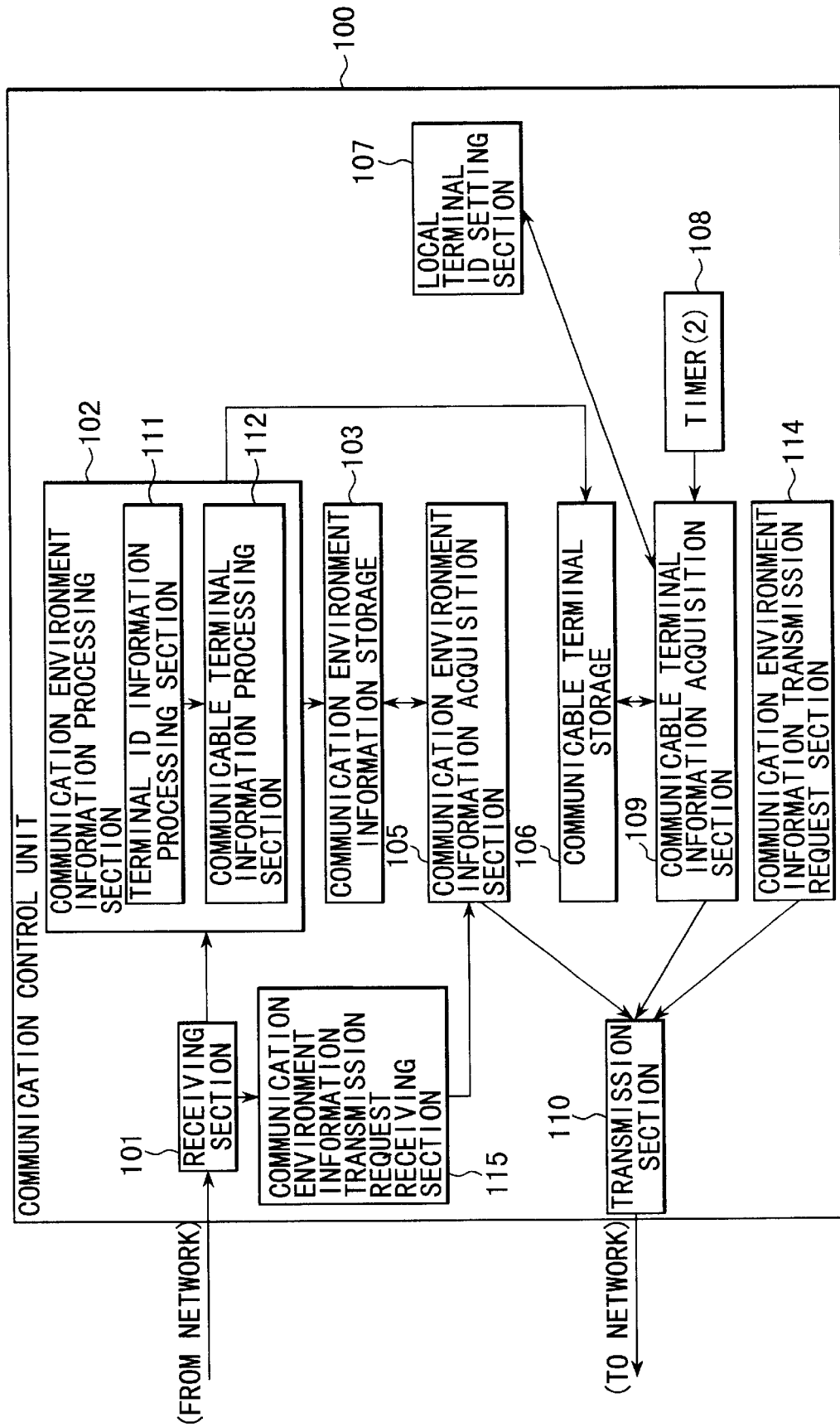
FIG. 22 is a diagram showing a configuration of the communication control unit according to a seventh embodiment of the invention.

FIG. 22 is a diagram showing a configuration of a communication control unit according to the seventh embodiment of the invention.

The difference between the communication control unit according to the seventh embodiment and the communication control unit according to the fourth embodiment described above lies in that the timer (1) 104 is eliminated and a communication environment information transmission requesting section 114 and a communication environment information transmission request receiving section 115 are newly added. The description that follows will be made mainly about the last-mentioned two sections.

The communication environment information transmission requesting section 114 generates a packet for requesting the transmission of the communication environment information from other terminals. The packet thus generated carries information on a specific terminal for which the communication environment information is desired. The timing of generating a packet can be determined by and the information to be carried on the packet can be acquired from the user, for example. The packet thus generated is sent as designated by the user, or otherwise, broadcast to the transmission section 110.

The receiving section 101, in addition to the processing in the fourth embodiment, receives the transmission requesting packet for the communication environment information from the network, and upon receipt thereof, notifies the fact to the communication environment information transmission request receiving section 115.

The communication environment information transmission request receiving section 115 extracts the contents of the transmission request of the communication environment information from the communication environment information packet received from the receiving section 101. The contents of the transmission request are either a-specific terminal associated with the communication environment information to be transmitted, whether the communication environment information to be sent is limited to a specific terminal, or whether the communication environment information for all the terminals are to be sent. The contents thus extracted and the information on the terminals requesting the transmission are sent to the communication environment information acquisition section 105.

The communication environment information acquisition section 105, upon receipt of the notification of the transmission request for the communication environment together with the contents of the transmission request and the requesting terminal from the communication environment information transmission request receiving section.115, acquires the communicable terminal information for the required terminals from the communication environment information storage section 103 in accordance with the contents of the transmission request, and generates a packet carrying the communication environment information. Then, the transmission section 110 is instructed to transmit the packet to the terminal requesting the transmission.

A specific operation of the communication control unit according to the seventh embodiment will be explained with reference to the example configuration of the network shown in FIG. 13 used for explanation of the fourth embodiment. In FIG. 13, X, A1 to A3, B1 to B3 designate terminals used for the communication control unit according to the seventh embodiment. Assume that the terminal A1 requests from X, in response to a request from the user, the communication environment information on all the terminals registered in X. Upon receipt of the communication environment information transmission request from A1, X generates and sends to A1 the communication environment information for A2, A3, B1 to B3. As a result, the transmission of the communication environment information is made possible as required.

[Eighth Embodiment]

Now, an eighth embodiment of the invention will be explained.

Figure 23:
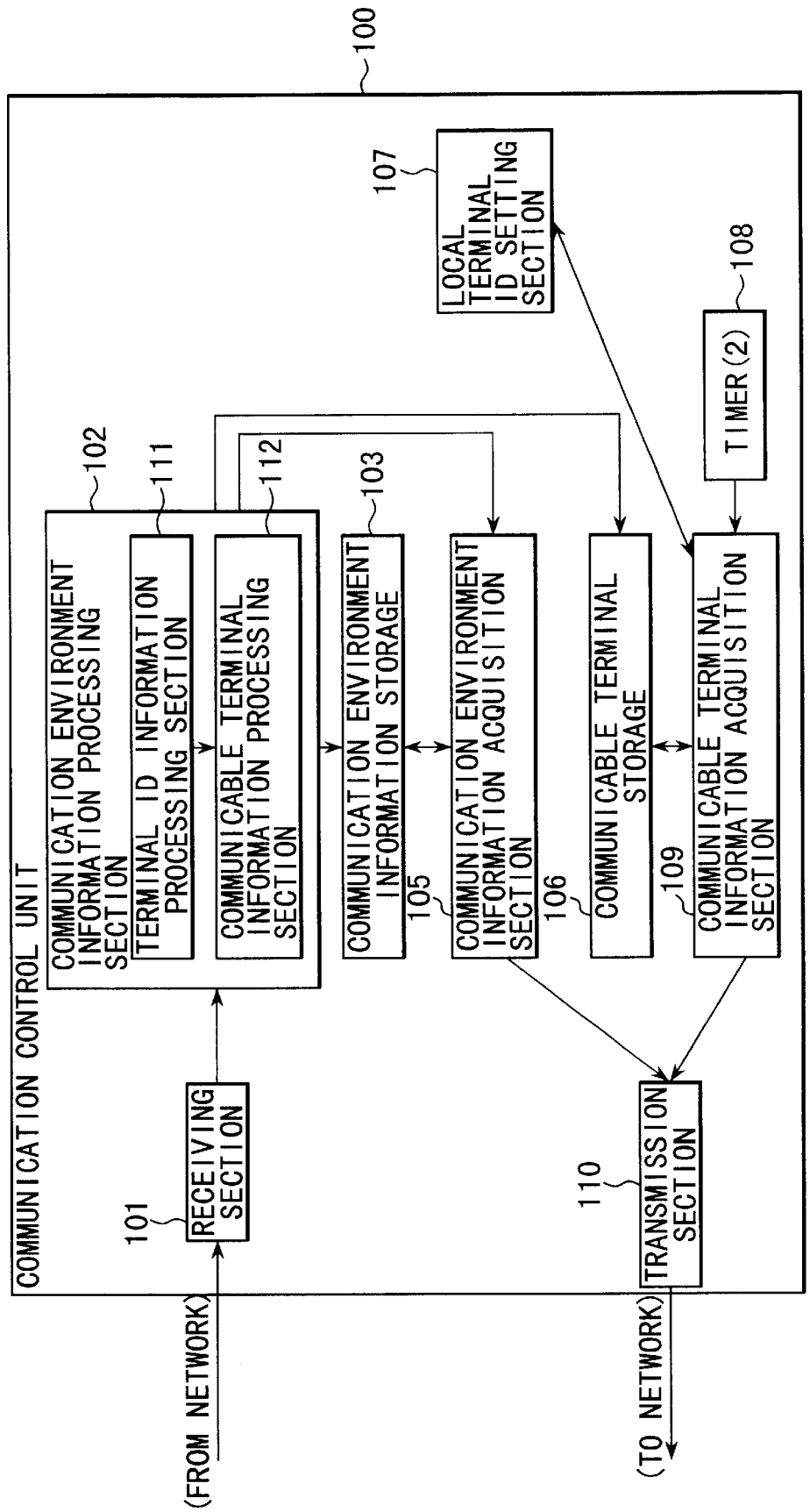
FIG. 23 is a diagram showing a configuration of the communication control unit according to an eighth embodiment of the invention.

FIG. 23 is a diagram showing a configuration of a communication control unit according to the eighth embodiment of the invention.

The difference between the communication control unit according to the eighth embodiment and the communication control unit according to the fourth embodiment resides in the fact that the timer (1) 104 is eliminated and the flow of control information from the communication environment information processing section 102 to the communication environment information acquisition section 105 is added. The description below will be made mainly about the difference.

First, the communication environment information processing section 102 extracts a terminal ID and the communicable terminal information for the terminal having the terminal ID from the packet received from the receiving section 101, and checks to see whether or not the same contents as the extracted contents are already registered in the communication environment information storage section. In the case where they are already registered, the packet is discarded. In the case where the contents are not yet registered, in contrast, they are newly registered. In the case where the terminal ID is registered but the communicable terminal information is different between the contents extracted from the packet and the contents of the communication environment information storage section, then the contents of the communication environment information storage section 103 are updated. The new registration or updating, if made, is notified to the communication environment information acquisition section 105.

The communication environment information acquisition section 105, upon receipt of the notification of the new registration or update in the communication environment information storage section 103 or updating from the communication environment information processing section 102, generates a packet carrying the communication environment information for the particular terminal and sends it to the transmission section 110.

FIG. 24 is a flowchart showing the process for receiving the packet of the communicable terminal information and the communication environment information transmitted from other terminals.

Upon receipt of the packet (step D1), a terminal ID and the communication environment terminal information for the terminal having the terminal ID are extracted (step D2). The next step (step D3) checks whether the same contents as extracted are registered in the communication environment information storage section 103 having registered therein the contents of the communication environment information so far received.

In the case where the contents are already so registered (YES in step D3), the packet is discarded thereby to end the process. In the case where the terminal ID is not yet registered (NO in step D3), in contrast, the contents are newly registered in the communication environment information storage section 103 (step D4). In the case where the communicable terminal information is different between the contents extracted from the packet and the contents of the communication environment information storage section 103 in spite of the fact that the terminal ID is in registration (NO in step D3), the contents of the communication environment information storage section 103 are updated (step D4). For new registration or updating, a packet carrying the communication environment information for the registered or updated terminal is generated (step D5) and transmitted to the network (step D6).

Specific contents of the operation of the communication control unit according to the eighth embodiment will be described with reference to a specific example of network configuration. Consider the case in which the network configuration is such that the new terminal B4 is activated newly as shown in FIG. 25 from the state of FIG. 13 used for explaining the fourth embodiment. In FIG. 25, characters A1 to A3, B1 to B4 designate communication control units having the configuration of FIG. 8 according to the fourth embodiment and it is assumed that the timer (1) 104 is not set and therefore the communication environment information is not transmitted. On the other hand, X is assumed to be a communication control unit having the configuration shown in FIG. 23.

The device B4 broadcasts the communicable terminal information while in the state not communicable immediately after the activation thereof. The packet in that situation is shown in FIG. 26.

The device X receives this packet, checks the communication environment information storage section 103, and determines that there is no registration for B4. Thus the communication environment information for B4 are broadcast or transmitted only to A1 to A3. The packet for this purpose is shown in FIG. 27. As a result, A1 to A3 can know the presence of the terminal B4 and the fact that B4 is not a communicable terminal. After that, B4 receives the packet of the communicable terminal information of X, B1 to B3, so that X, B1 to B3 are registered as the terminals communicable with B4. The communicable terminal information transmitted by B4 is as shown in FIG. 28. X receives the packet shown in FIG. 28, and checks the communication environment information storage section 103. Although there is a registration for B4, it is seen that the communicable terminal information for B4 is different. Thus the communication environment information for B4 is broadcast or transmitted only to A1 to A3. The packet in this situation is shown in FIG. 29. As a result, the terminals A1 to A3 can know that the terminal B4 can communicate with X, B1 to B3.

[Ninth Embodiment]

Now, a ninth embodiment of the invention will be explained.

Figure 30:
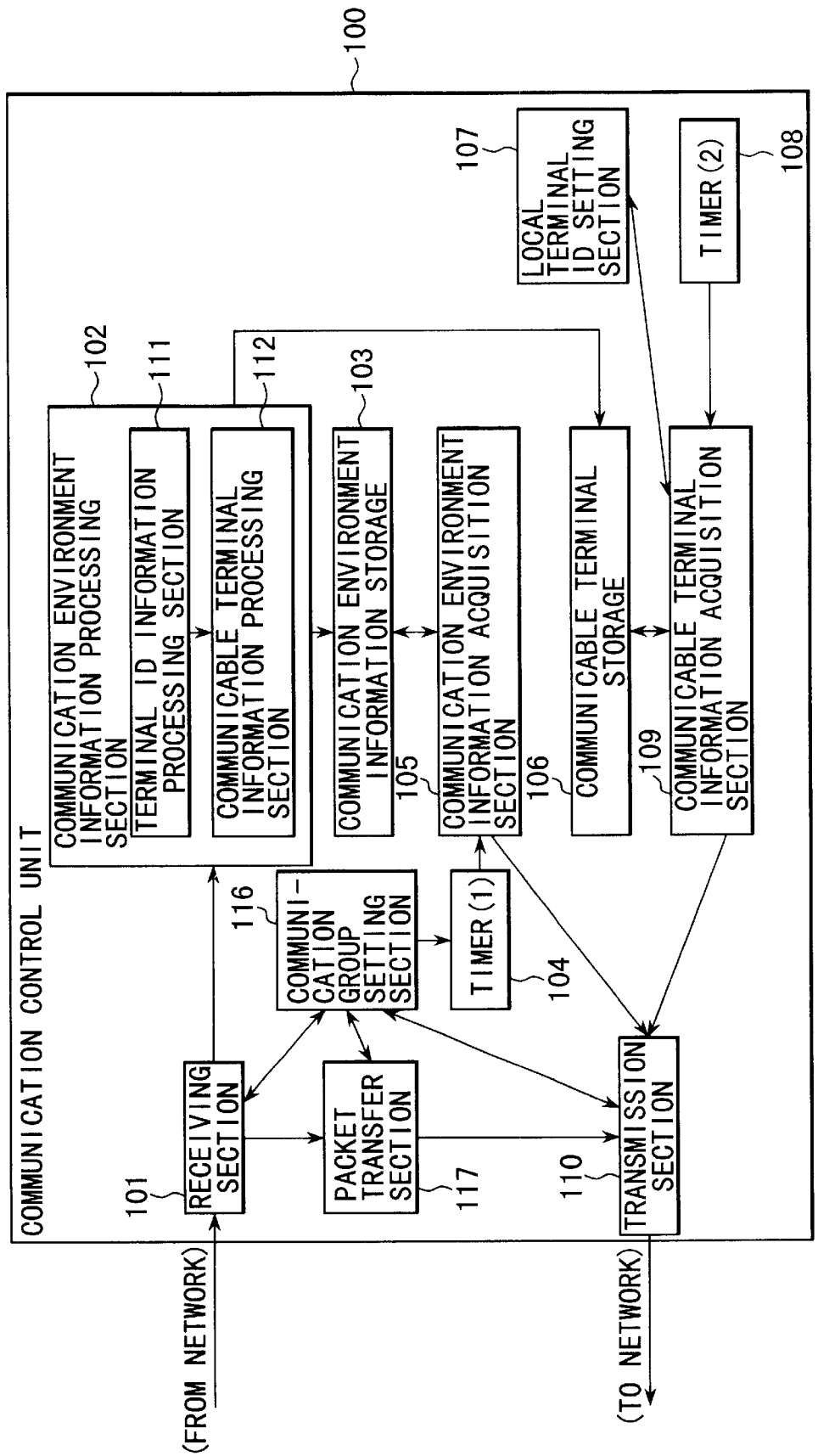
FIG. 30 is a diagram showing a configuration of the communication control unit according to a ninth embodiment of the invention.

FIG. 30 is a diagram showing a configuration of a communication control unit according to the ninth embodiment of the invention.

A communication group setting section 116 is a component for segmenting and managing a plurality of terminals into a plurality of logical groups. In each communication group, one terminal acts as a representative terminal of the group. The terminals can be grouped by a method in which the user inputs a group ID to each terminal expressly and the terminals having the same group ID are determined as the members of the same communication group. The invention, however, is not limited to this segmentation method. Also, the representative terminal of each communication group can be specified by the user, though not limited to such a method. At the time of grouping the terminals, only the terminals associated with the same communication group are assigned a communication path dedicated to the member terminals for transmission and receiving the signal. This can be realized by assigning different multicast addresses to different communication groups. Also, a communication path is assigned permitting representative terminals to communicate with each other. After the terminals are segmented into groups, the terminals in the same group communicate directly with each other using the assigned dedicated communication path, while the communication with the terminals of other groups is conducted through the respective representative terminals of the groups. In the case where a local terminal is a representative terminal of a communication group, a timer (1) 104 is set for transmitting the communication environment information to the terminals within the same communication group and the representative terminals of other communication groups.

The receiving section 101 is connected with the network and makes up a part for receiving the packets addressed to the local terminal from other terminals. The terminal ID information indicating the presence of a terminal, the communicable terminal information indicating a communicable terminal and the communication environment information providing the communicable terminal information of other terminals contained in the received packets are sent to the communication environment information processing section 102. In the case of a representative terminal of a communication group, on the other hand, the packets addressed to the terminals associated with a communication group other than the same communication group and the packets addressed to the terminals in the same communication group from the representative terminal of other communication groups are sent to the packet transfer section 117.

The communication environment information processing section 102 includes a terminal ID information processing section 111 and a communicable terminal information processing section 112. The terminal ID information processing section 111 extracts the terminal ID from the packet received from the receiving section 101. The communicable terminal information processing section 112 extracts the communicable terminal information and the like for the terminals having the terminal ID extracted by the terminal ID information processing section 111. The terminal ID and the communicable terminal information thus extracted are notified to the communication environment information storage section 103. Also, the terminal ID of the source contained in the packet is notified to the communicable terminal storage section 106 as an ID of a communicable terminal.

The communication environment information storage section 103 relates the terminal ID and the communicable terminal information of the particular terminal notified from the communication environment information processing section 102 to each other and stores them in such a relation.

The timer (1) 104, once set from the communication group setting section 116, sends a signal regularly to the communication environment information acquisition section 105.

The communication environment information acquisition section 105, upon receipt of a signal from the timer (1) 104, acquires the terminal ID of each terminal and the related communicable terminal information stored in the communication environment information storage section 103 and the communicable terminal information of the local terminal stored in the communicable terminal information storage section 106. A packet carrying the information thus acquired is generated, and the transmission section 110 is instructed to send the packet to the terminals in the same communication group to which the local terminal belongs and the representative terminals of other communication groups.

The communicable terminal information storage section 106 stores the ID of a communicable terminal notified thereto from the communication environment information processing section 102.

The local terminal ID setting section 107 determines and stores the ID of the local terminal.

The timer (2) 108 sends a signal regularly to the communicable terminal information acquisition section 109. The communicable terminal information storage section 109, upon receipt of a signal from the timer (2) 108, acquires the communicable terminal information stored in the communicable terminal information storage section 106, generates a packet carrying the information thus acquired, and instructs the transmission section 110 to send it to the terminals in the same communication group as the local terminal.

A packet transfer section 117 instructs the transmission section 110 to send the packet received from the receiving section 101 and addressed to a terminal of a different communication group to the representative terminal of the particular different communication group. Also, the transmission section 110 is instructed to send the packet received from the receiving section 101 and addressed to a terminal in the same communication group from other communication groups to the particular terminal of the local group.

The transmission section 110 sends the packet arriving from the communication environment information acquisition section 105, the communicable terminal information acquisition section 109 or the packet transfer section 117 out to the network to reach a designated destination terminal.

Figures 31, 32, 33, 34:
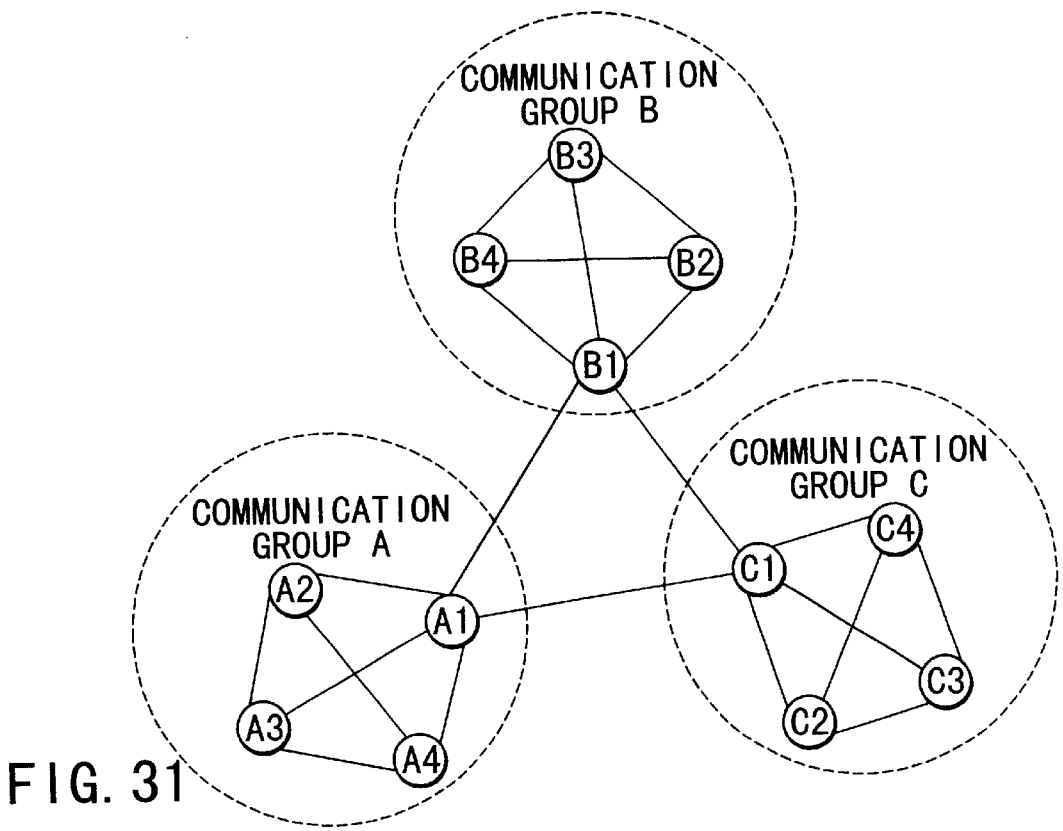
FIG. 31 is a diagram showing an example configuration of the network according to the ninth embodiment.
FIG. 32 is a diagram showing a specific example of a communicable terminal information packet transmitted to the communication group A regularly by the terminal A1 according to the ninth embodiment.
FIG. 33 is a diagram showing a specific example of the communication environment information stored in the terminal A1 according to the ninth embodiment.
FIG. 34 is a diagram showing a specific example of the communication environment information transmitted and received between representative terminals according to the ninth embodiment.

Specific contents of the operation of the communication control unit according to the ninth embodiment will be described with reference to a configuration example of the network shown in FIG. 31. In this case, assume that there are three communication groups including a communication group A to which the terminals A1 to A4 belong, a group B to which the terminals B1 to B4 belong, and a group C to which the terminals of C1 to C4 belong. The terminals in the same communication group are assumed to be able to communicate directly with each other. The representative terminals of the communication groups are A1, B1 and C1, respectively, which are directly communicable with each other. The terminal A2, for example, communicates with B2 through A1 and B1.

First, in the communication group A, each terminal sends the communicable terminal information of the local terminal to other terminals of the communication group A. The terminal A1, for example, fails to recognize the communicable terminal immediately after activation and transmits the communicable terminal information without any description of a communicable terminal. After that, when A1 receives the communicable terminal information from A2, A3, A4, the terminals A2, A3, A4 are stored in the communicable terminal storage section 106. After that, A1 sends regularly the communicable terminal information as shown in FIG. 32 to the communication group A. Other terminals also recognize communicable terminals similarly and transmits the communicable terminal information regularly to the communication group A. The contents of the communication environment information storage section 103 for A1 after exchanging the communicable terminal information a sufficient number of times within the communication group A are shown in FIG. 33.

The terminal A1 transmits the communication environment information in the communication group A regularly to the representative terminals B1 and C1. Conversely, it receives the communication environment information in the communication groups B and C from B1 and C1. The communication environment information from B1 is shown in FIG. 34. A1 receives and processes the information, so that the contents of the communication environment information storage section 103 become as shown in FIG. 35. Also, the contents of the communicable terminal storage section 106 constitute A2 to A4, B1 to B4. The exchange of the communication environment information between representative terminals, as shown in FIG. 34, is such that the communication environment information for a plurality of terminals are transmitted in one packet or, in the case where the regularly-transmitted communication environment information remains unchanged from the preceding information, only the information indicating no change is transmitted. In this way, the traffic volume on the network is reduced.

The communication environment information for the terminals in the communication group B is also transmitted by A1 to A2 to A4. The communicable terminal information of B1 to B4, therefore, are also registered in the communication environment information storage section 103 of A2 to A4. In this case, too, like the exchange of the communication environment information between representative terminals, the communication environment information for a plurality of terminals are transmitted collectively in one packet, or in the case where the regularly-transmitted information remains unchanged from the preceding one, only the information indicating no change is transmitted. Then, the traffic volume is reduced on the network. Also, as in A1, the destination terminal IDs B1 to B4 in the packet are added in A2 to A4 as communicable terminal information. Consequently, the communicable terminal information transmitted by A1 to A4 subsequently includes B1 to B4. Conversely, the communicable terminal information transmitted by B1 to B4 include A1 to A4. As a result, after transmission and receipt of sufficient communication environment information, A1 to A4 and B1 to B4 come to recognize that they are mutually communicable. The contents of the communication environment information storage section 103 of A1 thus become as shown in FIG. 36.

Also, the terminals belonging to the communication group C are also registered similarly in the communication environment information storage section 103, and finally, all the terminals A1 to A4, B1 to B4, C1 to C4 come to recognize that they are mutually communicable.

The transmission and receipt of the communication environment information are segmented among communication groups in this way and the communication environment information in a communication group are collectively transmitted. Thus, the traffic volume on the network is reduced as compared with the case in which the information is not segmented into communication groups but the communication environment information are transmitted or received equally by all the terminals to and from each other.

Even in the case where a representative terminal of a communication group is changed, the same procedure as described above is followed on the network including a new representative terminal.

The technique described with reference to the foregoing embodiments, as a program executable by the computer, is applicable not only to various devices in a form written in the magnetic disk, the optical disk, the semiconductor memory or the like storage medium, but also to various devices by transmission through a communication medium. The computer realizing this system reads the program recorded in the recording medium, and the operation is controlled by this program thereby to execute the above-mentioned process.

According to the above-mentioned fourth to ninth embodiments, even in the case where the number of terminals is increased in a network, each terminal can acquire the communicable terminal information of other terminals while keeping the traffic volume low. Also, any change in the communicable terminal information can be transmitted to each terminal with rapidity.

[Tenth Embodiment]

Now, a tenth embodiment of the invention will be explained.

According to the tenth embodiment, one communication path is selected for communication, and the broadcasting is made possible between devices that have selected the same communication path. A basic configuration of the communication device 100 according to this aspect of the invention will be explained with reference to an example.

Figure 37:
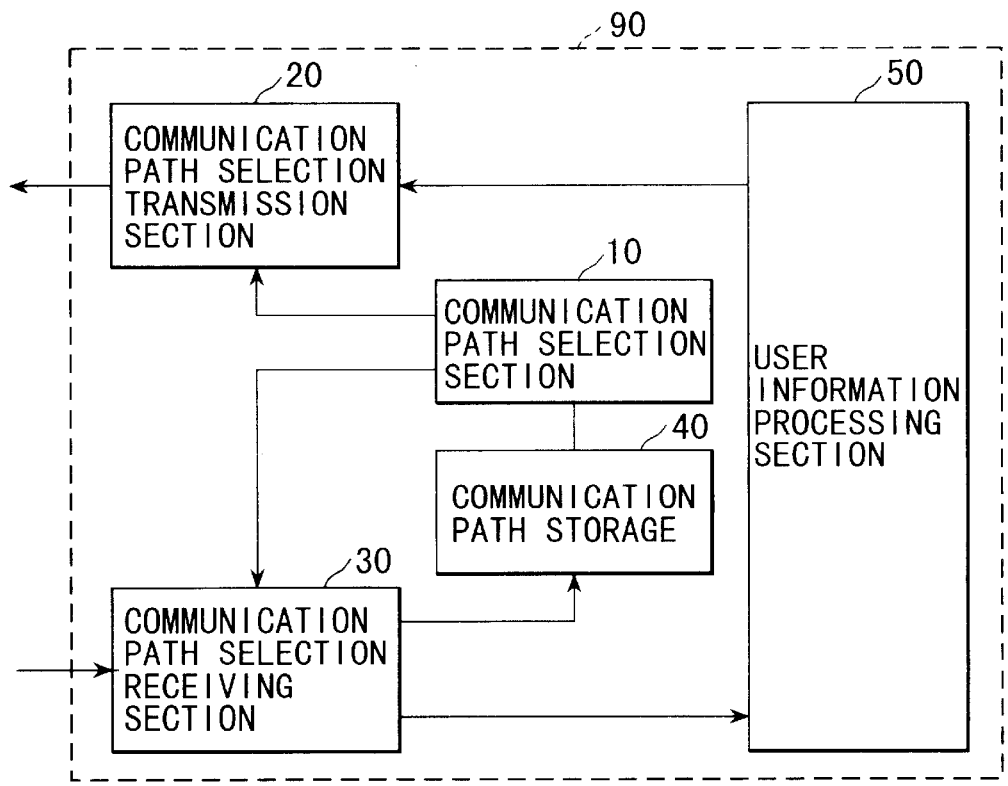
FIG. 37 is a diagram showing a configuration of a communication device according to a tenth embodiment of the invention.

The basic configuration of the communication device 100 is shown in FIG. 37. The communication device 100 includes a user information processing section 50, a communication path selection section 10, a communication path selection transmission section 20, a communication path selection receiving section 30 and a communication path storage section 40.

The user information processing section 50 is a part for executing what is called an application. The communication path selection section 10 selects one communication path from among a plurality of communication paths through which it can communicate. The selected communication path is notified to the communication path selection transmission section 20 and the communication path selection receiving section 30. In this way, the transmission and receiving of the information using the selected communication path is made possible. A plurality of communication paths as defined herein are those capable of exchanging data without interfering with each other and include a communication channel capable of multiplex transmission such as a radio communication channel capable of transmission by frequency division multiplexing or time division multiplexing. Also, a radio communication channel can be used which can be separated by filtering by referring to the address of the destination device or the source device added to the frame header at the time of using a single carrier frequency. Further, a wired communication channel can be used, which is capable of data exchange and multiplex transmission without mutual interference. Also, a plurality of communication paths are not necessarily configured exclusively of radio or wired channels but communication channels of both radio and wired channels can be used by the communication devices 100. Some of a plurality of communication paths can be radio communication channels and the remainder can be wired communication channels.

The communication path selection transmission section 20 transmits the transmission data input from the user information processing section 50 using the communication channel selected by the communication path selection section 10. The communication path selection receiving section 30 delivers the data received using the communication channel selected by the communication path selection section 10 to the user information processing section 50. Also, the communication path selection receiving section 30, if there are any data received from other communication paths than the communication path selected by the communication path selection section 10, stores them in the communication path storage section 40 as information relating to the occupancy rate of other communication channels.

Figure 47:
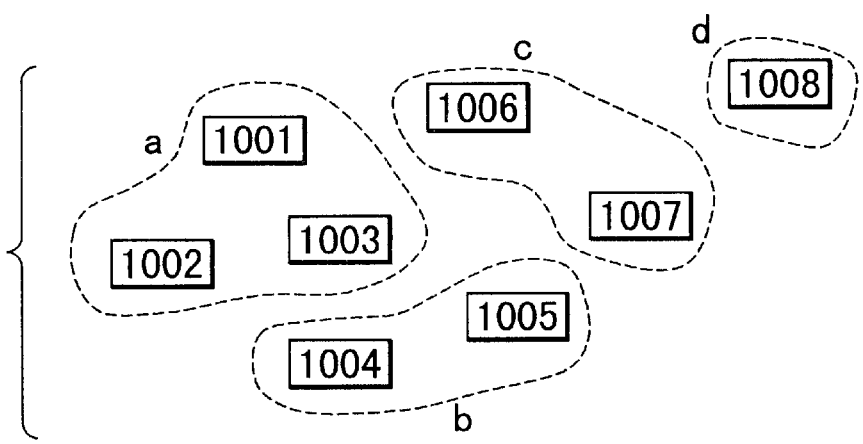
FIG. 47 is a diagram showing an example communication mode of a communication device according to the tenth embodiment of the invention.

With reference to FIG. 47, the communication modes of a plurality of the communication devices 100 (1001 to 1008) will be explained.

As a first example, consider the case in which all the communication devices have a plurality of communication channels with separable frequencies.

Assume that all the communication devices have the ability to transmit and receive data through the frequency-separable communication channels Cha, Chb, Tc, Chd. The communication path selection section 10 of each communication device selects one communication channel at random or as designated in advance. As a result, data transmission and receiving becomes possible for each communication device using the communication channel selected by the communication path selection section 10. Assume that the devices 1001, 1002, 1003 have selected Cha, the devices 1004, 1005 have selected Chb, the devices 1006, 1007 have selected Chc, and the device 1008 has selected Chd. 1001 can transmit and receive data to and from only the devices 1002 and 1003 which have selected Cha. As a result, although direct transmission and receiving of data with all the communication devices is impossible, an efficient data transmission and receiving becomes possible between communication devices which have selected the same communication channel of the same frequency band, as compared with the data transmission and receiving to and from all the communication devices using a single communication channel.

In the case of the first example, each communication device can be controlled not to receive the data of the communication channels other than selected by itself using a frequency filter. Without using the filter, however, the data received from other than the selected communication channel are not delivered to the user information processing section 50 but used as a material for recognizing the fact that communication devices conducting the communication using other communication channels are present in the surrounding. In this way, the information about the surrounding status can be stored in the communication path storage section 40.

As a second example, explanation will be made about the case in which although the same carrier frequency is used for all the communication devices, the communication channels thereof can be separated from each other using a multicast address added to the frame.

Assume that all the communication devices can communicate using the communication channels identified and separated by the multicast addresses MCa, MCb, MCc, MCd. The communication path selection section 10 of each communication device selects a multicast address at random or as predetermined. In the case where a given multicast address is selected in a communication device, the communication path selection transmission section 20 transmits the selected multicast address added to the address of the header of the frame containing the information from the user information processing section 50 transmitted by the transmission section 20. The communication path selection receiving section 30 refers to the multicast address in the address field added to the header of the received frame. In the case where the multicast address not the one selected by itself, the information contained in the received frame is not delivered to the user information processing section 50. Assume that the communication devices 1001, 1002, 1003 have selected MCa, the devices 1004, 1005 have selected MCb, the devices 1006, 1007 have selected MCc and only the device 1008 has selected MCd. The device 1001 can transmit and receive data to and from only the devices 1002 and 1003 which have selected MCa. As a consequence, although direct data transmission and receiving to and from all the communication devices is impossible, an efficient data transmission and receiving becomes possible between the communication devices which have selected the same multicast address as compared with the case in which data are transmitted and received to and from all the communication devices by broadcasting.

In the case of the second example, assume that a frame not having the selected multicast address is received. The information on this fact is stored in the communication path storage section 40. In this way, the presence of communication devices communicating using other multicast addresses can be recognized.

As described above, the communication device 100 selects one internal communication path and controls the transmission and receiving of data using the selected communication path. In this way, although there is at least one of a plurality of devices with which direct communication is impossible, unlike in the case where all the devices communicate through the same communication path, an efficient communication can be conducted with the devices that have selected the same communication path. Also, it is possible to recognize the presence of a communication device that has selected other than the communication path selected by itself. Thus, by storing and holding the information on the use of the communication paths other than selected, a signal can be sent to other communication paths by using the stored information as required.

[Example Configuration of Communication Path Selection Transmission Section]

Now, an example configuration of the communication path selection transmission path 20 will be explained which makes possible data transmission only to the communication path selected by the communication path selection section 10.

Figure 38:
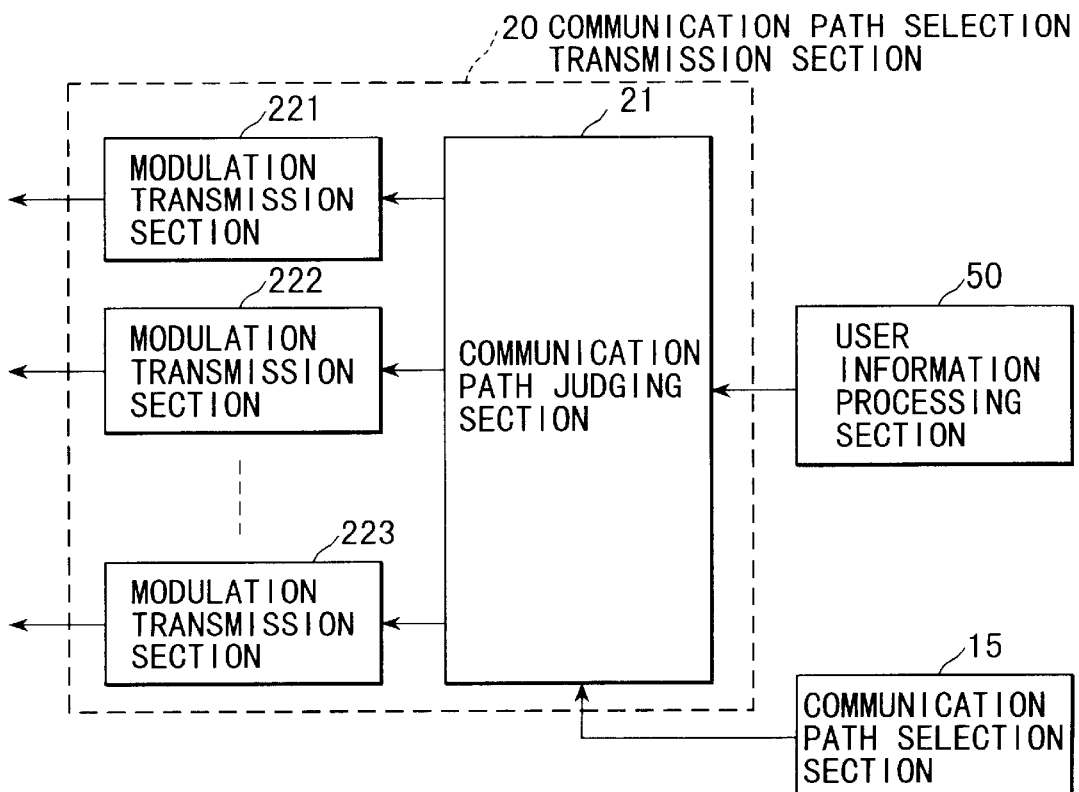
FIG. 38 is a diagram showing an example configuration of a communication path selection transmission section of a communication device and an example of the control relation between a communication path selection section and a communication path selection transmission section according to the tenth embodiment of the invention.

FIG. 38 shows a first example configuration of the communication path selection transmission section 20. In the first configuration example, the case is assumed in which the notification on the communication path selected by the communication path selection section 10 is sent to the communication path determination means 21.

In FIG. 38, modulation transmission sections 221, 222, 223 are for transmitting an input signal to the communication path using carrier frequencies f1, f2, f3, respectively. The signal transmitted by each modulation transmission section is assumed not to develop crosstalks by superposed spectra. Assume that the communication path selection section 10 has selected a communication channel corresponding to the carrier frequency f1. The communication path selection section 10 notifies the fact to the communication path determination section 21. The communication path determination section 21, after converting the data input from the user information processing section 50, applies the signal only to the modulation transmission section 221 which transmits the input signal to the communication path using the carrier frequency f1.

Figure 39:
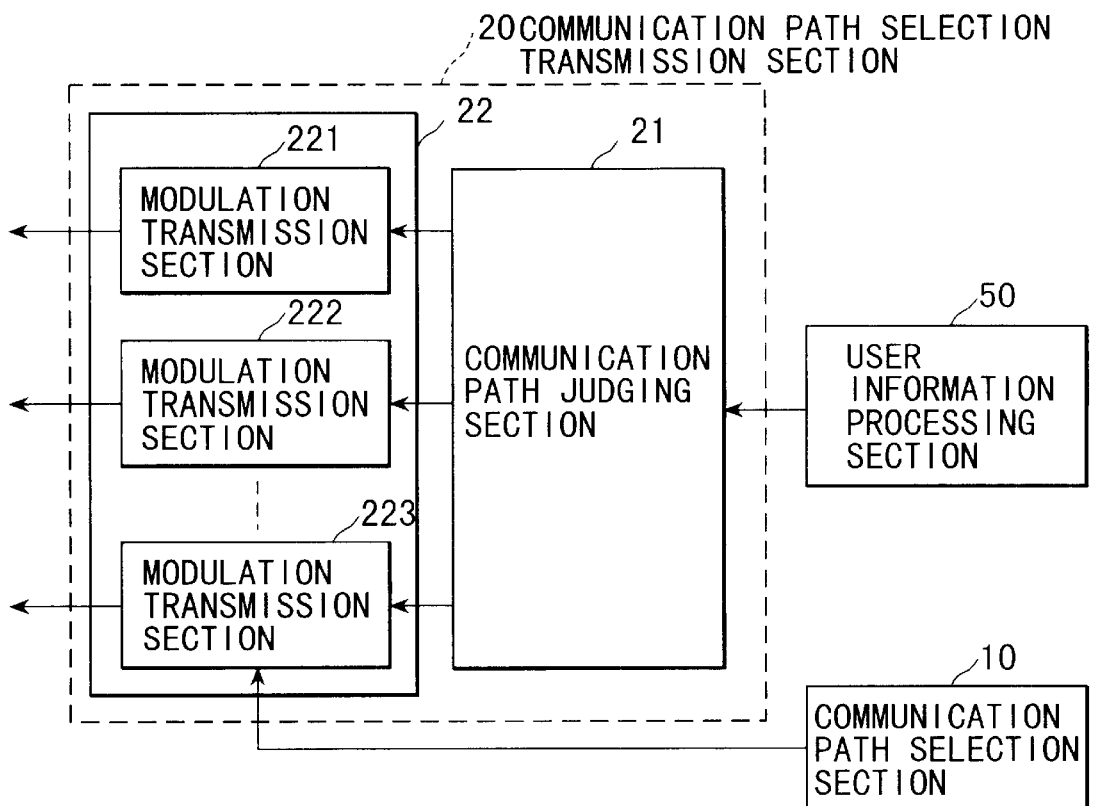
FIG. 39 is a diagram showing an example configuration of a communication path selection transmission section of a communication device and another example of the control relation between a communication path selection section and a communication path selection transmission section according to the tenth embodiment of the invention.

FIG. 39 shows a second example configuration of the communication path selection transmission section 20. The second example configuration assumes the case in which the notification on the communication path selected by the communication path selection section 10 is sent to the modulation transmission section group 22.

In FIG. 39, the modulation transmission section group 22 includes modulation transmission sections 221, 222, 223. These modulation transmission sections 221, 222, 223 transmit the input signal to the communication path using the carrier frequencies f1, f2, f3, respectively. The signals transmitted by the modulation transmission sections 221, 222, 223 are assumed to develop no crosstalks which otherwise might occur due to the superposed spectra. The communication path determination section 21, after converting the data input thereto from the user information processing section 50, applies the signal to the modulation transmission section group 22. Assume that the communication path selection section 10 has selected a communication channel corresponding to the carrier frequency f1. The communication path selection section 10 notifies the modulation transmission section group 22. In this way, only the modulation transmission section 211 of the modulation transmission section group 22 can modulate the input signal and transmit it to the communication path, while the other modulation transmission sections can be totally prevented from processing the input signal.

[Example Configuration of Communication Path Selection Receiving Section]

Now, explanation will be made about an example configuration of the communication path selection receiving section 30 which permits data to be received only from a communication path selected by the communication path selection section 10.

Figure 40:
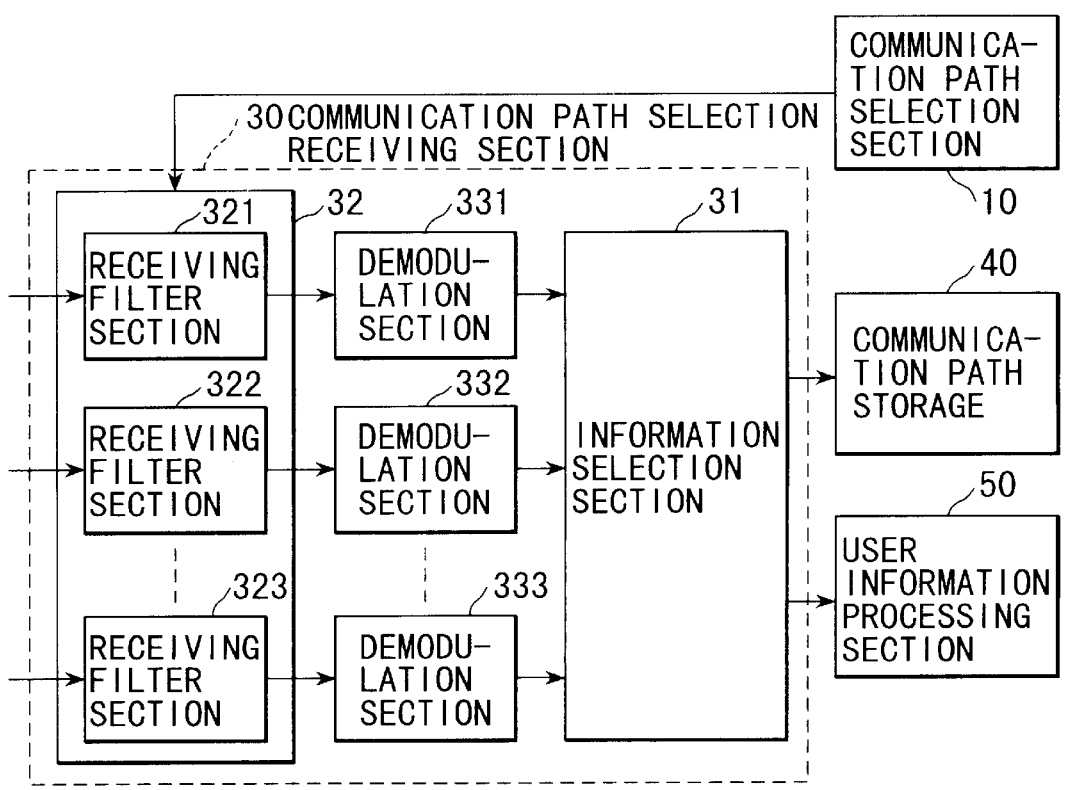
FIG. 40 is a diagram showing an example configuration of a communication path selection receiving section of a communication device and an example of the control relation between a communication path selection section and a communication path selection receiving section according to the tenth embodiment of the invention.
Figure 41:
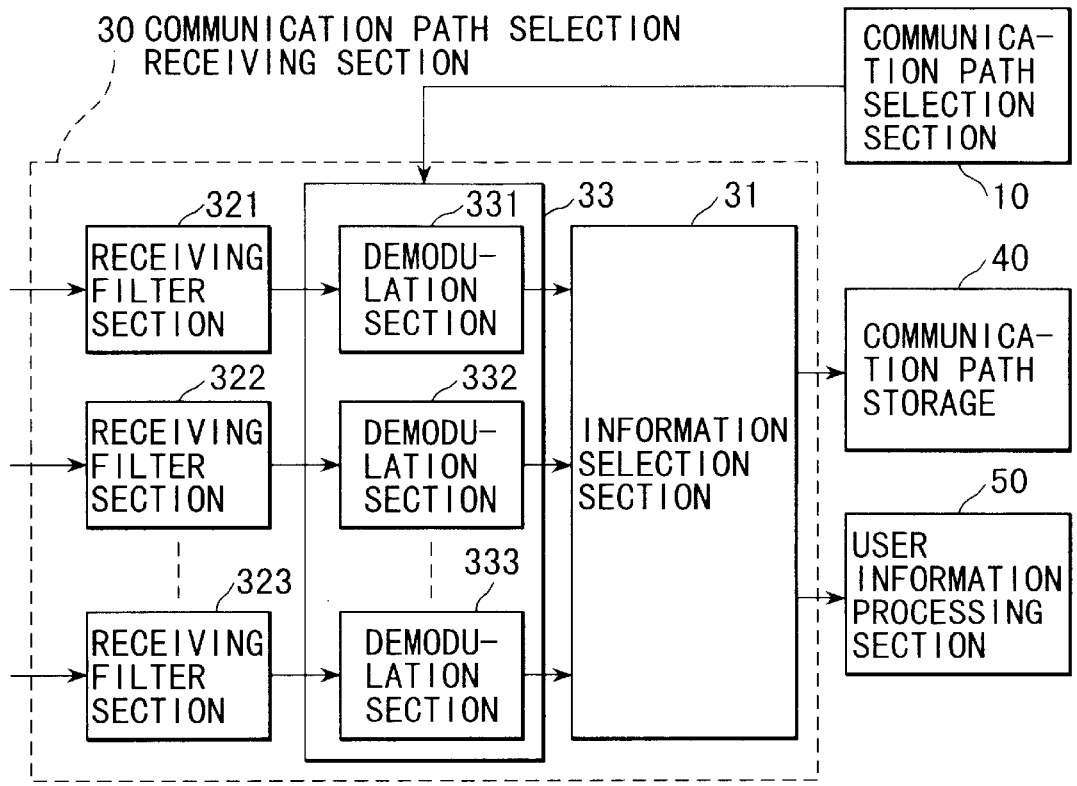
FIG. 41 is a diagram showing an example configuration of a communication path selection receiving section of a communication device and another example of the control relation between a communication path selection section and a communication path selection receiving section according to the tenth embodiment of the invention.
Figure 42:
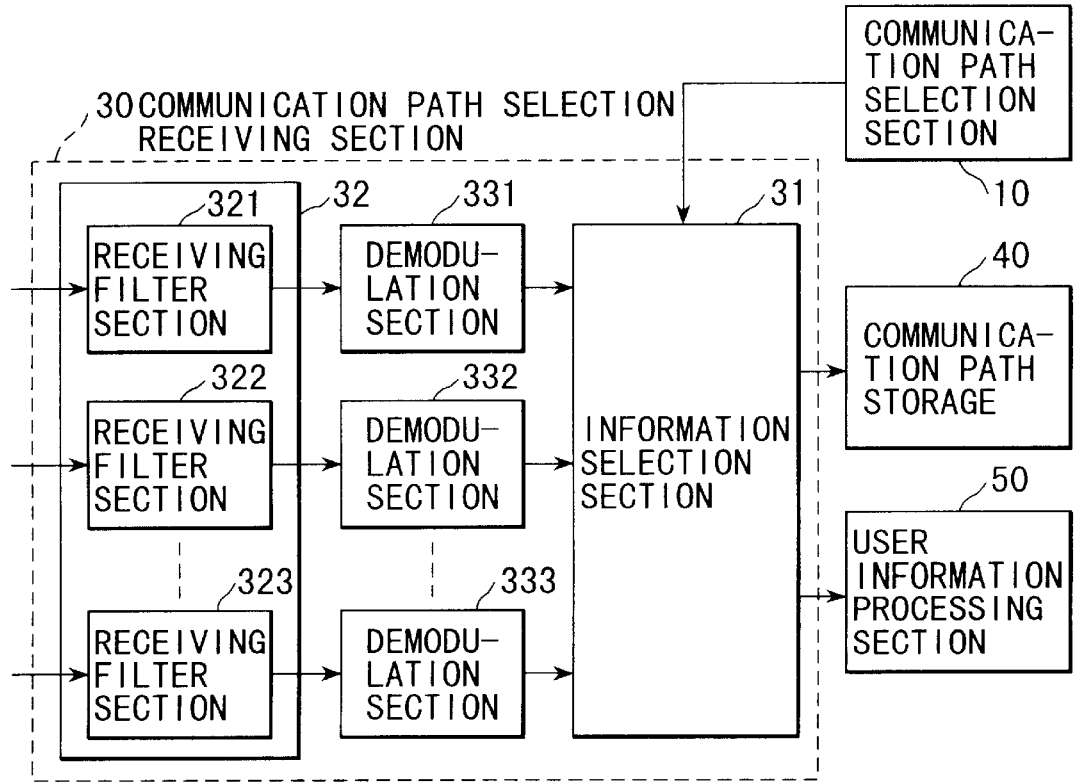
FIG. 42 is a diagram showing an example configuration of a communication path selection receiving section of a communication device and another example of the control relation between a communication path selection section and a communication path selection receiving section according to the tenth embodiment of the invention.

FIGS. 40, 41 and 42 show example configurations of the communication path selection receiving section 30.

Receiving filter sections 321 to 323 receive a signal from the communication path and have the function of removing noises in the unrequired band. Demodulation sections 331 to 333 demodulate the filtered received signal and apply it to an information selection section 31. The information selection section 31 recognizes the input signal as a frame, and after converting it into data, applies it to the user information processing section 50.

FIG. 40 shows a first example configuration of the communication path selection receiving section 30. The first example configuration assumes the case in which the notification on the communication path selected by the communication path selection section 10 is sent to the receiving filter section group 32.

In FIG. 40, the receiving filter section group 32 includes receiving filter sections 321, 322, 323. The receiving filter sections 321, 322, 323 have the function of passing only the signal of the carrier frequencies f1, f2, f3, respectively, modulated and transmitted by a remote device. Assume that the communication path selection section 10 has selected a communication channel corresponding to the carrier frequency f1. The communication path selection section 10 notifies the receiving filter section group 32. Then, in the receiving filter section group 32, only the receiving filter section 321 is permitted to pass the received signal while the other receiving filter sections block the signal. The signal passed through the receiving filter section 321 is demodulated by the demodulation section 331 and applied to the information selection section 31. The information selection section 31 recognizes the applied signal as a frame and after converting it into data, delivers it to the user information processing section 50.

FIG. 41 shows a second configuration example of the communication path selection receiving section 30. In the second configuration example, the notification on the communication path selected by the communication path selection section 10 is assumed to be sent to the demodulation section group 33.

The receiving filter sections 321, 322, 323 have the frequency-filtering function of passing only the carrier frequency signals of f1, f2 or f3, respectively, modulated and transmitted by the remote device. Assume that the communication path selection section 10 has selected a communication channel corresponding to the carrier frequency f1. The communication path selection section 10 notifies the demodulation section group 33, so that only the signal that has passed through the receiving filter section 321 among those signals passed through the receiving filter sections 321, 322, 323 is demodulated by the demodulation section 331 and input to the information selection section 31. The information selection section 31 recognizes the input signal as a frame, and after converting it into data, delivers it to the user information processing section. Further, the demodulation sections 331, 332, 333 output the occupancy rate of each communication channel to the information selection section 31 based on the signal input from the receiving filter section. In the case of the second configuration example, the signal of other communication paths passes the receiving filter section but is not demodulated by the demodulation section, and therefore cannot be recognized as a frame. The information selection section 31, however, detects the signal input from other demodulation sections than the demodulation section 331. In this way, it is possible to recognize whether other communication devices use a communication channel corresponding to the carrier frequency f2 or f3. The occupancy rate of the communication channel corresponding to the carrier frequency f2 or f3 is stored in the communication path storage section 40.

FIG. 42 shows a third configuration example of the communication path selection receiving section 30. In the third configuration example, the notification on the communication path selected by the communication path selection section 10 is assumed to be sent to the information selection section 31.

The receiving filter sections 321, 322, 333 have the frequency-filtering function of passing only the signal of f1, f2, f3, respectively, in carrier frequency among the signals of the carrier frequencies f1, f2, f3 modulated and transmitted by another device. Assume that the communication path selection section 10 has selected a communication channel corresponding to the carrier frequency f1. The fact is notified by the communication selection section 10 to the information selection section 33. Thus, among the signals passed through the receiving filter sections 321, 322, 323, demodulated by the demodulation sections 331, 332, 333 and input to the information selection section 33, only the signal input from the demodulation section 331 providing a communication channel corresponding to the carrier frequency f1 is converted into data and then delivered to the user information processing section. In the case of this third configuration example, the signals of all the other communication paths can also be received and recognized as a frame. Therefore, the occupancy rate by other communication devices of the communication channels other than selected by the communication path selection section 10 can be stored in the communication path storage section 40.

This embodiment includes a transmission-receiving unit capable of transmitting and receiving information independently for each selectable communication path. Therefore, the information from other than the selected communication path can also be received at the same time. In a device having a single transmission-receiving unit capable of transmitting and receiving the information to and from a selected communication path exclusively by inputting parameters or the like for the particular communication path, however, the data cannot be received from other than the selected communication path. In such a case, in order to recognize the operating condition of other communication paths, the parameters or the like of other communication paths are input before the information is transmitted from the selected communication path. In this way, the transmission-receiving unit can be controlled in such a manner that the information can be received from other than the selected communication path.

[11th Embodiment]

Figure 48:
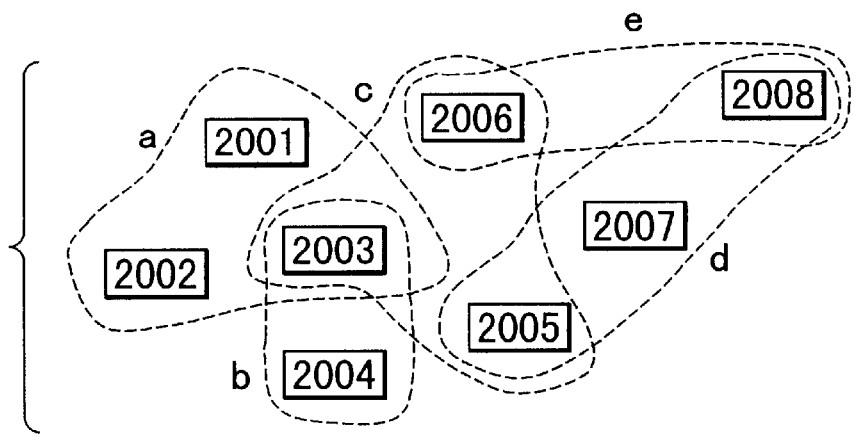
FIG. 48 is a diagram showing an example communication mode of a communication device according to the 11th embodiment of the invention.

Now, a configuration of a communication device 200 according to an 11th embodiment will be explained with reference to FIGS. 43 and 48.

According to this embodiment, reference is made to a configuration in which a plurality of communication paths are selected and the broadcasting communication is possible between the devices that have selected the same communication path.

Figure 43:
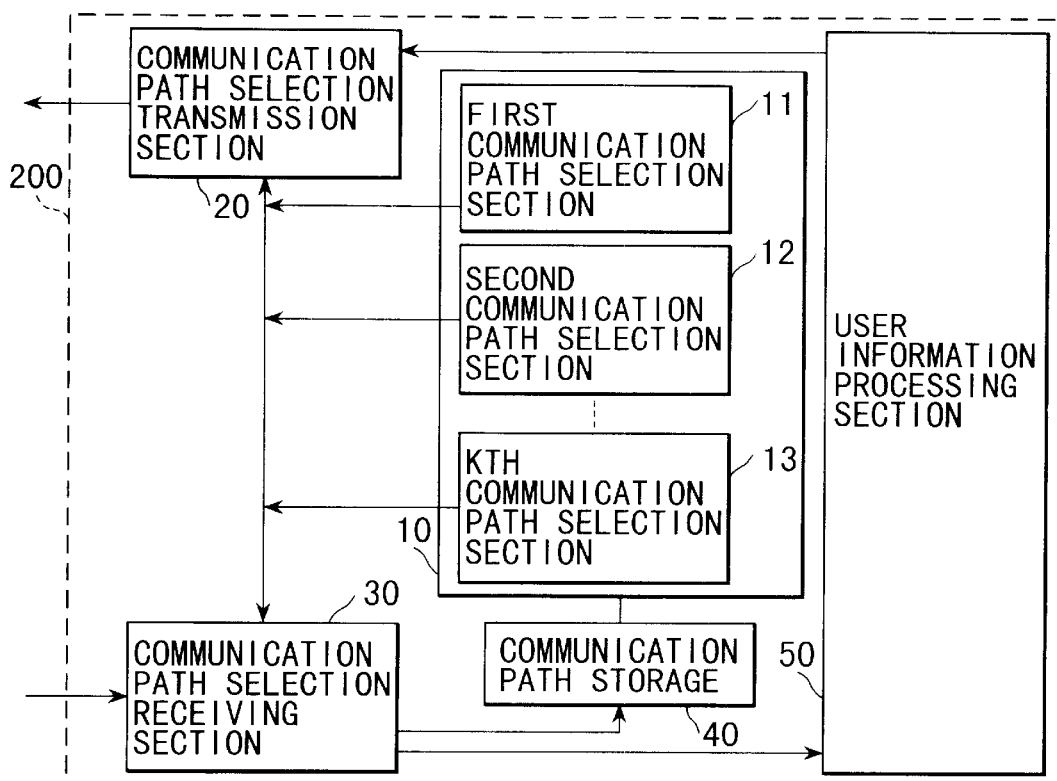
FIG. 43 is a diagram showing a configuration of a communication device according to an 11th embodiment of the invention.

FIG. 43 shows a basic configuration of the communication device 200.

The communication device 200 includes a user information processing section 50, a communication path selection section 10, a communication path selection transmission section 20, a communication path selection receiving section 30 and a communication path storage section 40.

The communication path selection section 10 includes a first communication path selection section 11 for selecting the first communication path, a second communication path selection section 12 for selecting the second communication path, . . . , a k-th communication path selection section 13 for selecting the k-th communication path, from among a plurality of communication paths available for selection by the communication path selection section 10. The first communication path selection section 11, the second communication path selection section 12, . . . , the k-th communication path selection section 13 notify the selected communication path to the communication path selection transmission section 20 and the communication path selection receiving section 30. In this way, the transmission and receiving of information is made possible using a selected communication path. The communication path has the same meaning as that described with reference to the tenth embodiment. Also, the first communication path selection sections 11 to 13 are each assumed to select a communication path not selected by other communication path selection sections, and therefore it is assumed that the same communication path is not selected at the same time by a plurality of communication path selection sections.

The communication path selection transmission section 20 transmits the transmission data input from the user information processing section 50 using the communication path selected by the communication path selection section 10. In the case where the notification is received from the first communication path selection section 11 that the communication path a is selected or from the second communication path selection section 12 that the communication path b is selected, then the data to be transmitted are transmitted to both the communication path a and the communication path b. At the same time, if a plurality of selected communication paths can be multiplexed, the signal can be transmitted in multiplex form. Also, if there is any transmission data input from the user information processing section 50 which is designated for transmission only through the communication path a, such data can be transmitted only through the communication path a. This is also the case with the communication path b.

The communication path selection receiving section 30 outputs the data received using the communication path selected by the communication path selection section 10 to the user information processing section 50 as a received data. Upon receipt of a notification from the communication path selection section 11 that the communication path a has been selected or a notification from the second communication path selection section 12 that the communication path b has been selected, for example, the communication path selection receiving section 30 delivers the data received from both the communication path a and the communication path b to the user information processing section 50. In the process, a multiplexed signal, if received, is demultiplexed and the signal only on the selected communication path is delivered as a data to the user information processing section 50.

Also, the communication path selection receiving section 30, if there is any data received from other than the communication path selected by the communication path selection section 10, outputs the information on the occupancy rate of other communication paths to and is stored in the communication path storage section 40.

Now, the communication mode of a plurality of communication devices 200 (2001 to 2008) will be explained with reference to FIG. 48.

The communication path selection section 10 of each communication device selects one communication channel at random or as predetermined. As a result, it becomes possible for each communication device to transmit and receive data using the communication path selected by the communication path selection section 10. FIG. 48 shows the state in which 2001, 2002 have selected only the communication path Cha, 2003 the three communication paths Cha, Chb, Chc, 2004 only the communication path Chb, 2005 the two communication paths Chc, Chd, 2006 the two communication paths Chc, Che, 2007 only the communication path Chd, and 2008 the two communication paths Chc, Chd. In this case, the device 2003 is capable of the broadcast communication with the devices 2001, 2002 that have selected Cha, the communication with the device 2004 that has selected Chb and the broadcast communication with the devices 2005, 2006 that have selected Chc.

Each communication path in the above-mentioned example can be considered the one capable of frequency separation. Although data cannot be transmitted or received to and from all the communication devices directly, an efficient data transmission and receiving becomes possible between the communication devices that have selected the same communication path as compared with the case where data are transmitted or received using a single communication path for all the devices. With the communication device 200 according to this invention, selection of a plurality of communication paths can increase the number of communicable devices and the devices capable of efficient data transmission and receiving at the same time. Also, by storing and holding the information on the occupancy rate of the communication paths other than selected, it is possible to recognize the presence of communication devices that have selected other than the communication path selected by the present unit. Also, the stored information can be used to send a signal to other communication paths as required.

[12th Embodiment]

A communication device 201 according to the 12th embodiment of the invention will be explained with reference to FIGS. 44, 49, 50.

In this embodiment, explanation will be made about a configuration which makes possible reselection of a communication path in the case where there is no communicable device on a selected communication path.

Figure 44:
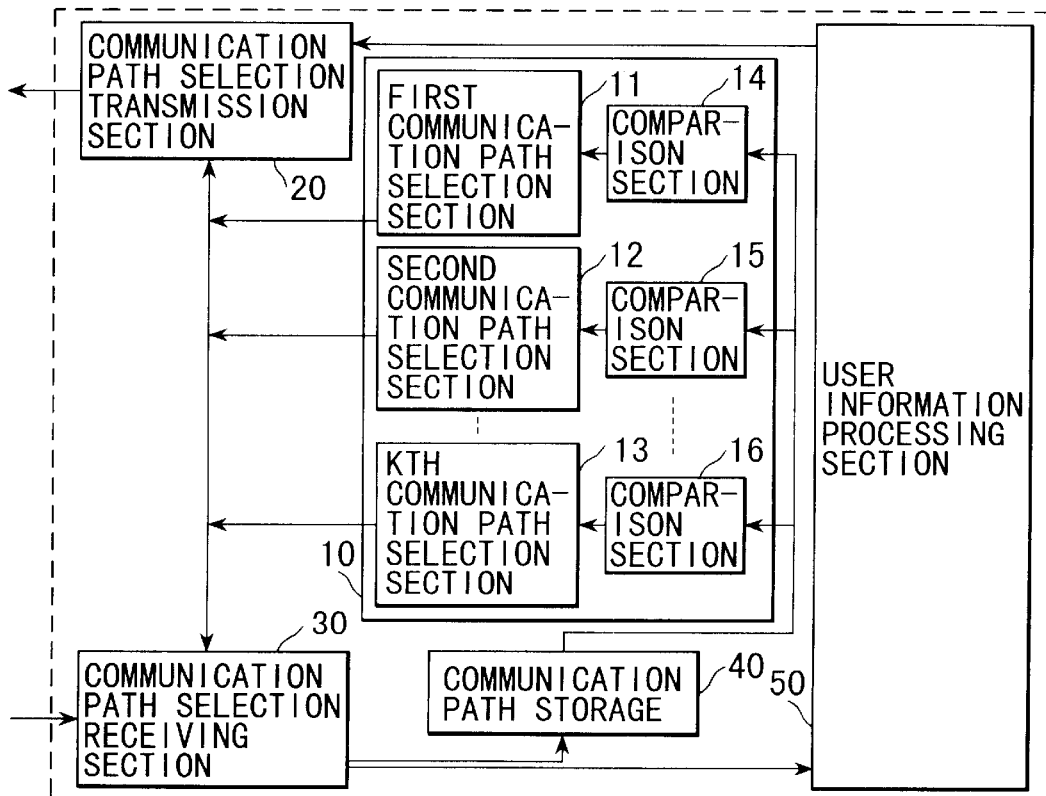
FIG. 44 is a diagram showing a configuration of a communication device according to a 12th embodiment of the invention.

A basic configuration of the communication device 201 is shown in FIG. 44.

The communication device 201 includes a user information processing section 50, a communication path selection section 10, a communication path selection transmission section 20, a communication path selection receiving section 30 and a communication path storage section 40.

The communication path selection section 10 includes a first communication path selection section 11 for selecting the first communication path from a plurality of communication paths on which the present unit is capable of communication, a second communication path selection section 12 for selecting the second communication path, . . ., the kth communication selection section 13 for selecting the kth communication path, and comparator sections 14, 15, . . ., 16. The comparator sections 14, 15, . . ., 16 refer to the information stored in the communication path storage section 40 and determines whether there exist an appropriate number of devices communicable through the communication path selected by the present unit, and if necessary to change, request the first communication path selection section 11, or the like performs such a function to reselect the communication path.

The function of the other parts of the configuration of the device 201 is the same as explained with reference to the tenth and 11th embodiments. Also, unlike in the 12th embodiment in which the basic configuration is that of the 11th embodiment capable of selecting a plurality of communication paths at the same time, the configuration described with reference to the tenth embodiment capable of selecting only a single communication path at a time can be employed as a basic configuration, as specifically described below.

As a first example, refer to the case in which the configuration FIG. 41 described above is employed as the communication path selection receiving section 30.

An information selection section 31 is capable of recognizing as a frame the signal received from a demodulation section for demodulating the signal received from the communication path selected by the communication path selection section 10. In the case where a device ID such as a source address is attached to the frame header, the device ID is stored in the communication path storage section 40 together with the communication path ID as a device capable of communication through the selected communication path.

The signal received from other than the communication path selected by the communication path selection section 10, on the other hand, is not demodulated by the demodulation section. Therefore, the information selection section 31 cannot receive a signal recognizable as a frame from such a demodulation section. By detecting the power change of the demodulation section or in response to the control signal from the demodulation section, however, a present unit can recognize whether or not any devices are present which transmit a signal using a communication path not selected by the present unit. Thus, the binary information on the presence or absence of such a device is stored in the communication path storage section 40 together with the communication path ID.

The first communication path selection section 11, upon selection of a communication path, notifies the ID of the selected communication path to a comparator section 14. The comparator section 14 acquires from the communication path storage section 40 the information on the occupancy rate of the communication path selected by the first communication path selection section 11. In the case where a communication path ID in combination with the occupancy rate or a communication path ID in combination with a device ID is stored in the communication path storage section 40, for example, only the information having the same communication path ID as notified from the first communication path selection section 11 is acquired.

Assume that the comparator section 11 has acquired the information on the occupancy rate of the communication path from the communication path storage section 40, and the judgment is that there are no surrounding devices which are communicating using the communication path selected by the first communication path selection section 11. The first communication path selection section 11 is instructed to reselect a communication path. In the case where the information having the same communication path ID as notified from the first communication path selection section 11 is not stored in the communication path storage section 30 or the communication path ID is stored but the information as to the absence of a device is added, then the first communication path selection section 11 is instructed to reselect a communication path.

Also, in the case where the comparator section 11 has acquired the information on the occupancy rate of the communication path from the communication path storage section 40, and a plurality of devices are present communicating on the communication path selected by the first communication path selection section 11, and the judgment is that a different communication path with a smaller traffic volume can be more efficiently selected, then the first communication path selection section 11 is instructed to reselect a communication path. By acquiring the information having the same communication path ID as notified from the first communication path selection section 11, for example, the number of devices communicating on the communication path can be recognized from the device ID. In the case where the number of the devices exceeds a predetermined threshold value, the first communication path selection section 11 is instructed to reselect a communication path.

The second communication selection section 12 in combination with the comparator section 15 and the kth communication path selection section 13 in combination with the comparator section 16 also have a similar function.

Now, as a second example, explanation will be made about the case in which the communication path selection receiving section 30 is configured as shown in FIG. 42.

The information selection section 31 can recognize as a frame the signals received from all the demodulation sections. In the case where the device ID such as the source address is attached to the header of the frame, the particular device ID is stored in the communication path storage section 40 together with the communication path ID as a device capable of communication through the selected communication path.

The first communication path selection section 11, upon selection of a communication path, notifies the ID of the selected communication path to the comparator section 14. The comparator section 14 acquires the information on the occupancy rate of the communication path selected by the first communication path selection section 11 from the communication path storage section 40. In the case where a combination of the communication path ID and the device ID or a combination of the communication path ID and the number of devices using the communication path are stored in appropriate order, for example, only the information having the same communication path ID as notified from the first communication path selection section 11 is acquired.

Assume that the comparator section 11 judges that as a result of acquiring the information on the occupancy rate of the communication paths from the communication path storage section 40, there exists no device communicating on the communication path selected by the first communication path selection section 11. The first communication path selection section 11 is instructed to reselect a communication path. In the case where the information having the same communication path ID as notified from the first communication path selection section 11 is not stored in the communication path storage section 40 or the information is attached to the effect that the number of devices is zero though a communication path ID is stored, then the first communication path selection section 11 is instructed to reselect a communication path.

Also, in the case where, as a result of acquiring the information on the occupancy rate of the communication path from the communication path storage section 40, the comparator section 11 judges that there are a plurality of devices communicating using the communication path selected by the first communication path selection section 11 and therefore the selection of a different communication path smaller in traffic volume is more efficient, then, the first communication path selection section 11 is instructed to reselect a communication path. Assume, for example, that the information is acquired having the same communication path ID as notified from the first communication path selection section 11 or the number of the devices communicating through the communication path is recognized from the device IDs to determine the number of the devices using a given communication path. In the case where the number of devices exceeds a predetermined threshold, then, the first communication path selection section 11 is instructed to reselect a communication path.

The second communication path selection section 12 in combination with the comparator section 15 and the kth communication path selection section 13 in combination with the comparator section 16, are also assumed to have a similar function.

Now, the operation for reelecting a communication path will be described with reference to FIGS. 49 and 50.

Figure 49:
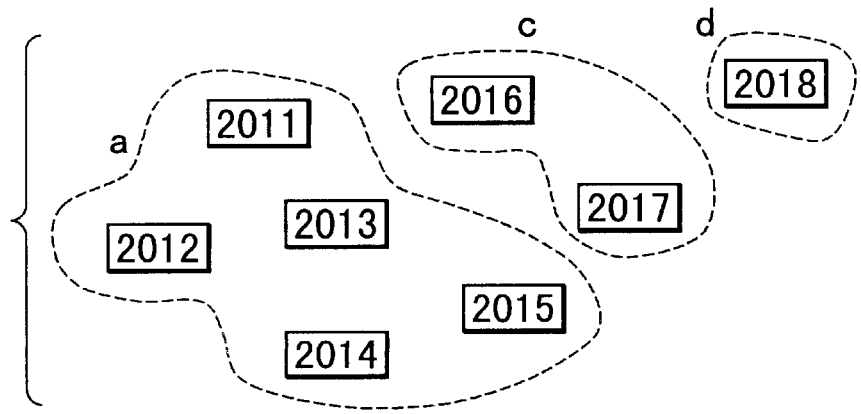
FIG. 49 is a diagram showing an example communication mode of a communication device according to the 12th embodiment of the invention.

As shown in FIG. 49, assume that a plurality of communication devices 201 (2011 to 2018) have selected communication paths, respectively, with the result that devices 2011, 2012, 2013, 2014, 2015 have selected a communication path a, the devices 2016, 2017 have selected a communication path c, and a device 2018 has selected a communication path d. It is also assumed that the threshold level of the number of devices communicable on the same communication path is 3, i.e. that not more than three devices cannot use the same communication path at the same time. Then, when the devices 2014, 2015 decide to use the communication path a later than the devices 2011, 2012, 2013 do, the devices 2014, 2015 reselect a communication path. In the case where the device 2018, upon recognition that there is no other device having selected the same communication path d, reselects a communication path.

Figure 50:
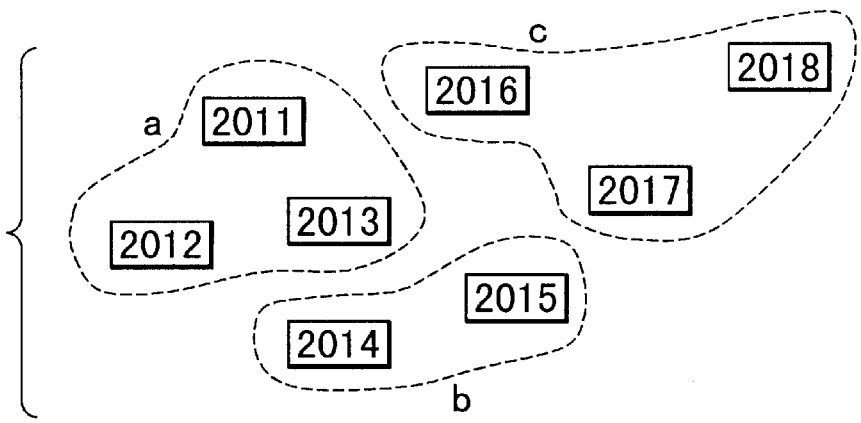
FIG. 50 is a diagram showing another example. communication mode of a communication device according to the 13th embodiment of the invention.

FIG. 50 shows an example of the devices 2014, 2015 reselecting the communication path b and the device 2018 reselecting the communication path c.

As described above, in the case where the communication device 201 according to this invention judges after selecting a communication path for efficient communication, that there is no communicable communication device or there are so many devices using the particular communication path that efficient communication is impossible, then the communication device 201 selects a new communication path to assure an always efficient communication.

[13th Embodiment]

Now, as a 13th embodiment of the invention, explanation will be made about a method of reselecting a communication path in the case where there is no device capable of communication through a selected communication path.

Figure 53:
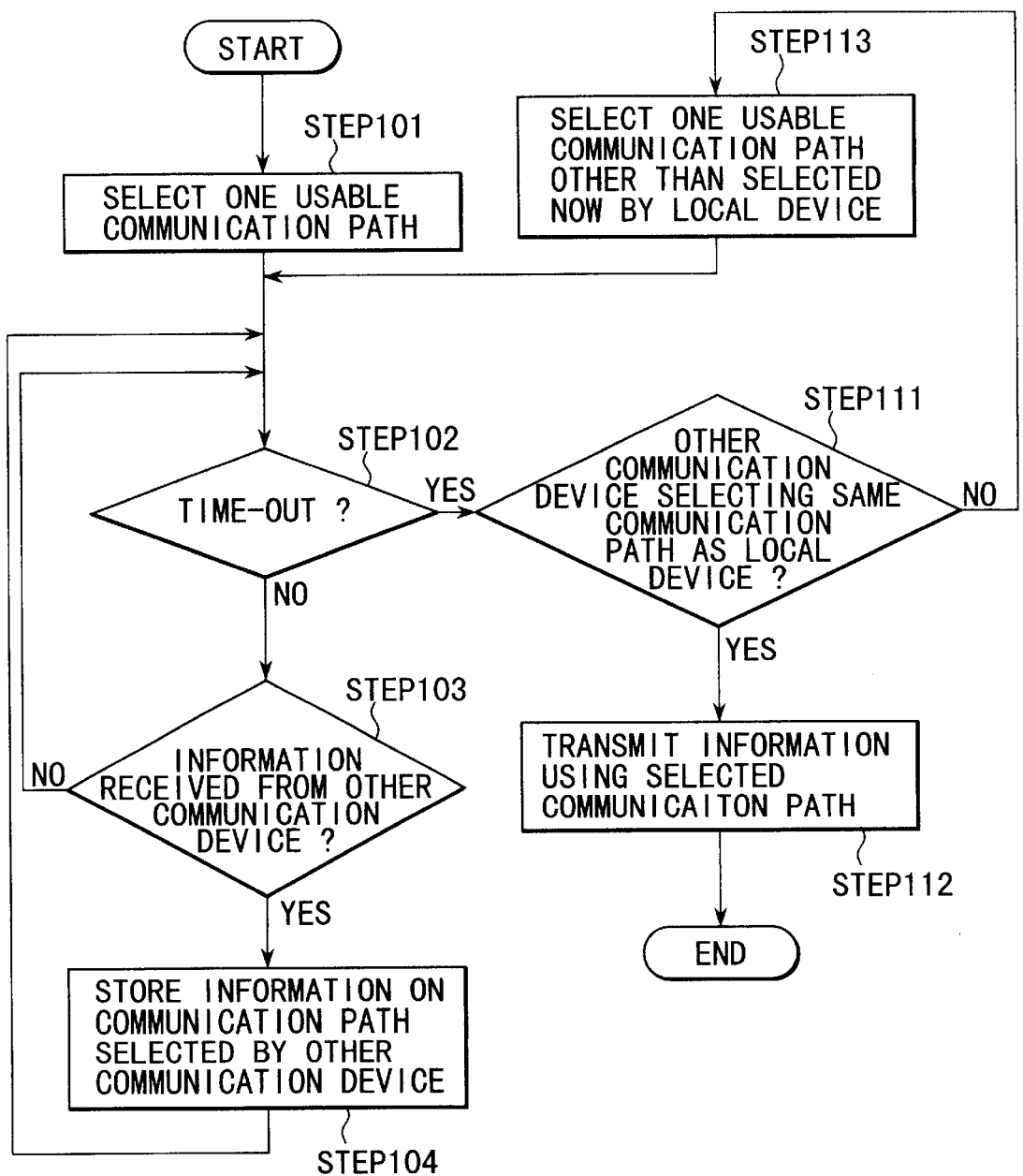
FIG. 53 is a flowchart showing an example procedure for a communication reselection method according to the 13th embodiment of the invention.

A first example operation of communication path reselection will be described with reference to the diagram of FIG. 44 showing a configuration of a communication device and the flowchart of FIG. 53.

The first communication path selection section 11 selects a communicable communication path (step 101), for example. In the process, the comparator section 14 can be notified of the ID information of the selected communication path. Also, the selected communication path is stored to avoid simultaneous selection by the second communication path selection section 12 or the like. A timer set to appropriate time is started. If the information is received by the communication path selection receiving section from other devices before the timer times out (step 103), the fact that the communication path that has received the information is used by other device is recognized, and the information on the communication path occupied is stored in the communication path storage section 40 (step 104). This procedure is repeated until the timer times out. At the time point when the timer times out, the comparator section 14 determines whether there is any device communicating on the communication path selected by the first communication path selection section 11 by comparing with the information on the occupied communication paths stored in the communication path storage section 40 (step 111). In the case where the same ID as that of the communication path selected by the first communication path selection section 11 is stored in the communication path storage section 40 or otherwise there exists a device using the same communication path, the information starts to be transmitted using the selected communication path (step 112). If the judgment is that there is no device using the same communication path as selected by the first communication path selection section 11, on the other hand, then a communication path is reselected one of which is selected by neither the first communication path selection section 11, or the second communication path selection section 12 or the kth communication path selection section 13 (step 113).

Figure 54:
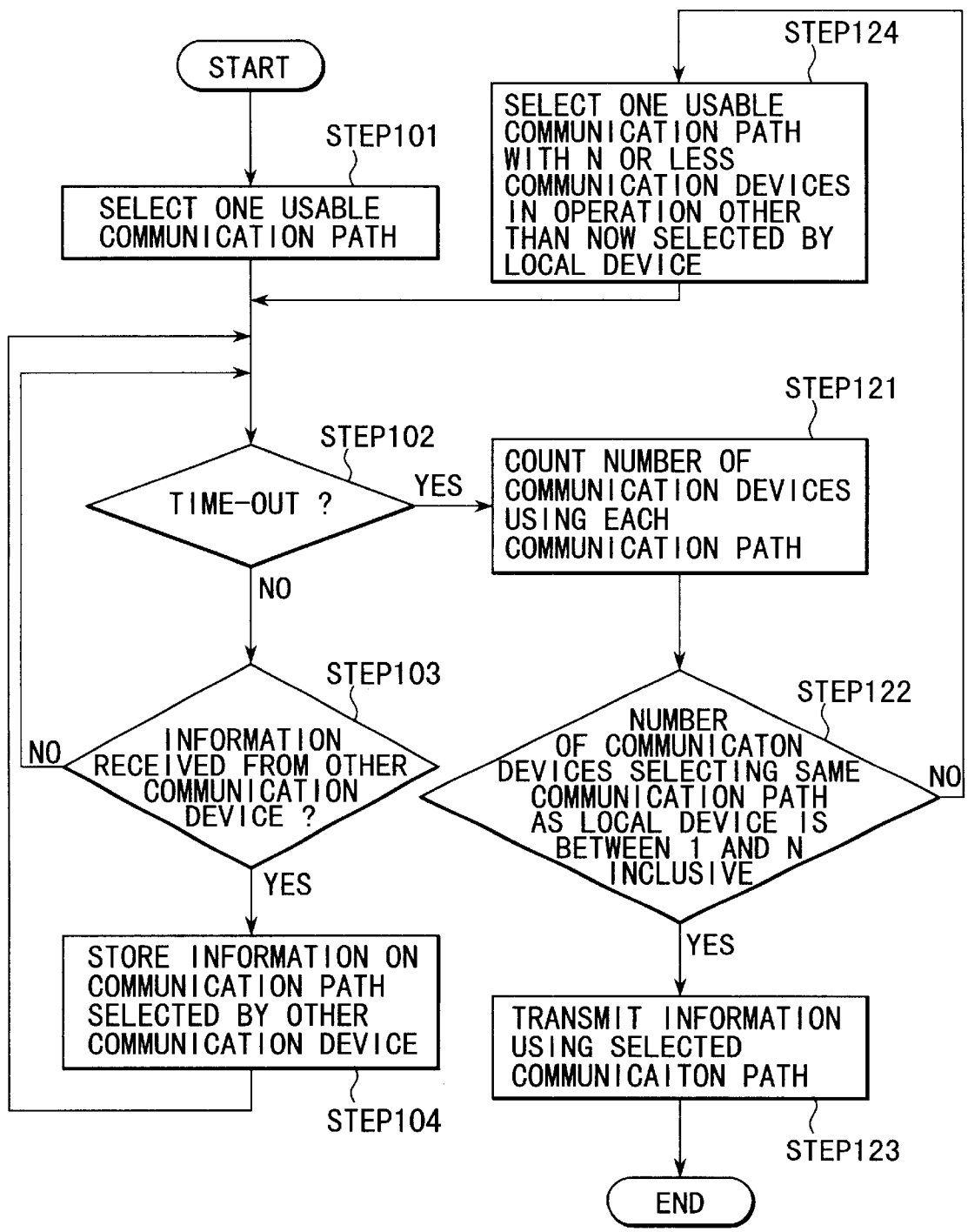
FIG. 54 is a flowchart showing another example procedure for a communication reselection method according to the 13th embodiment of the invention.

Now, a second example operation of communication path reselection will be explained with reference to the diagram of FIG. 44 showing a configuration of a communication device and the flowchart of FIG. 54.

Assume, for example, that the first communication path selection section 11 selects a usable communicable path (step 101). In the process, the comparator section 14 may be notified of the ID information of the selected communication path. Also, the selected communication path is stored not to be selected by the second communication path selection section 12 or the like at the same time. A timer set to a predetermined time is started. If the information is received by the communication path selection receiving section from other devices before time-out (step 103), the use by other devices of the communication path of which the information has been received is recognized, and the information on the occupied communication path is stored in the communication path storage section 40 (step 104). This process is repeated until the timer times out. At the time point of time-out, the comparator section 14 or the communication path storage section 40 counts the number of the devices using each communication path based on the communication path occupancy information stored in the communication path storage section 40 (step 121). The comparator 14 counts the number of devices using each communication path by itself or acquires from the communication path storage section 40 the number of devices using each communication path stored therein. In this way, the number of devices communicating through the communication path selected by the first communication path selection section 11 is determined, thereby judging whether the number of other communication devices using the communication path selected by the first communication path selection section 11 is between 1 and N inclusive (step 122). In the case where the number of the devices using the communication path selected by the first communication path selection section 11 is between one and N inclusive, the information starts being transmitted using the selected communication path (step 123). In the case where there is no device or not less than N devices using the same communication path as selected by the first communication path selection section 11, then a communication path is reselected one of which is not selected by the first communication path selection section 11 and which has not been selected by the second communication path selection section 12, the kth communication path selection section 13 or the like where the number of devices using the communication path is not more than N (step 124). The limit N of the number of devices is predetermined, and the number of the devices using a given communication path is limited in order to prevent the deterioration of the transmission efficiency with the increase in the number of devices.

According to this method, the communication device described with reference to the 12th embodiment, which has selected a communication path but judges that there is no device communicable using the selected communication path, can reselect the same communication path as selected by a different communication device and thereby can find a communicable communication device.

[14th Embodiment]

A communication device 202 according to the 14th embodiment of the invention will be explained below with reference to FIGS. 45 and 46.

The embodiment will be described with reference to a configuration in which the data received from a selected communication path can be transmitted to another selected communication path.

Figure 45:
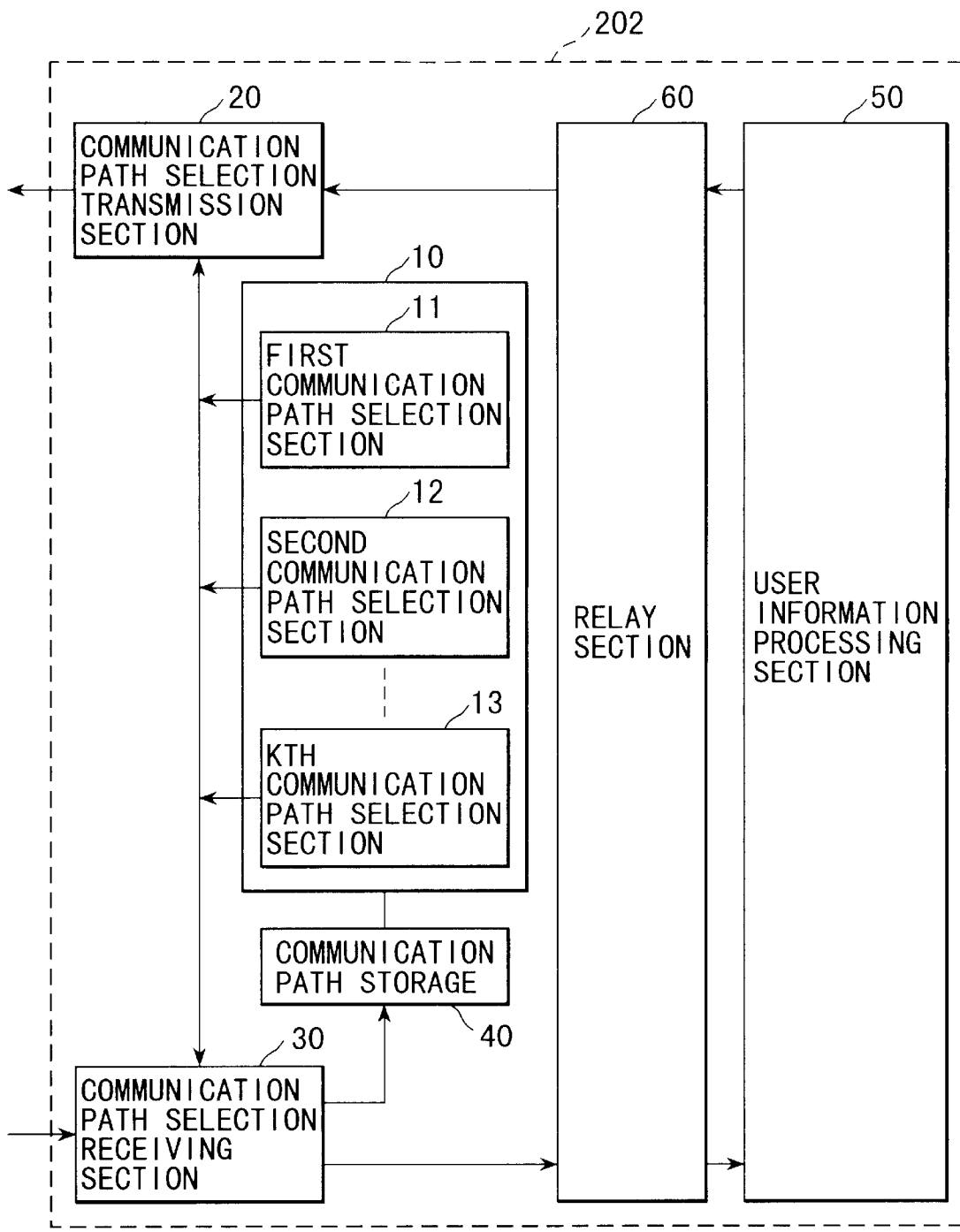
FIG. 45 is a diagram showing a general configuration of a communication device according to a 14th embodiment of the invention.

A basic configuration of the communication device 202 is shown in FIG. 45.

The communication device 202 includes a user information processing section 50, a communication path selection section 10, a communication path selection transmission section 20, a communication path selection receiving section 30, a communication path storage section 40 and a relay section 60.

In the case where the communication path selection section 10 selects a plurality of communication paths, the relay section 60 performs such a function that the data received from a given communication path and input from the communication path selection receiving section 30 is input to the communication path selection transmission section 20 for transmission to another selected transmission path. Also, according to the present embodiment, the transmission data input from the user information processing section 50 is output to the communication path selection transmission section 20, and the receiving data input from the communication path selection receiving section 30 is output to the user information processing section 50.

The functions of the remaining components in the configuration of the communication device 202 are similar to those of the corresponding parts described in the 12th embodiment.

The general operation of the relay function of the relay section 60 will be explained with reference to FIG. 45.

In the communication selection section 10, suppose that the first communication path selection section 11, the second communication path selection section 12 and the kth communication path selection section 13 have selected the communication path a, the communication path b and the communication path c, respectively. The communication path selection section 10 notifies the relay section 60 of the three communication paths thus selected.

The relay section 60, upon receipt of the data from the communication path a by way of the communication path selection receiving section 30, transfers the received data to the communication path selection transmission section 20 for transfer to the communication paths b, c. In similar fashion, the data received from the communication path b by way of the communication path selection receiving section 30 is transferred to the communication path selection transmission section 20 for transfer to the communication paths a, c. So are the data from the communication path c transferred to the communication path selection transmission section 20 for transfer to the communication paths a, b.

Even the communication devices which failed in an attempt to select a communication path for efficient communication and between which direct communication is impossible can communicate, though indirectly, due to the presence of a device having the relay function as described above.

An application to PHS will be described as an effect of the invention. The radio transmission/receiving function of PHS can use four communication channels (Ch1, Ch2, Ch3, Ch4) time-divided by TDMA/TDD (time division multiple access/time division duplex). In the conventional PHS, however, only two communication devices can conduct one-to-one communication through a communication channel. In other words, only two devices can use a communication channel at a time. In an application of the present invention to the devices A, B, C, D having the PHS radio transmission/receiving function, on the other hand, each device attempts to select one of the communication channels Ch1 to Ch4 at random. It is thus possible that A and B automatically select Ch1, and C and D Ch2, for example. Further, B and C separately select Ch3 as a relay communication channel. In this way, the four communication devices A, B, C, D can exchange data, though indirectly.

As another effect of the invention, an application to a radio LAN transmission/receiving system will be explained. In some of the existing radio LAN transmission/receiving systems, the user sets and registers a parameter in advance so that, due to the filtering function of the radio LAN transmission/receiving system, a plurality of independent communication channels can be used as viewed from the user in spite of the fact only one frequency band is used. In such a case, each communication device sets an address appropriately, and thus can prevent the system breakdown which otherwise might be caused by an excessively increased number of devices using a single communication channel. The parameter for discriminating the communication channel usable by a present unit, however, must be set and registered by the user. When this invention is applied to the devices having such a radio LAN transmission/receiving system, on the other hand, each device attempts to select a parameter at random for determining the communication channel to be used. As a result, the number of devices using each communication channel is automatically limited to an appropriate number. Also, it is possible for devices using different communication channels to exchange data, though indirectly, by selecting a parameter for determining a new relay communication channel in at least one-to-one relation.

Now, a detailed configuration example of the communication device 202 according to this embodiment constituting a communication device 203 will be explained.

Figure 46:
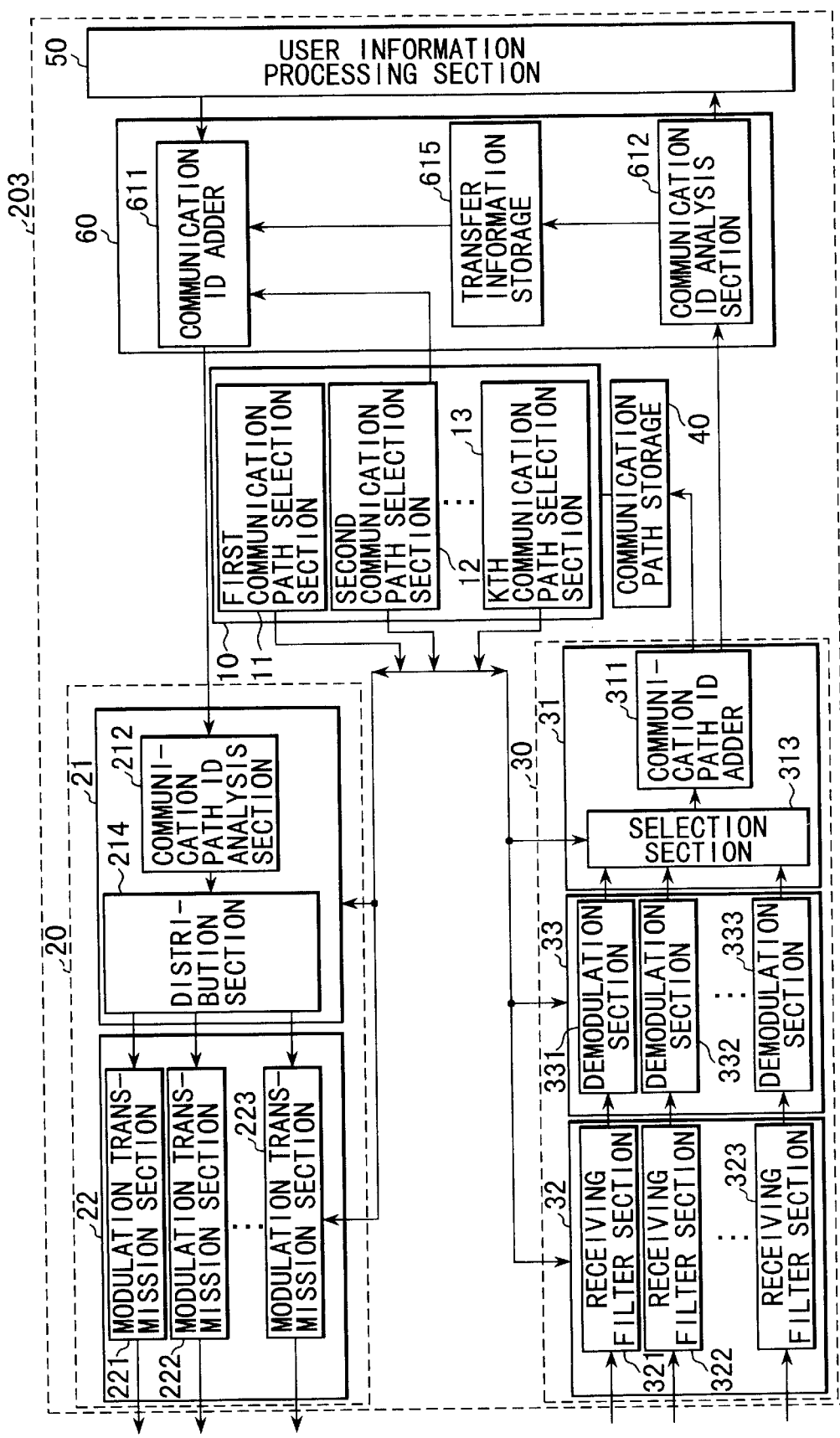
FIG. 46 is a diagram showing a specific configuration of a communication device according to a 14th embodiment of the invention.

FIG. 46 is a diagram showing a configuration of the communication device 203.

A communication path determining section 21 of a communication path selection transmission section 20 includes a communication path ID analysis section 212 and a distribution section 214. An information selection section 31 of a communication path selection receiving section 30 includes a communication path ID adder 311 and a selection section 313.

A relay section 60 includes a communication path ID adder 611, a communication path ID analysis section 612 and a transfer information storage section 615.

The communication path selection section 10, upon selection of a communication path, delivers the ID of the selected communication path to the communication path ID adder 611 of the relay section 60. The communication path ID adder 611 stores the communication path ID input thereto.

The data received by the communication path selection receiving section 30 is subjected to the judgment as to whether it is received from the communication path selected by the communication path selection section 10 through the selection section 313, after which it is input to the communication path ID adder 311. The communication path ID adder 311, when supplied with the data received from the selected communication path, adds the ID of the communication path and applies it to the communication path ID analysis section 612 of the relay section 60.

The communication path ID analysis section 612, upon application of data thereto, outputs it to the user information processing section 50. Before the data is applied to the user information processing section 50, the communication path ID added by the communication path ID adder 311, if not required, is removed.

The communication path ID analysis section 612, on the other hand, outputs the data input thereto to the communication path ID adder 611. In the process, the data delivered from the communication ID analysis section 612 to the communication path ID adder 611 may temporarily be stored in the transfer information storage section 615.

The communication path ID adder 611 can identify the communication path through which data has been received, from the communication path ID added to the data acquired from the communication path ID analysis section 612 or the data acquired from the transfer information storage section 615.

The communication path ID adder 611, in order to transfer the data to another selected communication path, removes the communication ID attached thereto. Then, an ID of another selected communication path than the communication path through which data has been received is added by being selected from the IDs of the selected communication paths notified from the communication path selection section 10, and input to the communication path ID analysis section 212 of the communication path selection transmission section 20. In the case where a plurality of communication path IDs exist to be added to the, data transferred, a plurality of copies of the data may be added to different communication path IDs respectively or other synthesized communication path IDs indicating a plurality of communication path IDs may be added. In the case where a synthesized communication path ID is added by the communication path ID adder 611, however, an arrangement is required for permitting the communication path ID analysis section 212 of the communication path selection transmission section 20 to recognize the synthesized communication path ID.

The communication path ID analysis section 212 of the communication path selection transmission section 20 analyzes the communication path ID indicating the desired communication path added to the data input by the communication path ID adder 611 of the relay section 60. The data for which the transmission path is recognized by the communication path ID analysis section 212 is input to the distribution section 214 and further to an appropriate modulation transmission section.

The data input to the communication path ID adder 611 of the relay section 60 from the user information processing section 50, on the other hand, has added thereto the ID of the selected communication path notified from the communication path selection section 10 and input to the communication path ID analysis section 212 of the communication path selection transmission section 20. In the case where there are a plurality of communication IDs added to the transferred data, they can be unified into a single ID.

In the case where the data delivered from the communication path ID analysis section 612 to the communication path ID adder 611 is stored in the transfer information storage section 615, the data individually received may be unified or otherwise processed appropriately in order to efficiently transfer them.

The user information processing section 50 receives the data together with the communication path ID from the communication path ID analysis section 612 of the relay section 60, and thus can recognize the communication path through which the data has arrived. Also, assume that a control signal designating a communication path for transmission is input when delivering the data to the communication path ID adder 611 of the relay section 60. Thus the communication path ID adder 611 can operate to add a designated communication path ID in such a manner that the communication path selection transmission section 20 can transmit the data only from the communication path thus designated.

Also, the user information processing section 50 can be supplied with a control signal instructing the communication path ID adder 611 of the relay section 60 to transfer the data received from the communication path a only to the communication path b, the data received from the communication path b to the communication paths a and c and the data received from the communication path c not to other communication paths.

The relay section 60 can be realized as a functional section of the user information processing section 50.

[15th Embodiment]

Now, explanation will be made about a method of information transfer in which the data received from a given selected communication path is transmitted to another selected transmission path.

Figure 55:
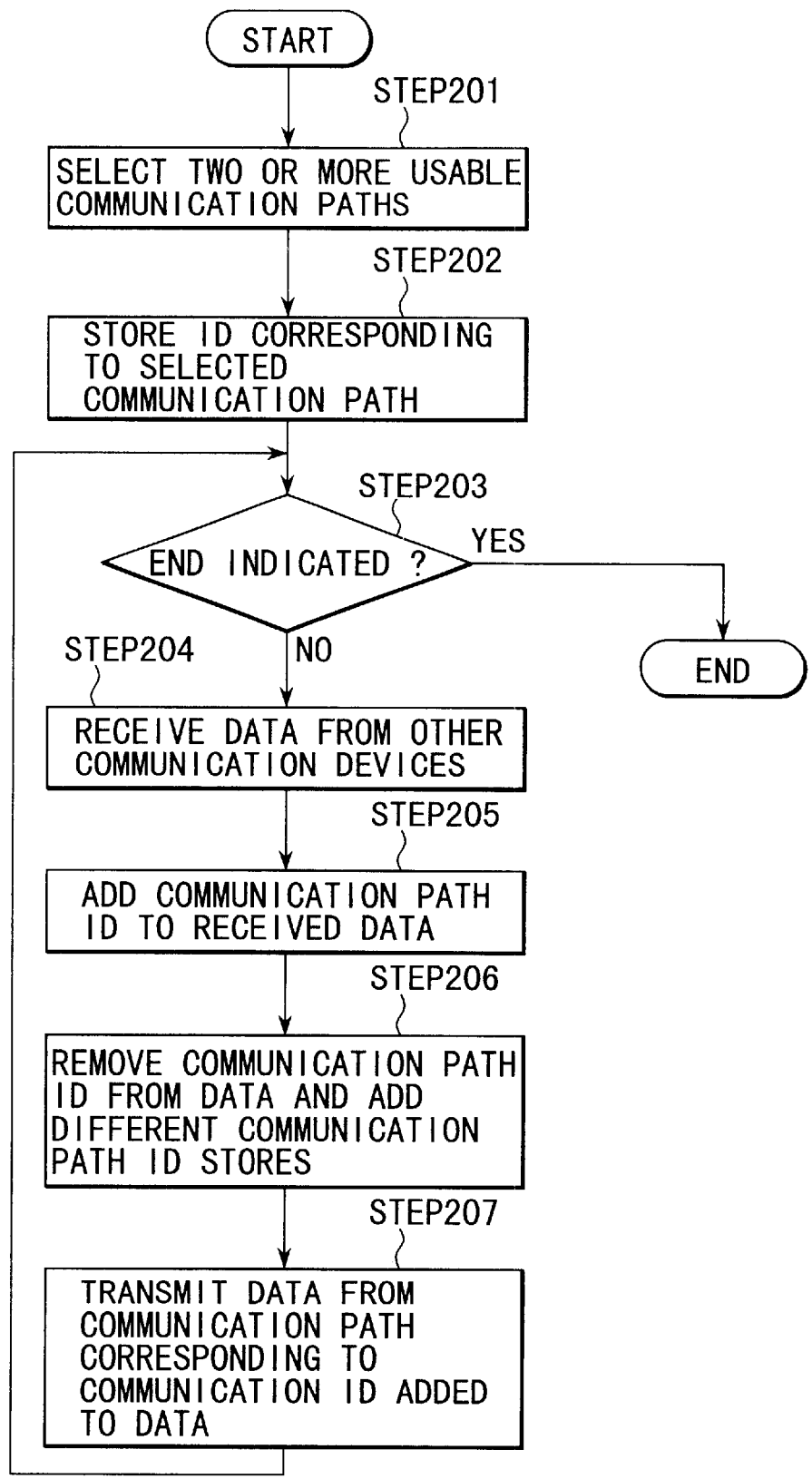
FIG. 55 is a flowchart showing the operation of a relay section used in the 15th embodiment of the invention.

An example operation of information transfer will be explained with reference to the diagram of FIG. 46 showing a configuration of the communication device and the flowchart of FIG. 55.

For example, the communication selection section 10 is assumed to have a first communication path selection section 11 to a kth communication path selection section 13. In a communication device capable of selecting k different communication paths, suppose that the first communication path selection section 11 selects the communication path a and the second communication path selection section 12 selects the communication path b (step 201). It is assumed that the communication path a and the communication path b are different from each other. The first communication path selection section 11 notifies the information (ID) for identifying the selected communication path a, and the second communication path selection section 12 notifies the ID of the selected communication path b, to the communication path ID adder 611 of the relay 60 whereby they are stored (step 202). While waiting for receiving the information transmitted by other devices in the absence of the instruction to end the operation for information transfer (step 203), upon receipt of the information at the communication path selection receiving section 30 (step 204), the communication path ID adder 311 adds the ID of the communication path through which the data is received (step 205) to the data received, and delivers it to the communication path ID analysis section 612 of the relay section 60. The communication path ID analysis section 612 delivers the data with the communication path ID added thereto to the communication path ID adder 611 of the relay section 60. In the process, the data may be delivered after being temporarily stored in the transfer information storage section 615. Also, the transfer information storage section 615 can process the data in such a manner that a plurality of data to which the same communication path ID is attached can be unified and a communication path ID is added to it. The communication path ID adder 611 of the relay section 60, upon receipt of the data with the communication path ID added thereto, checks the added communication path ID and removes it. After that, an ID different from the one thus far added is added from among the stored communication path IDs selected by the communication path selection section 10, and the data is delivered to the communication path ID analysis section 212 of the communication path selection transmission section 20 (step 206). The communication path ID analysis section 212 of the communication path selection transmission section 20 checks the communication path ID added to the data received, and performs the processing to transmit the data from a particular communication path (step 207). This information transfer procedure is repeated until the end is designated (step 203).

In the case where the communication path selection section 10 has selected three or more communication paths, the communication path ID adder 611 checks and removes the communication path ID added to the data received from the communication path ID analysis section 612, and can add a plurality of other communication path IDs in store or produce a plurality of copies of the data to which different communication path IDs can be added, respectively. Further, another synthesized communication path ID indicating a plurality of communication path IDs may be added. In the case where the communication path ID adder 611 adds a synthesized communication path ID, however, it is necessary that the communication path ID analysis section 212 of the communication path selection transmission section 20 can also recognize the synthesized communication path ID.

According to the method described with reference to this embodiment, the communication devices that have selected communication paths (the communication devices according to the 14th embodiment) communicable with the device group 1 and the device group 2, respectively, between which direct communication thus far has been impossible for different communication paths selected, transfer the data received from the device group 1 to the device group 2 or vice versa. Therefore, the device group 1 and the device group 2 can communicate indirectly with each other.

[16th Embodiment]

Now, an explanation will be given of the communication mode according to the 16th embodiment of the invention, in which the communication device 100 explained in the tenth embodiment coexists with the communication device 202 having the relay section described in the 14th embodiment.

Figure 51:
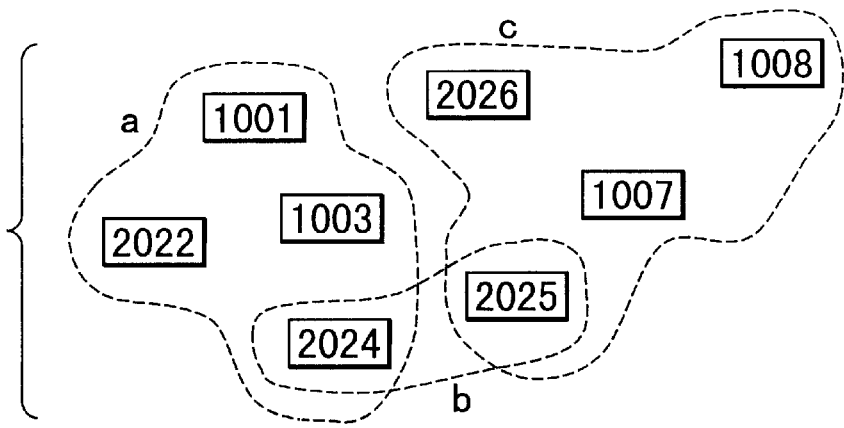
FIG. 51 is a diagram: showing an example communication mode of a communication device according to a 16th embodiment of the invention.
Figure 52:
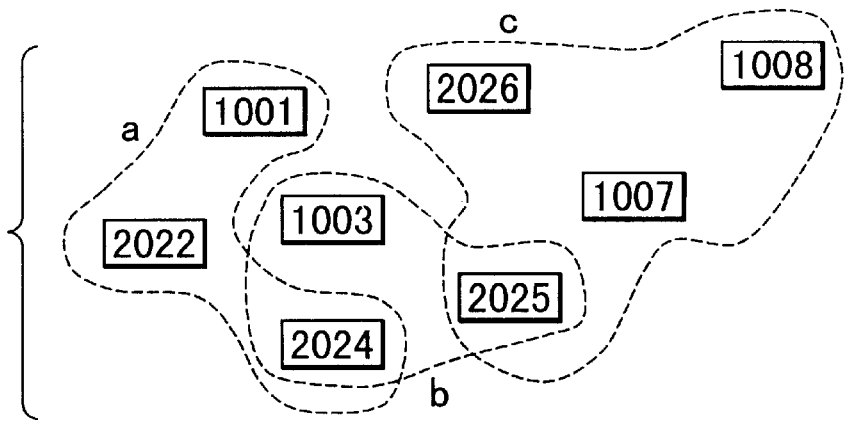
FIG. 52 is a diagram showing another example communication mode of a communication device according to the 16th embodiment of the invention.

FIGS. 51 and 52 show an example of communication mode in which the communication device 100 and the communication device 202 coexist with each other.

FIGS. 51 and 52 show the state in which the communication devices 1001, 1003, 1007, 1008 capable of selecting only one communication path for simultaneous communication coexist with the communication devices 2022, 2024, 2025, 2026 capable of selecting a plurality of communication paths for simultaneous communication.

In FIG. 51, assume that the communication devices 1001, 2022, 1003, 2024 have selected the communication path a, and that the communication devices 2025, 2026, 1007, 1008 have selected the communication path c. Since devices with different communication paths selected cannot communicate directly with each other, the devices 1001 and 1008 cannot communicate. Assume that the devices 2024 and 2025 select the second communication path b. The device 2024 operates in such a manner that the data are exchanged between the communication path a and the communication path b, and the device 2025 operates so that the data are exchanged between the communication path c and the communication path b. Thus the device that has selected the communication path a and the device that has selected the communication path c can communicate indirectly with each other.

In FIG. 52, the mere fact that the communication devices 1001, 2022, 2024 select the communication path a, the communication device 1003 selects the communication path b and the communication devices 2025, 2026, 1007, 1008 select the communication path c cannot permit devices having selected different communication paths to communicate directly with each other. Thus the device 1001 cannot communicate with the device 1008, and the device 1003 that is the only device that has selected the communication path b cannot communicate with any other devices. Further, the devices 2024 and 2025 select the second communication path b, and the device 2024 exchange data between the communication paths a and b, while the device 2025 works to exchange data between the communication paths c and b. Thus, the device that has selected the communication path a and the device that has selected the communication path c can communicate indirectly with each other. As to the device 1003, on the other hand, not only direct communication is possible with the devices 2024 and 2025 that have selected the communication path b but also indirect communication is possible with the devices that have selected the communication path a or b.

According to this embodiment, a communication system is illustrated in which the communication device 100 explained in the tenth embodiment coexists with the communication device 202 having the relay section explained in the 14th embodiment and in which the communication device 100 has selected the same communication path as the communication device 202. Further, a communication device can coexist which has no function of communication path selection and can transmit or receive data only through a single communication path. In such a case, however, the communication device 202 is required to select a communication path which is the sole path in which a communication device having no function of communication path selection can transmit or receive data.

[17th Embodiment]

Now, a 17th embodiment of the invention will be explained with reference to FIGS. 56 to 58.

In the case where communication devices 301, 302, 303 coexist, assume that each device selects a communication path and data can be transferred between a plurality of communication paths selected by the communication device 303 so that data transfer is possible between all the devices. In this case, according to the embodiment, one or more communication communicable devices are grouped, and in order to multicast data efficiently to the devices belonging to the group, a new dedicated communication path can be assigned to the group.

Figure 56:
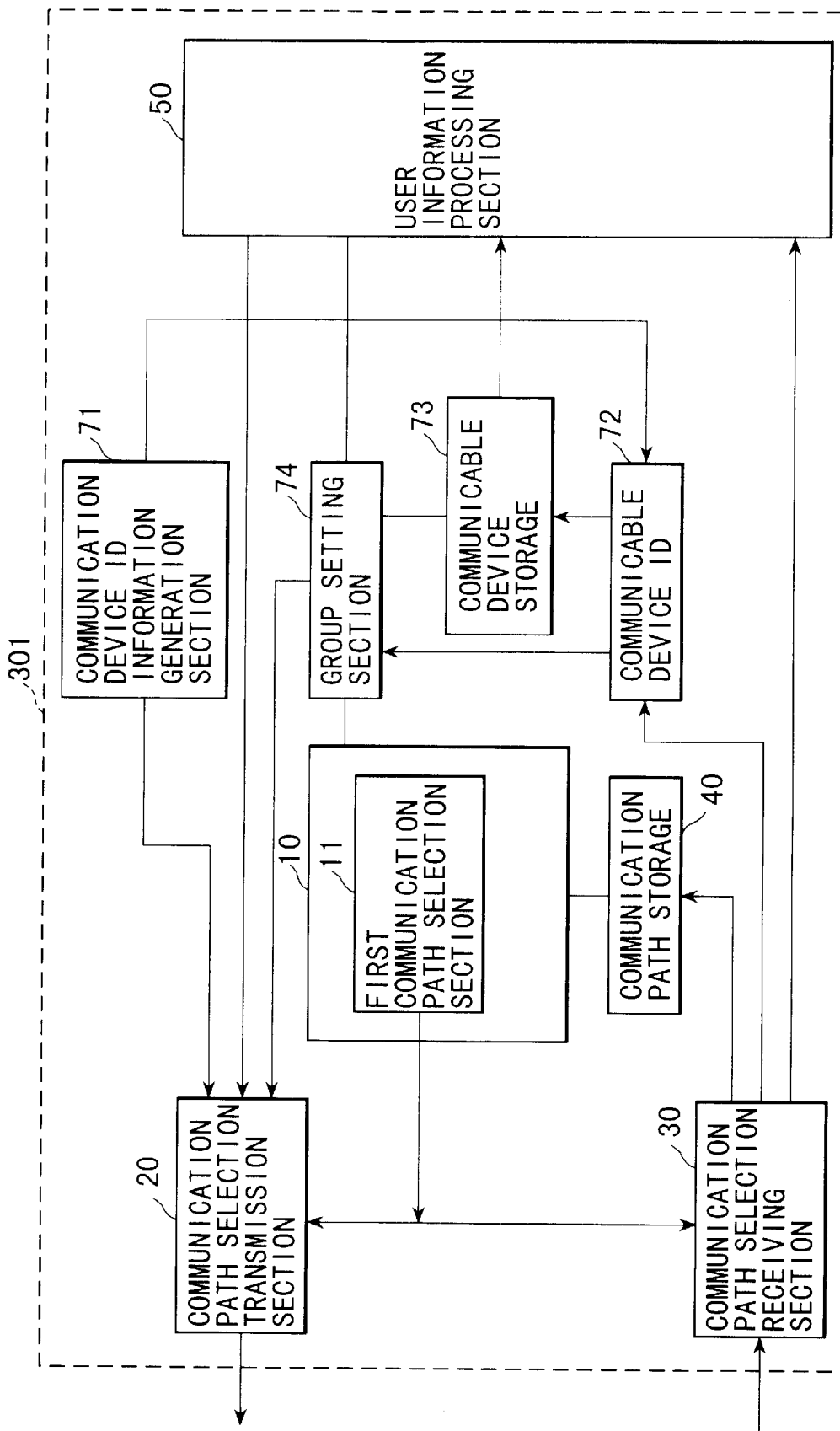
FIG. 56 is a diagram showing an example configuration of the communication device according to a 17th embodiment of the invention.
Figure 57:
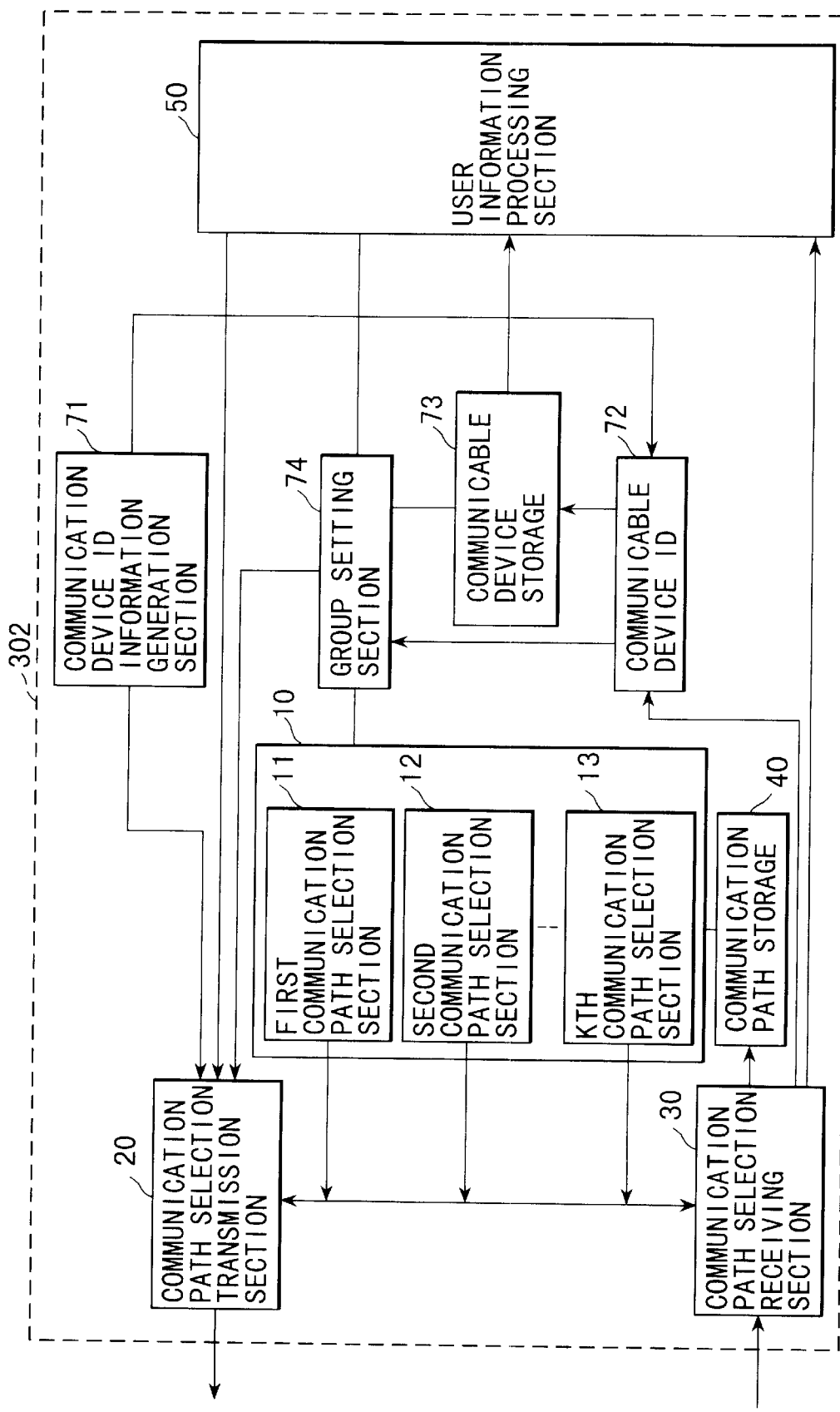
FIG. 57 is a diagram showing another example configuration of the communication device according to the 17th embodiment of the invention.
Figure 58:
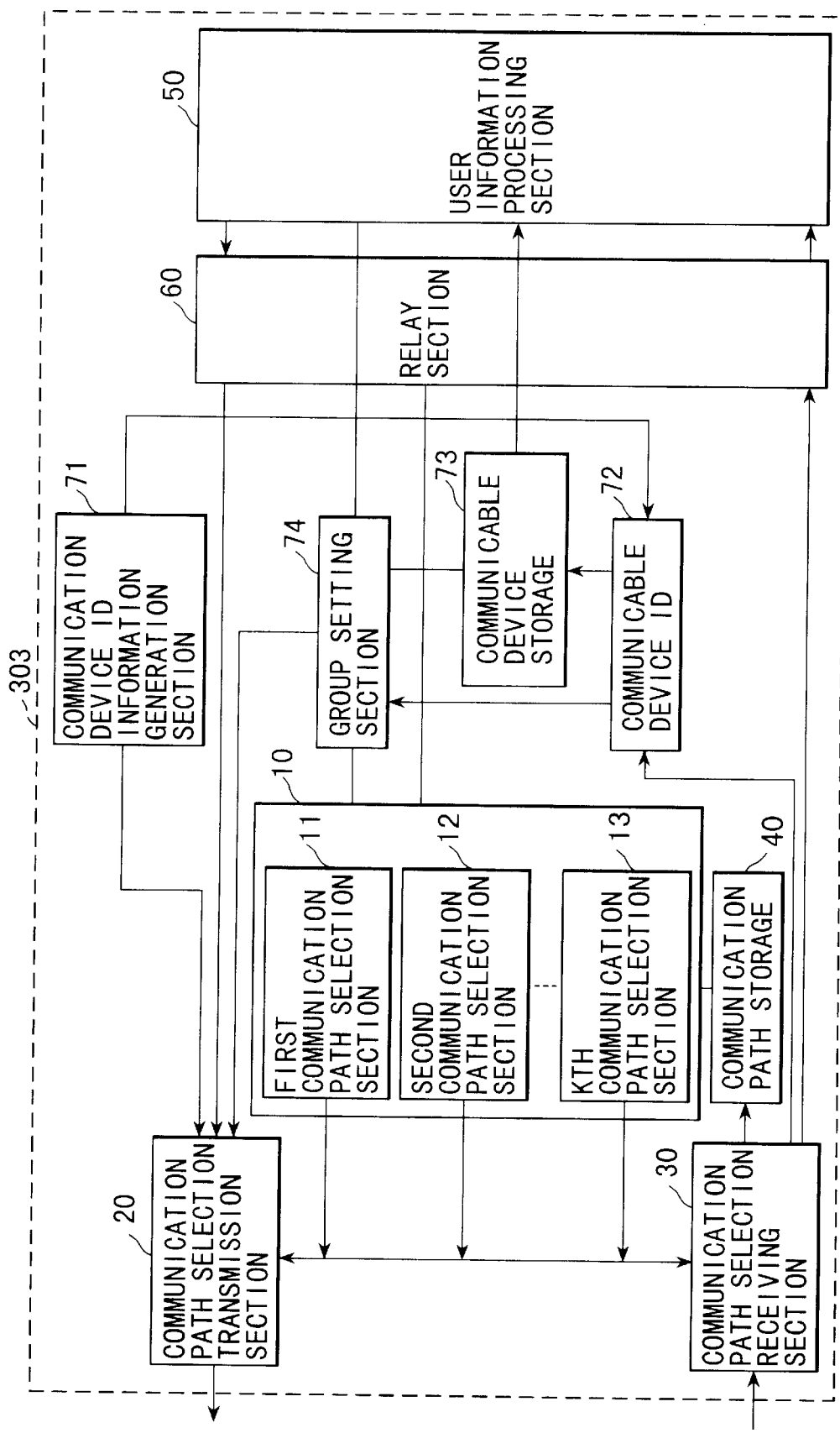
FIG. 58 is a diagram showing still another example configuration of the communication device according to the 17th embodiment of the invention.

FIG. 56 shows a basic configuration of the communication device 301, FIG. 57 a basic configuration of the communication device 302, and FIG. 58 a basic configuration of the communication device 303.

The communication devices 301, 302, 303 each include a communication device ID information generating section 71, a communicable device identification section 72, a communicable device storage section 73 and a group setting section 74 as component elements. The remaining component elements are similar to corresponding component elements of the communication device 100, 200 or 202 shown in the tenth to 16th embodiments.

Now, explanation will be given of the functions of the communication device ID information generating section 71, the communicable device identification section 72, the communicable device storage section 73 and the group setting section 74.

[Function of Recognizing Communicable Device]

The communication device ID information generating section 71 generates the ID information for identifying a present unit and outputs it to the communication path selection transmission section 20 in order to regularly communicate with other communication devices using a communication path already selected. Also, the ID information thus generated is also notified to the communicable device identification section 72.

The information received by the communication path selection receiving section 30 which is transmitted by other communication devices is input to the communicable device identification section 72, with the result that it is recognized as the ID information transmitted by other communication devices and the communication devices that have acquired the ID information are stored in the communicable device storage section 73 as communicable devices.

The communicable devices stored in the communicable device storage section 73 are output to the user information processing section 50.

The above-mentioned function enables the communication devices 301, 302, 303 to recognize the devices with which the present unit can communicate.

[Group Setting Function for Communicable Devices]
(Group Setting Request Transmission Function)

Upon application of an instruction from the user information processing section 50 to the group setting section 74 to set one or more communicable devices as a group, the group setting section 74 notifies the communication path selection section 10 to select a new communication path capable of communication only between the devices belonging to the same group.

The communication path selection section 10, upon receipt of notification from the group setting section 74 to select a new dedicated communication path capable of communication only between the devices belonging to the group, permits the communication device 301, for example, to select a communication path not occupied by other devices and thus changes the selected original communication path. For the communication devices 302, 303 which can select a plurality of communication paths, a new communication path can be additionally selected without changing the currently-selected communication path. Upon selection of a dedicated communication path for the group, the communication path selection transmission section 20 and the communication path selection receiving section 30 are notified to permit transmission and receiving of data using the particular communication path. At the same time, the group setting section 74 is notified of the ID information of the new selected communication path and, when a communication path is reselected, of the ID information of the originally selected communication path.

The group setting section 74, upon receipt of the ID information of the communication path selected for group communication, stores it in relation to the information of the devices belonging to the group designated by the user information processing section 50. At the same time, a group setting request signal containing the information on the devices belonging to the group and the communication path for the group is input to the communication path selection transmission section 20 in order to transmit it to the communication path newly selected by the communication path selection section 10 for the group communication. Also, the user information processing section 50 is notified of the ID information of the communication path selected for group communication.

In the user information processing section 50, the ID information of the communication path selected for group communication is added to the data transmitted for group communication, so that the data are transmitted from the exclusive communication path of the communication path selection transmission section 20.

(Group Setting Request Receiving Function)

The group setting request signal received by the communication path selection receiving section 30 from a communication path not selected by the present unit is input to the communicable device identification 20 section 72. As a result, the group setting signal is recognized as the one transmitted from other communication devices, and in the case where the group setting signal contains the ID information of the present unit, the information on the set group is output to the group setting section 74.

The group setting section 74, upon receipt of the group setting information from the communicable device identification section 72, stores the devices belonging to the group and the information on the communication path for the group, and notifies the communication path selection section 10 to select a communication path designated for communication of the particular group.

The group setting section 74, upon receipt from the communication path selection section 10 of the ID information of the newly selected communication path and the ID information of the originally selected communication path for communication path reselection, the information on the devices belonging to the group and the communication path for the group is notified to the user information processing section 50.

(Group Setting Response Transmission Function)

The group setting section 74, upon receipt of a notification of the approval for group setting from the user information processing section 50, inputs a response signal indicating the completion of group setting to the communication path selection transmission section 20 in order in order to send it the communication paths newly selected by the communication path selection section 10 for group communication.

After that, the ID information of the communication path selected for group communication is added by the user information processing section 50 to the data transmitted for group communication. Thus the signal is processed in such a manner that the communication path selection transmission section 20 transmits it from an exclusive communication path.

The group setting section 74, on the other hand, upon receipt of a negative notification for group setting, inputs a response signal indicating the rejection of group setting to the communication path selection transmission section 20 in order to transmit it to the communication path newly selected by the communication path selection section 10 for group communication. Also, the stored information on the devices belonging to the group and the communication path for group communication are deleted, and the communication path selection section 10 is notified to select the originally selected communication path.

(Group Setting Response Receiving Function)

The group setting response signal received by the communication path selection receiving section 30 from a communication path selected by a present unit is input to the communicable device identification section 72. As a result, the signal is recognized as the group setting response signal transmitted by other communication devices and input to the group setting section 74.

Assume that the group setting section 74 fails to receive a group setting response signal for approving the group setting from any devices belonging to the group to which a group setting request signal is issued or receives a group setting response signal rejecting the group setting from all the devices, then the user information processing section 50 is notified that the group setting is rejected. At the same time, the stored information on the devices belonging to the group and the communication path for the group are deleted and the communication path selection section 10 is notified to select the originally selected communication path.

SPECIFIC EXAMPLES

Assume, for example, that communication devices 3001 to 3009 are existent and represent any one of the devices 301, 302, 303. In the case where the device 3001 sets the devices 3002 and 3003 as a group and G1 as a communication path for the group communication. A group setting request signal to the effect that the devices 3001, 3002, 3003 belong to one group and the communication path assigned to this group is G1 is transmitted from the communication path selection transmission section 20 to the communication path G1.

Upon receipt of the group setting request signal to the effect that the devices 3001, 3002, 3003 belong to a single group and that the communication path for group communication is G1, the user information processing section of the device 3002 recognizes that the communication path for group communication is G1 from the request that has come from the device 3001 for setting a group of the present unit and the device 3003. When the user information processing section of the device 3002 approves the group setting request, the group setting response signal is transmitted from the communication path selection transmission section 20 to the communication path G1.

As described above, the group setting is performed by each device. After that, the communication between the devices belonging to a group can be conducted using a communication path newly selected for group communication, and therefore an efficient intragroup communication becomes possible free of interference from the devices not belonging to the particular group.

According to the above-mentioned tenth to 17th embodiments, even in the case where a plurality of devices are existent, a network is constructed in such a manner that each device is adapted to select one communication path and is unable to communicate directly with the devices that have selected different communication paths. In this way, the number of devices communicating using a communication path at the same time can be reduced. Assume, for example, that N devices are existent and one communication path is selected at random from k communication paths available for selection by each device. The average number of devices using a communication path is N/k. As compared with the case where one communication path is used by N devices, therefore, the probability of system breakdown can be maintained low with the increase in the number of devices. Also in comparison with the communication devices having no function of selecting a communication path, the number of devices is reduced which communicate using one communication path at a time, thereby improving the communication efficiency between the devices that have selected the same communication path. In addition, the use of a storage device for storing as to whether or not other communication paths are occupied by other devices makes it possible to transmit a control signal only to the communication paths used by other devices as the need arises to transmit it to the devices that have selected other communication paths. Thus, the efficiency is improved as compared with the case where a control signal is transmitted to all the communication paths.

Also, in view of the fact that a plurality of communication paths are selected by each device for constructing a network, a greater number of devices can communicate directly than when only one communication path is selected by a communication device.

Further, in the case where a communication path is selected but the judgment is that there is no device capable of communication using the selected communication path, a communication path is reselected for selecting the same communication path as other devices, thereby making it possible to find a communicable device.

Furthermore, in the case where a device group 1 and a device group 2 have selected different communication paths and therefore unable to communicate directly with each other, for example, the data received from the device group 1 is transferred to the device group 2 and vice versa, thereby making indirect communication possible between the device groups 1 and 2.

In addition, one or a plurality of communicable communication devices are grouped and a new dedicated communication path is assigned to the group. In this way, data can be multicast efficiently to the devices belonging to the particular group without interference from the devices not belonging to the group.

[18th Embodiment]

Figure 59:
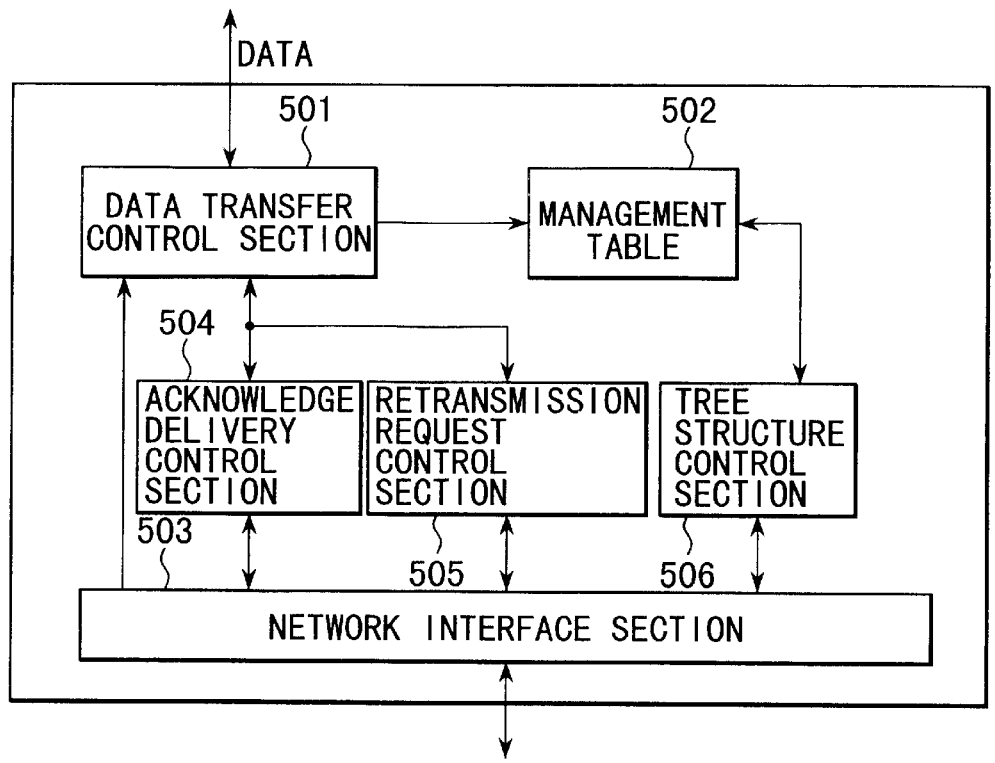
FIG. 59 is a diagram showing an example configuration of a broadcasting communication control unit according to an 18th embodiment of the invention.

FIG. 59 shows an example configuration of a broadcast communication control unit according to an 18th embodiment of the invention.

In FIG. 59, the broadcast communication control unit according to this embodiment includes a data transfer control section 501, a delivery acknowledge control section 504, a retransmission request control section 505, a tree structure control section 506, a network interface section 503 and a management table 502.

The data transfer control section 501, upon receipt of data from the user or a high-level layer application, generates a data packet by adding a sequence number and the like to the data, stores the data packet in a transmission buffer and sends it to the network interface section 503. Upon receipt of a data packet from the network interface section 503, on the other hand, the data transfer control section 501 checks the source address and the sequence number, and by referring to the management table 502, stores the packet in a receiving buffer as required. At the same time, the packet is transferred to devices managed by the present unit or an instruction is issued to the delivery acknowledge control section 504 to transmit an ACK packet or to the retransmission request control section 505 to transmit a NAK packet.

The delivery acknowledge control section 504, upon receipt of an instruction from the data transfer control section 501, refers to the management table 502 and checks to see how many data packets have been received by the present unit and transmits an ACK packet to a device (parent device) controlling the present unit.

The retransmission request control section 505, upon receipt of an instruction from the data transfer control section 501, transmits a packet for requesting the retransmission from the parent device.

The tree structure control section 506, in order to modify the tree structure in accordance with the number of devices under control or the condition of the communication path with the devices under control, transmits management information to other devices, or conversely, upon receipt of the management information, registers it in the management table 502.

The network interface section 503 transmits a packet to the network in response to a packet transmission request from the data transfer control section 501, the delivery acknowledge control section 504, the retransmission request control section 505 or the tree structure control section 506, or retrieves the required information from the packet received from the network and delivers it to the data transfer control section 501 or the delivery acknowledge control section 504.

Figure 60:
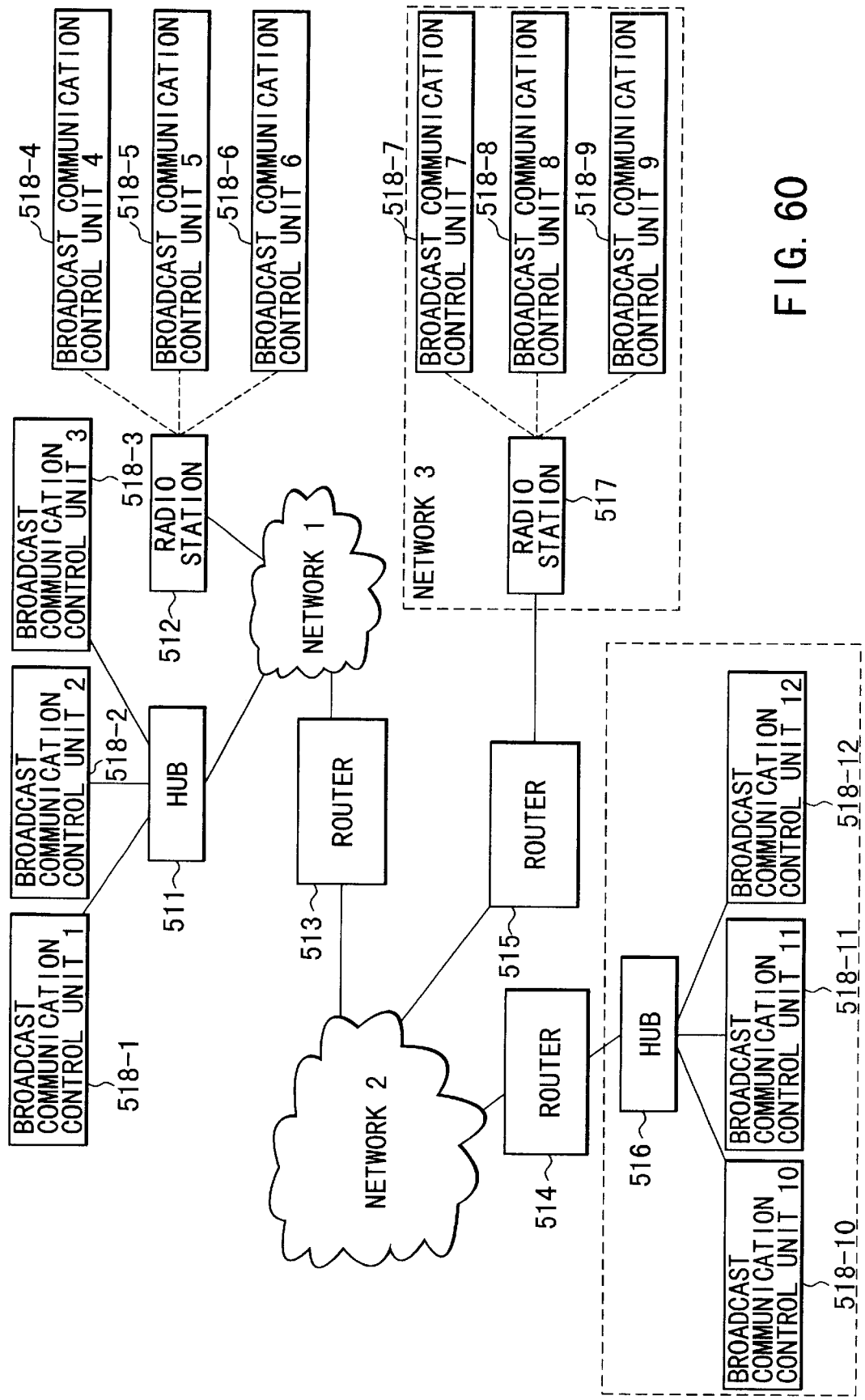
FIG. 60 is a diagram showing an example whole configuration of a communication system using a broadcasting communication control unit according to the 18th embodiment of the invention.

FIG. 60 shows an example configuration of a communication system as a whole using the broadcast communication control unit according to this embodiment.

In FIG. 60, the network 1 is connected through a hub to broadcast communication control units 1 to 3 (518-1 to 518-3) of wired type and also through a radio station to broadcast communication control units 4 to 6 (518-4 to 518-6) of radio type. The network 1 is also connected to a network 2. A network 3 is configured of the broadcast communication control unit of radio type, and is connected to the network 2. A network 4 is configured of units of wired type and connected to the network 2. The networks are interconnected through routers.

Figure 61:
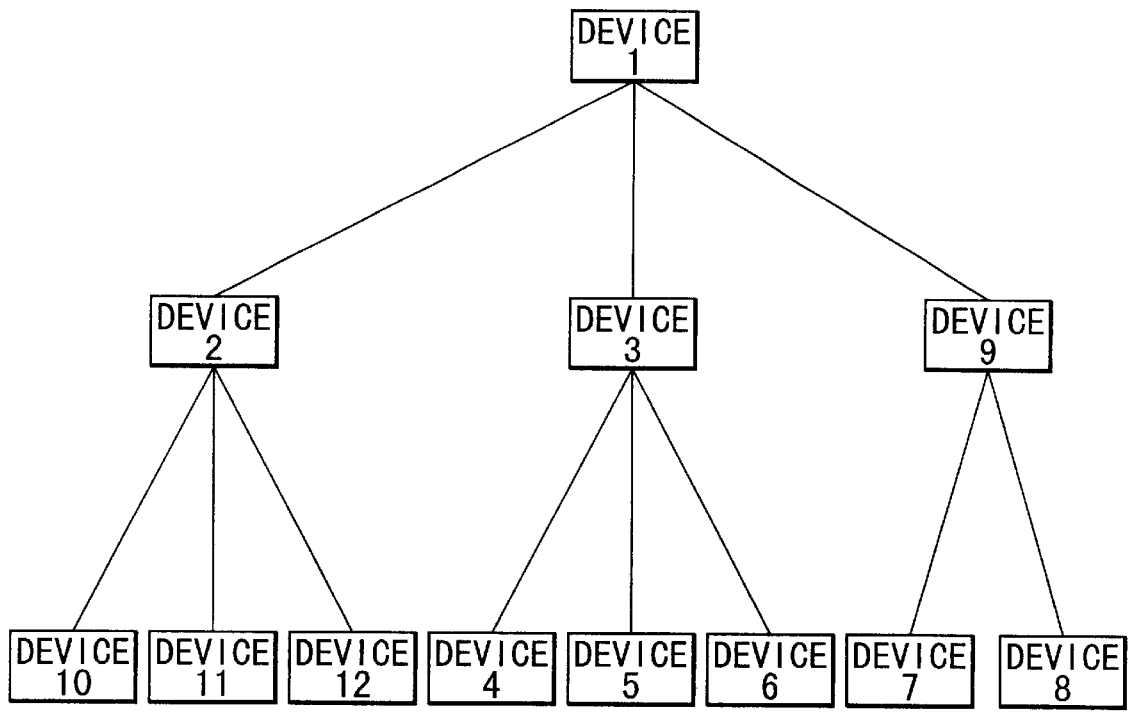
FIG. 61 is a diagram showing an example of a logical tree structure in the case where the broadcasting communication control unit according to the 18th embodiment constitutes a broadcasting group.

FIG. 61 shows an example of logical tree structure for a broadcast group configured by the broadcast communication control units according to the present embodiment.

A unit 1 constituting the root of the tree manages units 2, 3, 9. The units 2 manages units 10, 11, 12, the device 3 manages units 4, 5, 6, and the units 9 manages units 7, 8. A unit which manages a present unit is called the parent unit, and a device which is managed by the present unit is called a child device.

For example, the patent unit of the unit 3 is the unit 1, and the child units of the unit 3 are the units 4, 5, 6. The unit 1 is the root of the tree and therefore has no parent unit.

This tree is a logical one and is formed by negotiation between the devices. It never represents a configuration obtained by physical connection. Nevertheless, if devices connected physically to the same network are managed as a unit, the communication efficiency is improved due to the fact that the multicast function of the network can be utilized. The devices 4, 5, 6 managed by the device 3 are connected to the same network, for example. When Assuming that this network is a radio LAN compatible with Ethernet, the device 3 transfers a packet to the devices 4, 5, 6 using the multicast function of Ethernet. Thus the number of packets transmitted can be reduced as compared with a case where a packet is transferred independently to each device by unicasting.

FIG. 62 shows the management table 502 in FIG. 59. The ID of the parent unit managing the present unit is stored in the parent unit ID field, the IDs of the devices belonging to the same broadcast group are stored in the device ID field, the IDs of the devices managed by each device are stored in the child device ID field, and the continuous and maximum sequence number of the data received from each device is stored in the receiving sequence number field. FIG. 62 shows the management table 502 of the device 3 as an example. Other devices also have a similar table 502.

In the case where the present device manages other devices, the table 502 as shown in FIG. 63 is prepared in addition to that shown in FIG. 62.

FIG. 63 also shows a management table 503 included in the device 3 for storing the delivery acknowledge numbers received from the devices 4, 5, 6.

Now, explanation will be made about the relationship among the sequence number, the receiving sequence number, the delivery acknowledge number and the receiving-delivery acknowledge number.

A plurality of data packets, to which the sequence numbers are added, are transmitted sequentially to other devices. In this case, the sequence numbers 1, 2, 3, 4 . . . are attached in ascending order and added to a plurality of data packets for transmission. In the case where the device 6 in FIG. 61 transmits 300 data packets to the whole broadcast group, for example, the last sequence number is 300.

In the device 4 that has received the 300 data packets, the maximum sequence number (=300) is the receiving sequence number (=300) described above.

The device 4 sends an ACK packet back to the device 3 constituting a parent device with the receiving sequence number (=300) as a delivery acknowledge number (=300).

In the device 3, the delivery acknowledge number (=300) sent back from the device 4 as an ACK packet is compared with the receiving-delivery acknowledge number in store in FIG. 63. If the receiving-delivery acknowledge number in store is smaller than 300, the ACK packet is transmitted to the device 1 constituting a parent device after securing delivery acknowledgment from the devices 4, 5 (except for the device 6 which is the sender of a data packet) constituting child devices for which the receiving-delivery acknowledge number is updated to 300.

[Operation Upon Receipt of Data Transmission Request]

Figure 64:
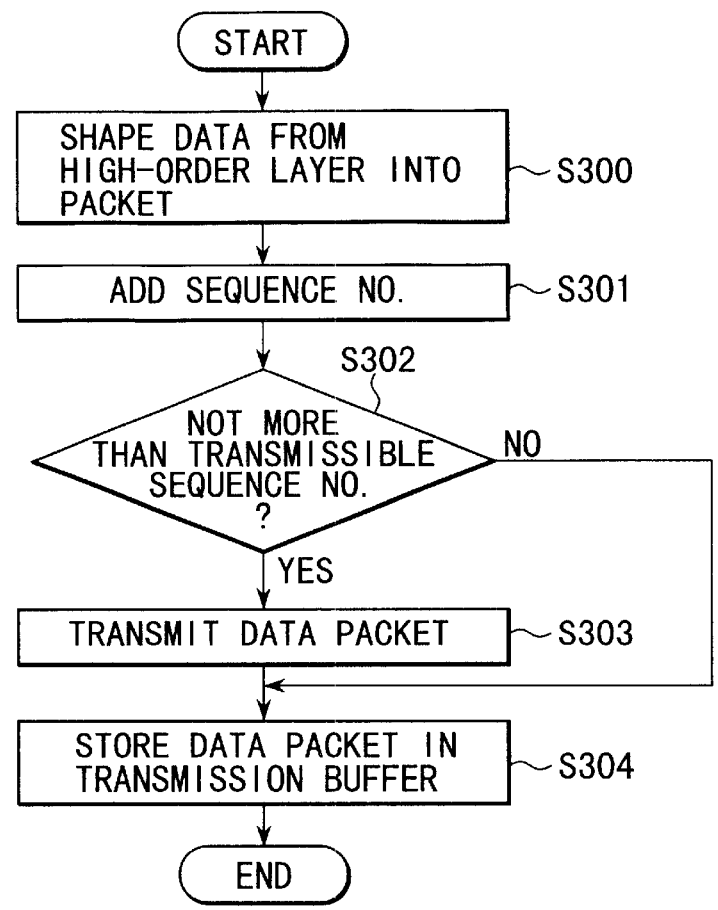
FIG. 64 is a flowchart showing the operation for receiving a data transmission request from a high-order layer.

FIG. 64 is a flowchart showing the operation performed when a data transmission request is received from a high-level layer, which flowchart includes steps S300 to S304.

In a case where the device 1 constituting the root of the tree attempts to send a data packet in accordance with the request from a high-level layer, the first step is to shape the received data into a packet.

Specifically, data are segmented in accordance with the maximum length of the packet determined for the network used, and a header is added to each data thus segmented thereby to constitute a packet.

Then, sequence numbers for identifying the packets uniquely are attached in ascending order and stored in the sequence number field of the header. The device 1 transmits the packets to the devices 2, 3, 9, respectively. The device 1 holds the data packet in the transmission buffer of the data transfer control section 501 until it receives the ACK packet from the devices 2, 3, 9.

In a case where a device other than the tree root attempts to send a data packet in response to a request from a high-level layer, the data is shaped into a packet and the sequence number is stored, after which the packet is transmitted to the device 1 constituting the root. The device 1 that has received the packet performs the same process as described above.

[Operation Performed upon Receipt of Data Packet]

Figure 65:
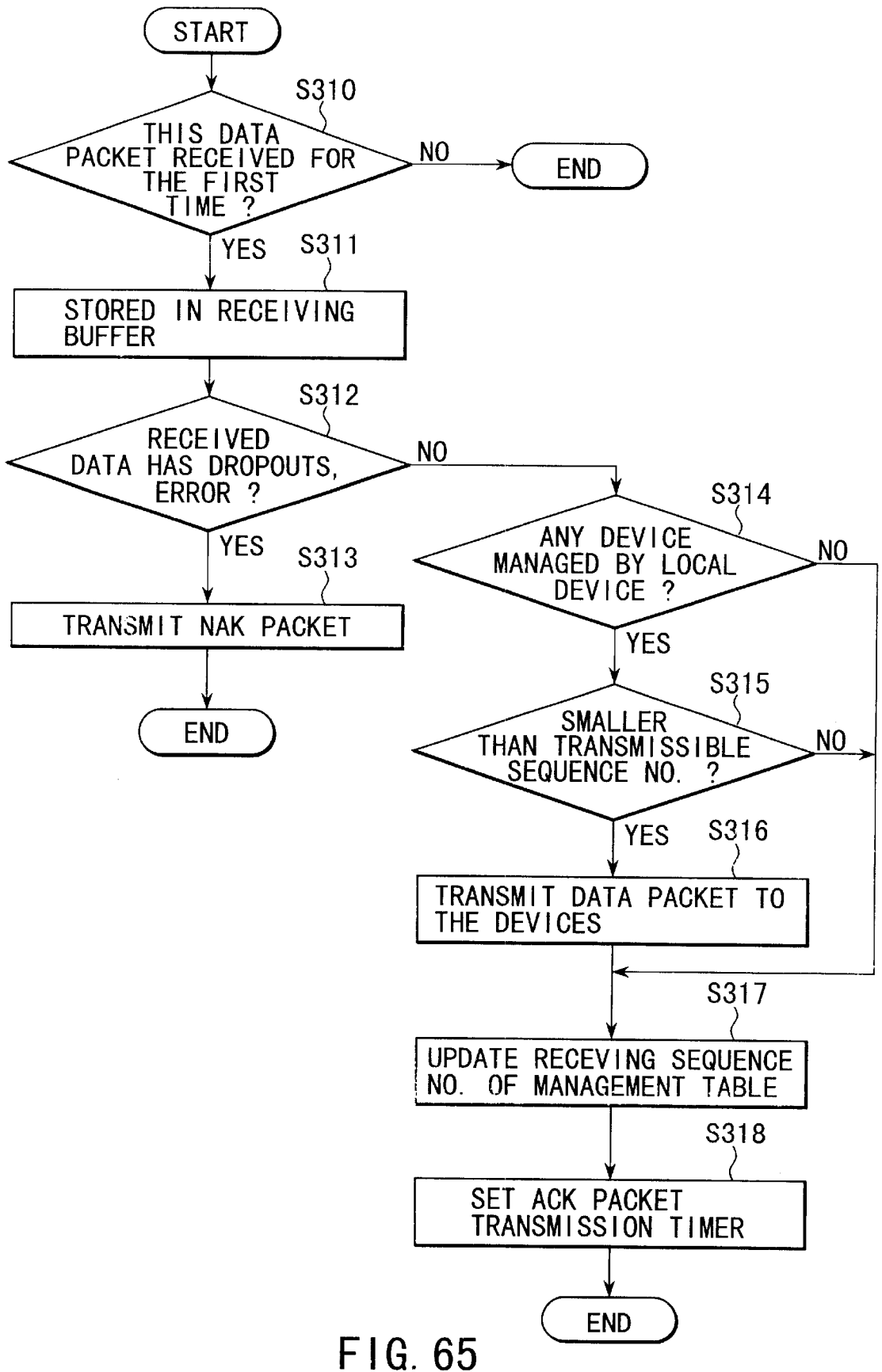
FIG. 65 is a flowchart showing the operation for receiving a data packet.

Explanation will be made about the process performed upon receipt of the data packet transmitted in the above-described manner. FIG. 65 is a flowchart showing the operation performed when the data packet is received, which flowchart includes steps S310 to S318.

The device that has received the data packet determines whether the received packet is the first one or not.

If the packet is not the first one, the packet is either contained in the receiving buffer or delivered to a high-level layer.

If the packet is the first received one, the packet is stored in the receiving buffer and checked for any data dropout or error.

If there is any dropout or error, a NAK packet is transmitted to the parent device for retransmission of data. The NAK packet has stored therein the sequence number(s) of the data requesting the retransmission.

In the absence of a dropout or error, the sequence number is determined to be a transmissible one, and the data packet is sent to the devices managed by the present device. The management table 2 is searched for a source entry, and the receiving sequence number thereof is updated. Then, the ACK packet transmission timer is set. The ACK packet has stored therein the continuous, maximum sequence number of the arriving data packets as a delivery acknowledge number.

[Operation Performed Upon Receipt of NAK Packet]

Figure 66:
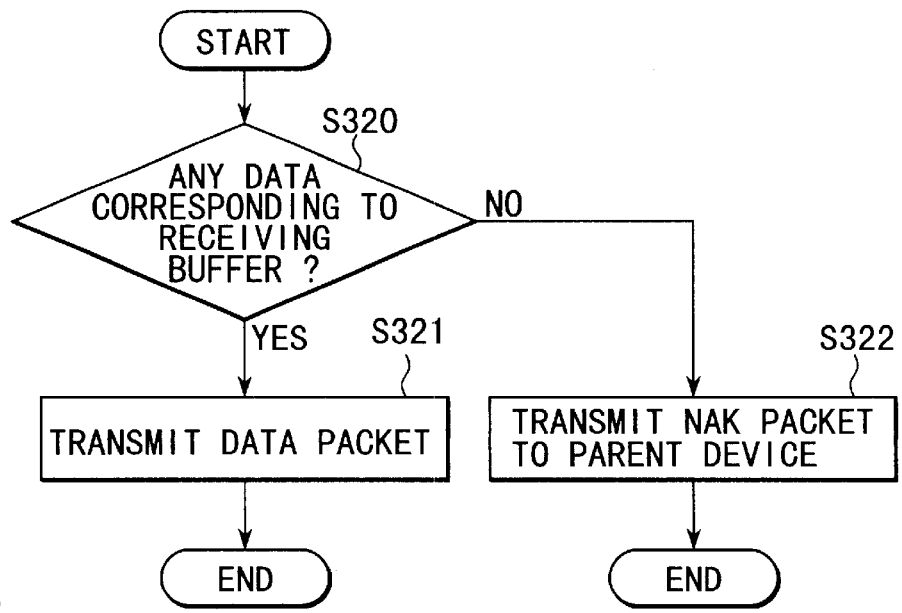
FIG. 66 is a flowchart showing the operation for receiving a NAK packet.

FIG. 66 is a flowchart showing the operation performed when a NAK packet is received, which flowchart includes steps S320 to S322.

The device that has received the NAK packet checks whether the data packet of which retransmission is requested is stored in the receiving buffer or not. If so stored, the data packet is transmitted to the NAK source device. Otherwise, the NAK packet is sent to the parent device requesting the retransmission of data.

[Operation Performed Upon Receipt of ACK Packet]

Figure 67:
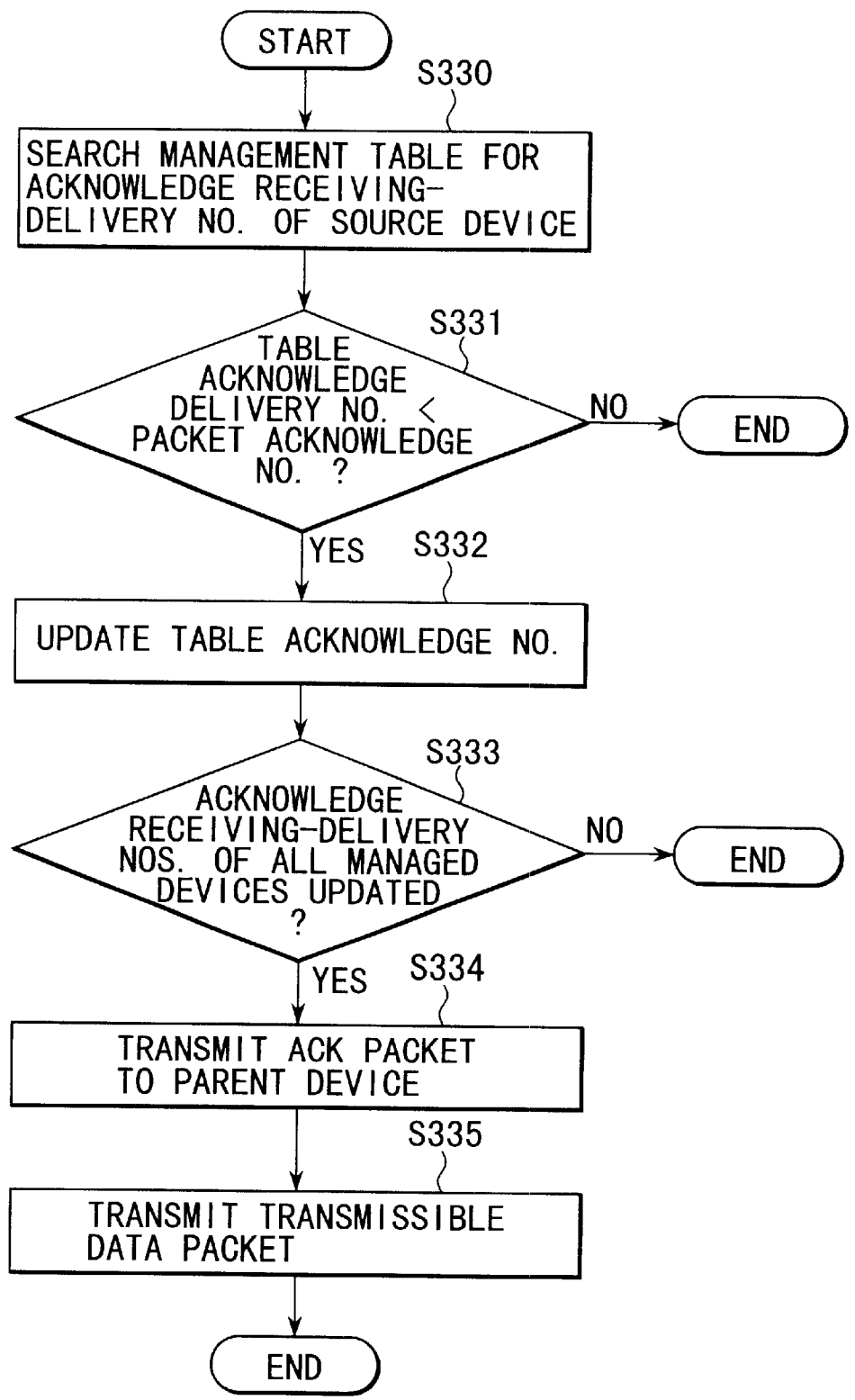
FIG. 67 is a flowchart showing the operation for receiving an ACK packet.

The operation performed when an ACK packet is received is shown in FIG. 67. This flowchart includes steps S330 to S335.

The device that has received the ACK packet searches the management table 502 for the entry of a source device, and compares the receiving-delivery acknowledge number of the table 502 with the delivery acknowledge number of the ACK packet. If the delivery acknowledge number of the packet is smaller than or equal to the receiving-delivery acknowledge number of the table 502, the process is terminated. Otherwise, the value on the management table 502 is updated. If the delivery acknowledge numbers of all the devices under control are updated; the ACK packet storing the smallest one of the delivery acknowledge numbers is sent to the parent device. A data packet of the transmissible sequence number or less, if any, is transmitted to the device managing it.

[Operation Performed When ACK Packet Transmission Packet Timer Times Out]

Figure 68:
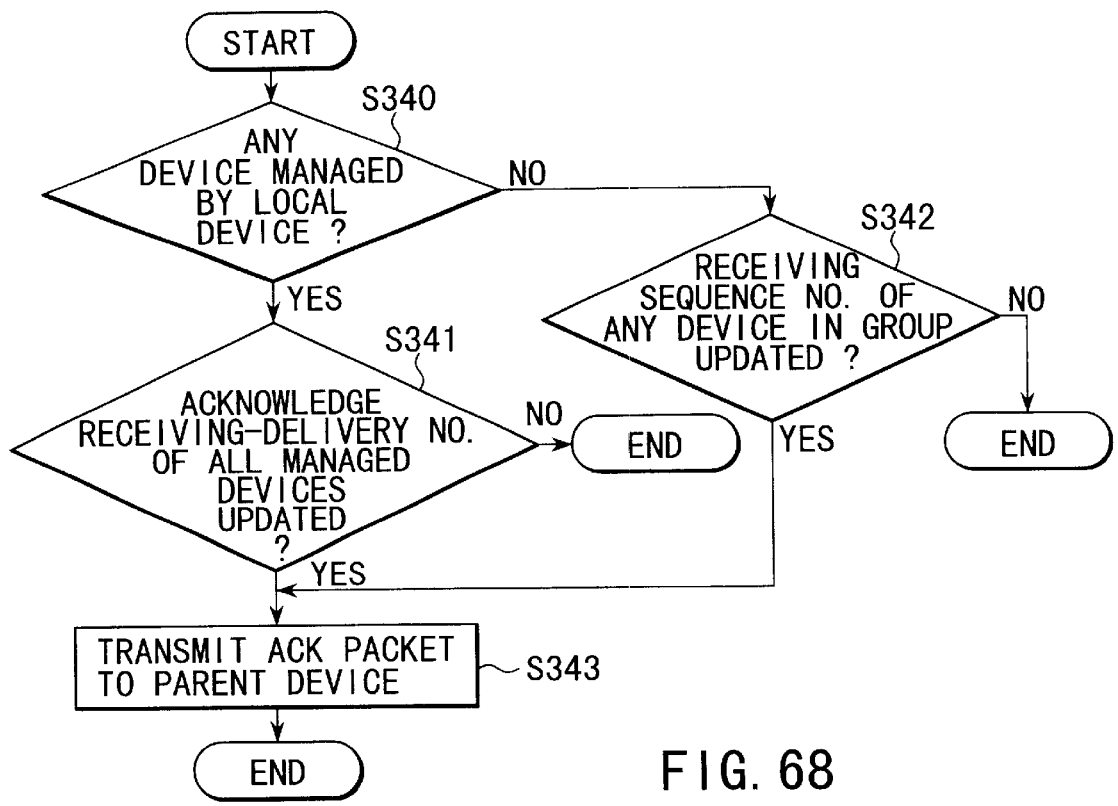
FIG. 68 is a flowchart showing the operation at the time when an ACK packet transmission timer times out.

FIG. 68 is a flowchart showing the operation performed when the ACK packet transmission timer times out, which flowchart includes steps S340 to S343. The process performed when the ACK packet transmission timer times out is different depending on whether there exists a device managed by the present device or not.

First, explanation will be made about the process performed in the case where there exists a device managed by the present device.

The management table 502 has stored therein the receiving-delivery acknowledge number indicating the extent to which each device managed has received data and the device from which it has received such data (FIG. 62). In the case where the receiving-delivery acknowledge number indicating the extent to which data are received from a given device has been updated for all the devices, the ACK packet is sent to the parent device. Otherwise, the process is terminated.

Now, explanation will be made about a case in which there is no device managed by the present device.

The management table 502 has stored therein the receiving sequence numbers indicating the extent to which the data are received by the present device and the devices from which they are received (FIG. 62). If at least one receiving sequence number has been updated, the ACK packet is sent to the parent device.

[Operation Performed When the Difference Between the Number of Devices Managed by Present Device and the Number of Devices Managed by Other Devices Exceeds a Predetermined Number]

Figure 69:
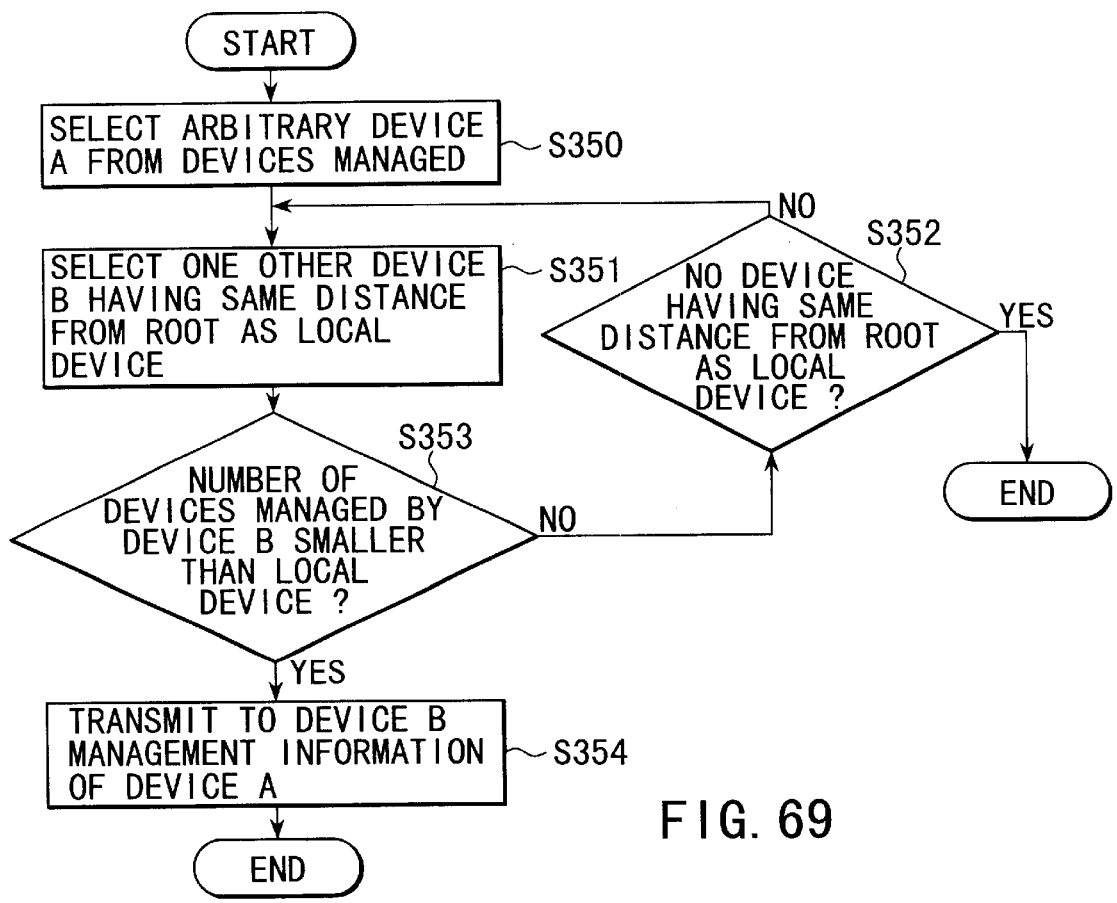
FIG. 69 is a flowchart showing the operation in the case where the difference between the number of devices managed by a present unit and the number of devices managed by a device having the same logical distance from the route as the present unit in a tree structure exceeds a predetermined number.

FIG. 69 is a flowchart showing the operation performed in the case where the difference between the number of devices managed by the present device and the number of the devices managed by a given device having the same logical distance as the present device from the root exceeds a predetermined number in a tree structure, which flowchart includes steps S350 to S354.

A given device (assumed to be the device A) is selected from the devices managed by the present device.

Then, among the devices having the same logical distance from the root as the present device, a device managing the devices smaller in number than the devices managed by the present device is found out, and the management information of the device A is transmitted to the particular device. The contents of the management information are a list of pairs of the device ID and the receiving the receiving-delivery acknowledge number as shown in FIG. 63.

As described above, in the case where the number of the devices managed by the present device exceeds a tolerable range in comparison with the number of devices managed by other devices, the management of some devices managed by the present device is left to other devices, thereby alleviating the load on the present device and reducing the chance of a bottleneck caused by the shortage of the processing capability. Apart from the comparison with the number of devices managed by the present device, the management of the devices managed by the present device can be transferred to other devices based on the upper limit determined of the processing capacity of the present device.

[Operation Performed Upon Receipt of Management Information Packet]

Figure 70:
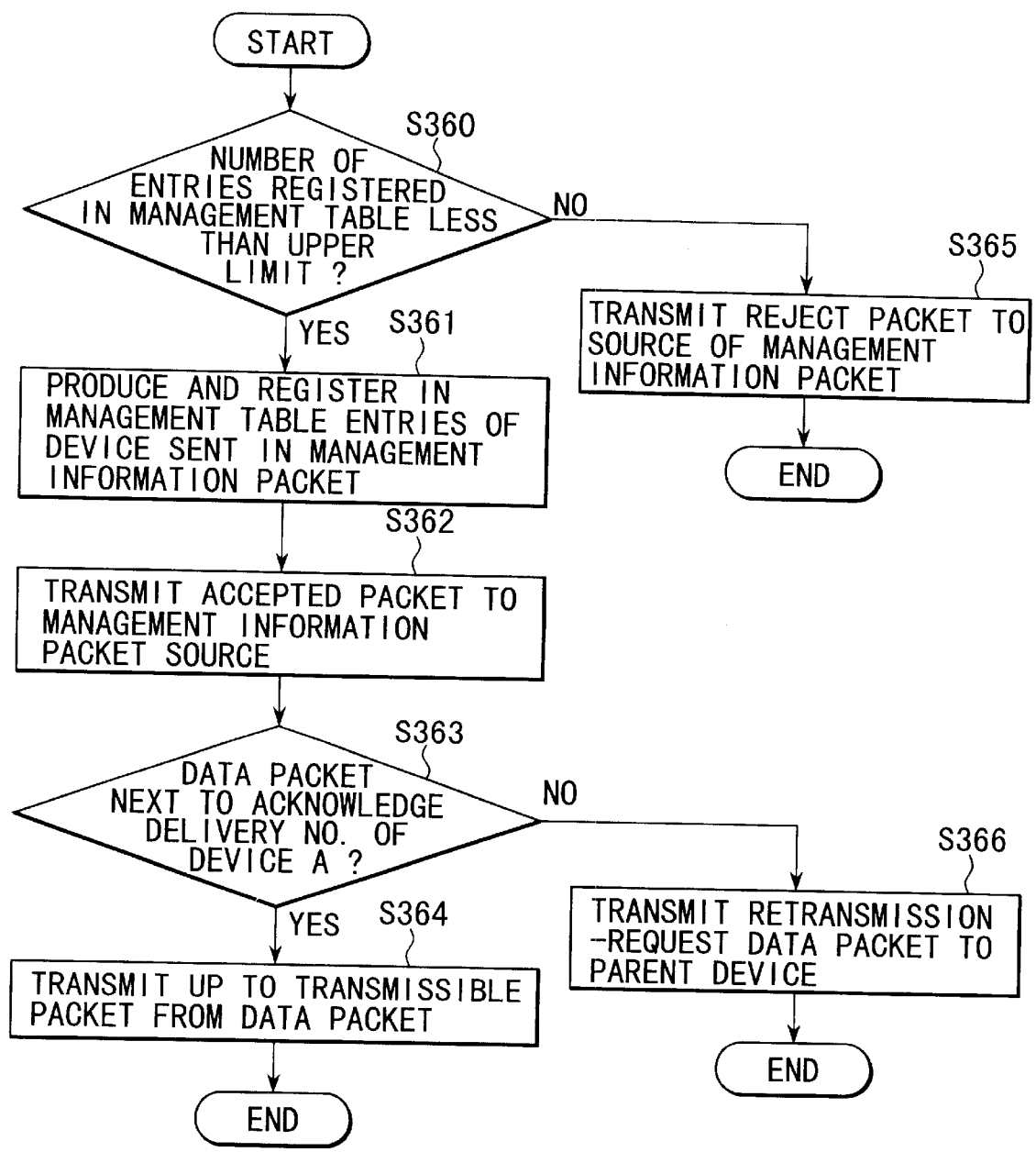
FIG. 70 is a flowchart showing the operation for receiving a management information packet.

FIG. 70 is a flowchart showing the operation performed when the management information packet is received, which flowchart includes steps S360 to S366.

The receipt of the management information packet is indicative of the fact that the management of a device is requested. The first step, therefore, is to check the ability of managing a device, and the judgement is the lack of such an ability, a rejection packet is transmitted to the source of the management information packet thereby ending the process. In the case of affirmative judgment, on the other hand, an entry is prepared in the management table 502 based on the device information carried by the management information packet and the information is registered. The packet thus accepted is transmitted to the source of the management information packet. The required data, if any, are sent to the newly-added device. Otherwise, the NAK packet for the particular data is sent to the parent device.

Figures 71, 72:
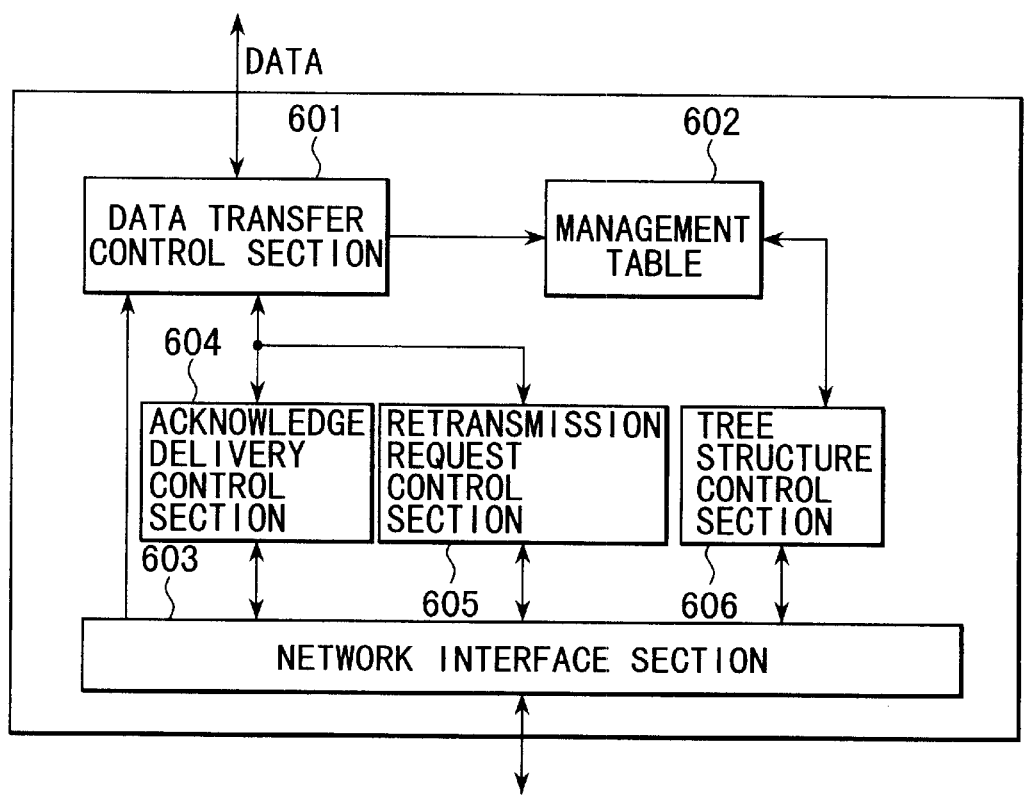
FIG. 71 is a diagram showing a format of the ACK packet.
FIG. 72 is a diagram showing an example configuration of a broadcasting communication control unit according to a 19th embodiment of the invention.

FIG. 71 shows a format of the ACK packet.

The ACK packet has, in addition the destination address and the source address, the minimum value of the delivery acknowledge number, by device, received from the devices managed by the present device.

[19th Embodiment]

FIG. 72 shows a configuration example of a broadcast communication control unit according to a 19th embodiment of the invention.

The operation of each component part is substantially similar to that of the 18th embodiment, except for the operation performed when the data packet is received. The reference numerals attached to the devices corresponding to those of the 18th embodiment are the 100-order version of the reference numerals attached to the devices of the 18th embodiment.

Figure 73:
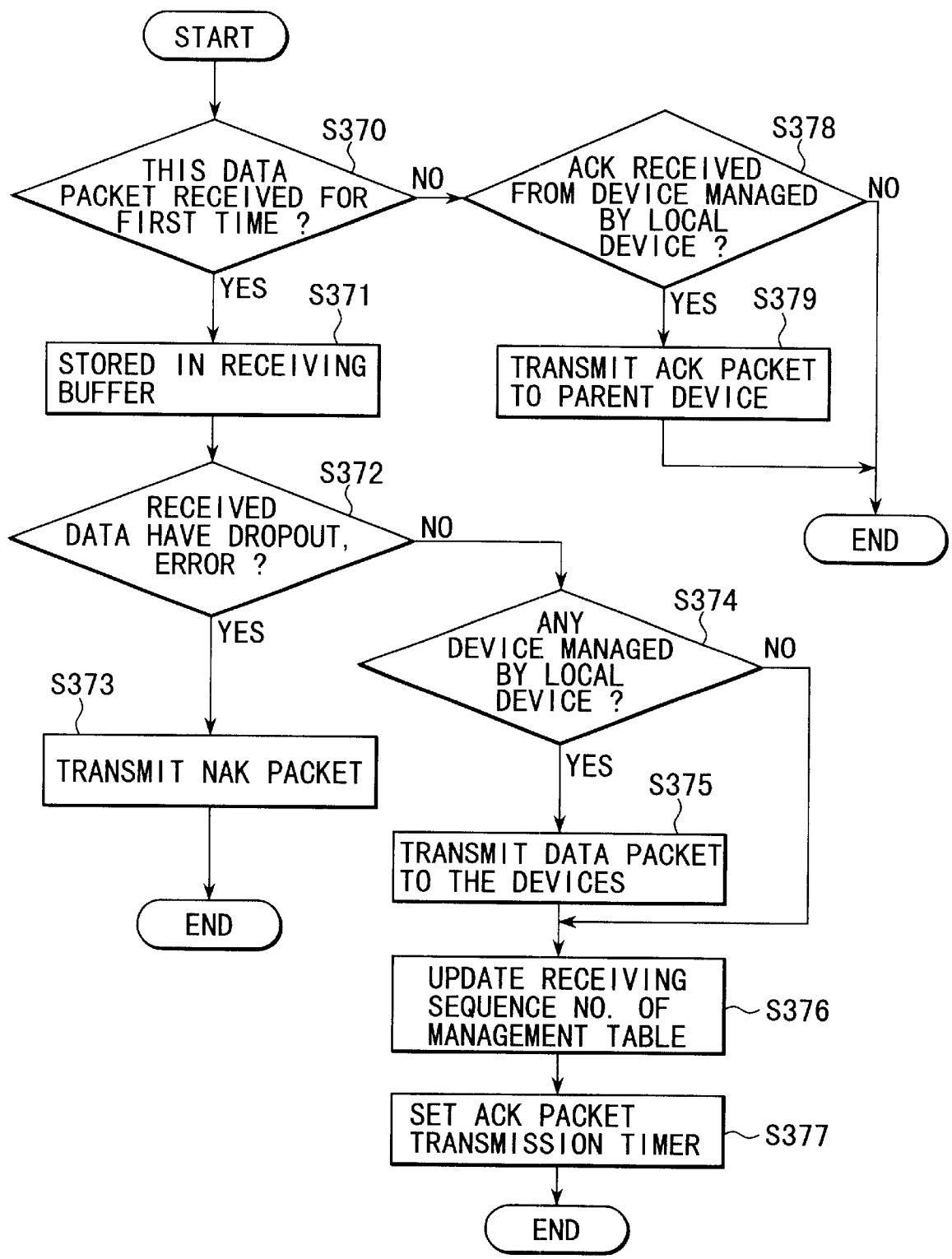
FIG. 73 is a flowchart showing the operation for receiving a data packet according to the 19th embodiment.

FIG. 73 is a flowchart showing the operation performed when the data packet is received in the 19th embodiment, which flowchart includes steps S370 to S379.

The device that has received a data packet determines whether or not the received packet is the first one.

If the packet is not the first received packet, it is already entered in the receiving buffer or delivered to a high-level layer. The management table 502 is checked to see whether the delivery is acknowledged for the retransmitted data packet by all the devices managed by the present device. If not, the ACK packet is transmitted to the parent device.

In the case where the packet is the first received one, on the other hand, the packet is stored in the receiving buffer and checked for any data dropout or error.

In the presence of a dropout or error, a NAK packet is transmitted to the parent device for retransmission of the data. The NAK packet has stored therein the sequence number of the data of which retransmission is requested.

If there is not any dropout or error, the sequence number is checked to make sure that it is a transmissible one, and the data packet is transmitted to the devices managed by the present device. The management table 502 is searched for an entry of the source and the receiving sequence number thereof is updated. The ACK packet transmission timer is set. The ACK packet has stored therein a continuous, maximum sequence number of the arriving data packets as a delivery acknowledgment number.

[20th Embodiment]

Figure 74:
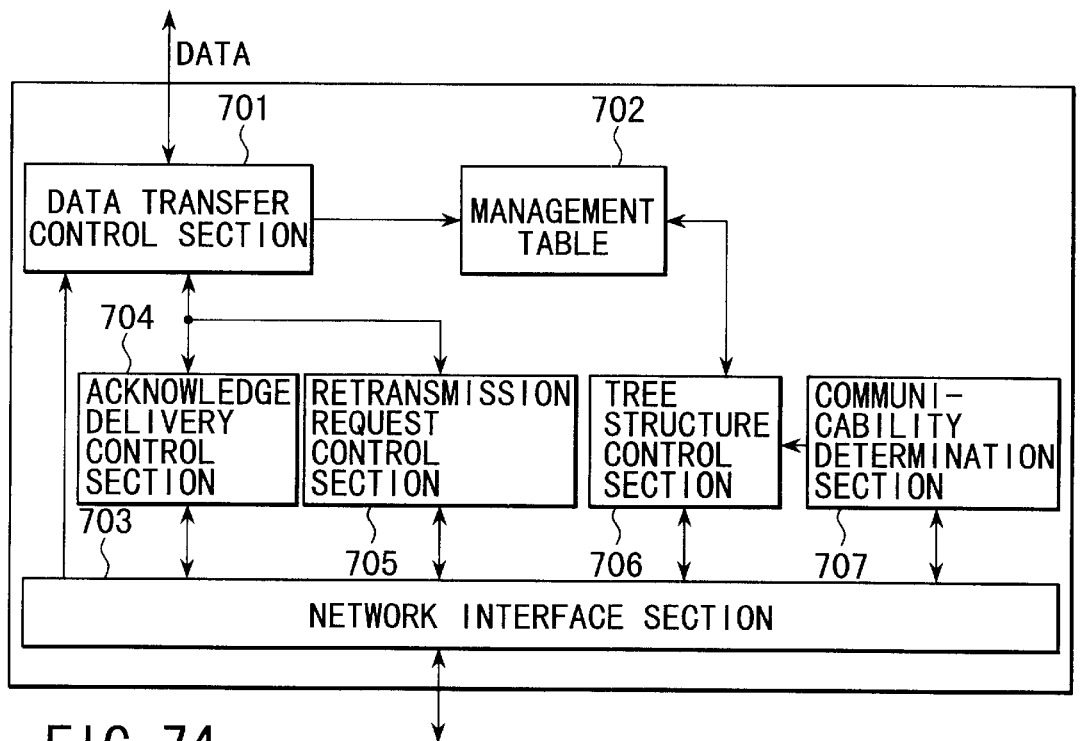
FIG. 74 is a diagram showing an example configuration of a broadcasting communication control unit according to a 20th embodiment of the invention.

FIG. 74 shows a configuration example of a broadcast communication control unit according to a 20th embodiment of the invention.

The operation of each section is similar to the corresponding one in the 18th embodiment, except that a communicability determination section 707 is newly included for monitoring the state of the communication path between the devices managed and the present device. In the case where judgment is that a further continued communication is impossible, the particular device is removed from the tree structure. The reference numerals of the devices corresponding to those in the 18th embodiment are the 200-order version of the reference numerals of the devices included in the 18th embodiment.

Now, the operation will be explained in detail.

A communicability determination section 707 monitors the state of the communication path between the present device and the devices managed thereby. In the case where the state of the communication path continues to be is bad for not less than a predetermined and a transmission error occurs at not less than a predetermined rate or the ACK packet fails to reach even after a predetermined number of repeated transmissions of the data packet, the communicability determination section 707 determines that the communication with the particular device has become impossible. The fact is notified to the tree structure control unit 706. The tree structure control unit 706, upon receipt of the notice that the communication with the device has become impossible, separates the particular device from the tree structure. At the same time, the ACK packet is transmitted to the parent device if the receiving-delivery acknowledge number from all the remaining devices managed by the present device are updated at that time point.

Figure 75:
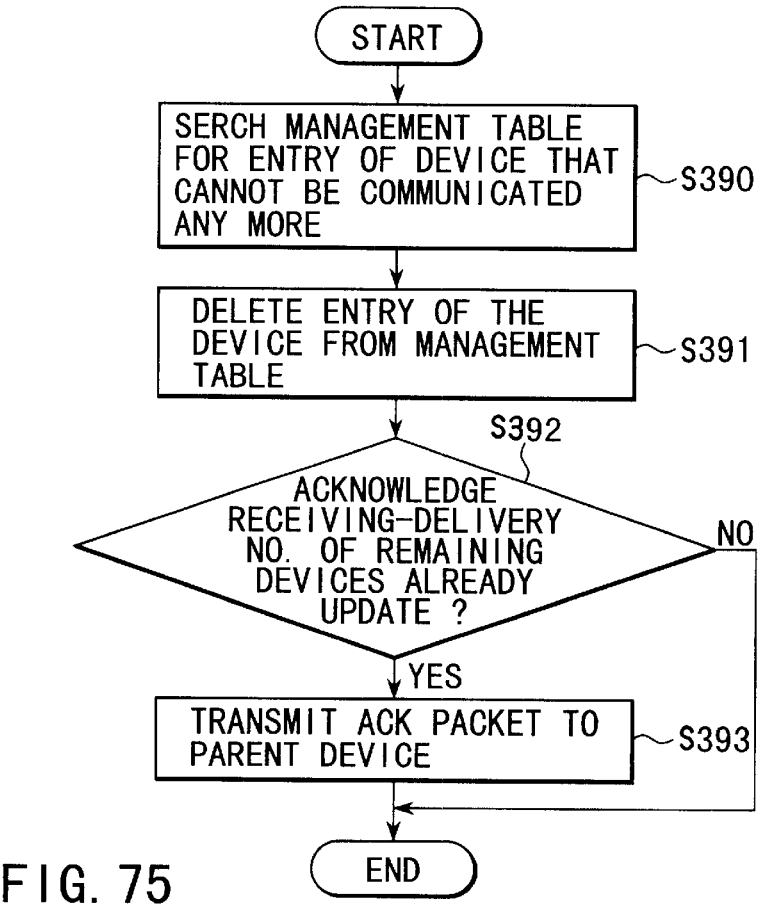
FIG. 75 is a flowchart showing the operation when judging that the communication with a device managed by the present unit is impossible.
Figure 76:
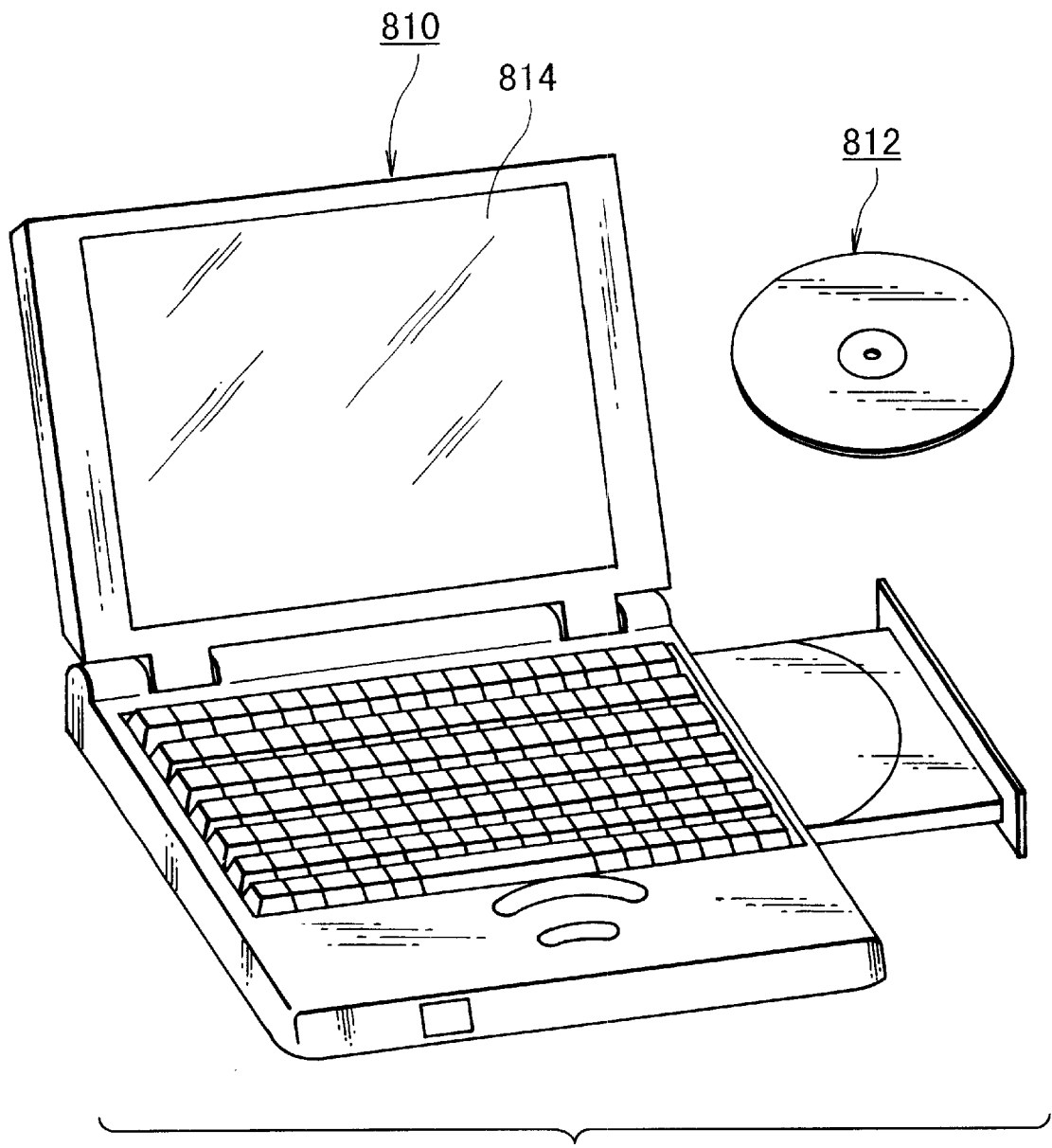
FIG. 76 is a perspective view of a portable information communication device.

FIG. 75 is a flowchart showing the operation performed when the communication with the devices managed by the present device has become impossible, and the flowchart including steps S390 to S393. The management table 502 is searched for an entry of the corresponding device, which entry is deleted. The receiving-delivery acknowledge numbers of the remaining devices are checked, and if the receiving-delivery acknowledgment number for a given device is entirely updated, the ACK packet is transmitted to the parent device. In the above-mentioned 18th to 20th embodiments, a program used for executing the contents of the flowcharts is stored in a FD or a CD-ROM 812. The contents of storage are installed in a portable information communication device 810 having the functions of a personal computer as show in FIG. 76. In this way, the above-mentioned contents can be realized.

In a communication device according to the 18th embodiment, the information delivery acknowledgment can be assured based on the management information, and no error of the information including data occurs. Thus, the information can be accurately transmitted from the parent device to the child devices.

In the communication device according to the 19th embodiment described above, in the case where the information delivery cannot be acknowledged based on the management information, the delivery is acknowledged after retransmitting the information. Therefore, the information can be accurately transmitted from the parent device to the child device.

In the communication device according to the 20th embodiment, in order to avoid the situation in which the change in the number of devices of each group causes the unbalanced load between the devices so that a given device provides a bottleneck, the tree structure can be modified flexibly and therefore the data transfer and delivery acknowledgment can be carried out efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of constructing a communication network, comprising the steps of:
   grouping communication devices belonging to a communication network into one or a plurality of communication groups;
   selecting at least one representative device in each communication group formed in said grouping step; and
   after said selecting step is effected, causing each communication device to communicate directly with other communication devices belonging to the same communication group and to communicate with each communication device belonging to a different group by first transmitting data to said at least one representative device of the same communication group and then causing said at least one said representative device of said same communication group to transfer part or the whole of the data to a representative device of said different group;
   wherein said each communication device transmits a device message containing the information on the transmitting communication device and a communicable communication device identified by the transmitting communication device, said each communication device identifies a communicable communication device from a received device message, and said each communication device performs said grouping step and said selecting step using the information on the received device message;
   wherein each communication device notifies the maximum number of the devices of a communication group to other communication devices and said grouping step is performed so that the number of the communication devices of a communication group to which the present communication device belongs does not exceed said maximum number of the devices.

2. A method of constructing a communication network, comprising the steps of:
   grouping communication devices belonging to a communication network into one or a plurality of communication groups;
   selecting at least one representative device in each communication group formed in said grouping step; and
   after said selecting step is effected, causing each communication device to communicate directly with other communication devices belonging to the same communication group and to communicate with each communication device belonging to a different group by first transmitting data to said at least one representative device of the same communication group and then causing said at least one said representative device of said same communication group to transfer part or the whole of the data to a representative device of said different group;
   wherein a terminal selected as said at least one representative device executes the steps of:
      receiving a terminal ID information transmitted by a different terminal for identifying said different terminal;
      receiving a communicable terminal information transmitted by said different terminal for indicating that said different terminal is a communicable terminal;
      storing the terminal ID information and communicable terminal information received from the same terminal related to each other as a communication environment information; and
      transmitting said stored communication environment information to a different terminal.

3. A method of constructing a communication network according to claim 2, wherein the terminals other than the terminal selected as said at least one representative terminal each executes the steps of:
   transmitting the present terminal ID information for identifying the present terminal to at least the terminal selected as said at least one representative terminal belonging to the same communication group as said present communication terminal; and
   transmitting the communicable terminal information of the present communication device indicating that said present communication device is a communicable terminal to at least the terminal selected as a representative terminal belonging to the same communication group as said present communication terminal.

4. A method of constructing a communication network, comprising the steps of:
   grouping communication devices belonging to a communication network into one or a plurality of communication groups;
   selecting at least one representative device in each communication group formed in said grouping step; and
   after said selecting step is effected, causing each communication device to communicate directly with other communication devices belonging to the same communication group and to communicate with each communication device belonging to a different group by first transmitting data to said at least one representative device of the same communication group and then causing said at least one said representative device of said same communication group to transfer part or the whole of the data to a representative device of said different group;
   wherein said each communication device executes the steps of:
      selecting one communication path from a plurality of communication paths;
      transmitting the information on the communication path selected by said present communication device;
      receiving the information on the communication path selected by a different communication device;
      storing the information on the communication path assigned by a different communication device; and
      comparing the stored information on the communication path selected by said different communication device with the information on the communication path selected by said present communication device, and upon judgment that there exists no communication device that has selected the same communication path as the one selected by said present communication device, reselecting a communication path other than the communication path selected by said present communication device from among said plurality of communication paths.

5. A method of constructing a communication network, comprising the steps of:

grouping communication devices belonging to a communication network into one or a plurality of communication groups;

selecting at least one representative device in each communication group formed in said grouping step; and after said selecting step is effected, causing each communication device to communicate directly with other communication devices belonging to the same communication group and to communicate with each communication device belonging to a different group by first transmitting data to said at least one representative device of the same communication group and then causing said at least one said representative device of said same communication group to transfer part or the whole of the data to a representative device of said different group;

wherein said each communication device executes the steps of:

selecting a plurality of communication paths from among a plurality of communication paths; and transmitting the information received from the selected communication paths, directly or after being processed appropriately, to a communication path different from the communication paths from which said information is received.

6. A method of constructing a communication network, comprising the steps of:

grouping communication devices belonging to a communication network into one or a plurality of communication groups;

selecting at least one representative device in each communication group formed in said grouping step; and after said selecting step is effected, causing each communication device to communicate directly with other communication devices belonging to the same communication group and to communicate with each communication device belonging to a different group by first transmitting data to said at least one representative device of the same communication group and then causing said at least one said representative device of said same communication group to transfer part or the whole of the data to a representative device of said different group;

wherein said each communication device executes the steps of:

generating the communication device ID information for identifying the present communication device and transmitting the communication device ID information thus generated;

identifying a communicable communication device based on the received communication device ID information of a different communication device;

setting at least one communication device as the same group among the communicable communication devices identified; and newly selecting the same communication path for the communication devices belonging to the same group thus set.

7. A method of constructing a communication network, comprising the steps of:

grouping communication devices belonging to a communication network into one or a plurality of communication groups;

selecting at least one representative device in each communication group formed in said grouping step; and after said selecting step is effected, causing each communication device to communicate directly with other communication devices belonging to the same communication group and to communicate with each communication device belonging to a different group by first transmitting data to said at least one representative device of the same communication group and then causing said at least one said representative device of said same communication group to transfer part or the whole of the data to a representative device of said different group;

wherein said each communication device executes the steps of:

storing the management information including at least IDs of child devices managed by said present communication device and the delivery acknowledgment information received from said child devices;

storing the ID of a parent device managing said present communication device;

transmitting and receiving information between all child devices stored in said management information storage step or between said all child devices and said parent device stored in said step of said parent device ID storage step;

comparing the delivery acknowledgment information indicating the receipt of said information transmitted from a child device in said step of transmitting and receiving information with said management information and acknowledging the delivery of said transmitted information; and transmitting the terminal ID information for identifying a local terminal at least to the terminal selected as the representative terminal of the same communication group as said local terminal; and transmitting the delivery acknowledge information to said parent device upon confirmation of said transmitted information in said delivery acknowledgment step.

8. A method of constructing a communication network according to claim 7, wherein said each communication device executes the step of:

retransmitting the transmitted information in a case where the delivery cannot be acknowledged or a retransmission request information indicating the failure to receive the information correctly is received in said delivery acknowledgment step;

wherein said step of transmitting and receiving information to and from said parent device includes the step of retransmitting said information from said parent device to all child devices stored in said management information storage step; and wherein said step of transmitting the delivery acknowledgment includes the step of transmitting the delivery acknowledgment information to said parent device when the delivery of said retransmitted information is acknowledged by all the child devices in said delivery acknowledgment step.

9. A method of constructing a communication network according to claim 7, further comprising the step of:

removing the management information on a predetermined number of child devices in the case where the number of the child devices stored in said management information storage step exceeds a reference number and transmitting the management information on the removed child devices to different communication devices;

wherein said management information storage step includes the step of storing the management information received from different communication devices.

10. A communication system comprising:

a grouping processing section for grouping communication devices belonging to a communication network into at least one communication group;

a selection processing section for selecting at least one representative device from each communication group grouped by said grouping processing section; and after selecting said at least one representative device in said selection processing section, said selection processing section causing each communication device to communicate directly with the communication devices belonging to the same communication group and to communicate with a communication device belonging to a different communication group by first transmitting data to the at least one representative device of said same communication group and said selection processing section causing said at least one representative device to transfer part or the whole of said data to the at least one representative device of said different communication group wherein a terminal selected as said at least one representative device includes:

a terminal ID information receiving section for receiving the terminal ID information transmitted from a different terminal for identifying said terminal;

a communicable terminal information receiving section for receiving the communicable terminal information transmitted from a different terminal for indicating that said different terminal is communicable;

a communication environment information storage section for relating said terminal ID information and said communicable terminal information received from the same terminal to each other and storing both of said information as communication environment information; and a communication environment information transmission section for transmitting said stored communication environment information to a different terminal.

11. A communication system according to claim 10, wherein the terminals other than the terminal selected as said representative device each include:

a terminal ID information transmission section for transmitting the terminal ID information for identifying a local terminal at least to the terminal selected as the representative terminal of the same communication group as said local terminal; and a communicable terminal information transmission section for transmitting the communicable terminal information of the local terminal indicating that the local terminal is communicable at least to the terminal selected as the representative terminal belonging to the same communication group as said local terminal.

12. A communication system comprising:

a grouping processing section for grouping communication devices belonging to a communication network into at least one communication group;

a selection processing section for selecting at least one representative device from each communication group grouped by said grouping processing section; and after selecting said at least one representative device in said selection processing section, said selection processing section causing each communication device to communicate directly with the communication devices belonging to the same communication group and to communicate with a communication device belonging to a different communication group by first transmitting data to the at least one representative device of said same communication group and said selection processing section causing said at least one representative device to transfer part or the whole of said data to the at least one representative device of said different communication group;

further comprising communication environment information transmission decision means for deciding whether or not the communication environment information stored in said communication environment information storage means is transmitted in accordance with predetermined conditions.

13. A communication system according to claim 12, wherein said communication environment information transmission means transmits the communication environment information on a plurality of terminals stored in said communication environment information storage means in one or a plurality of packets.

14. A communication system according to claim 10, further comprising means for receiving a communication environment information transmission request from a different terminal, wherein upon receipt of said communication environment information transmission request, said communication environment information transmission means transmits the communication environment information stored in said communication environment information storage means.

15. A communication system comprising:

a grouping processing section for grouping communication devices belonging to a communication network into at least one communication group;

a selection processing section for selecting at least one representative device from each communication group grouped by said grouping processing section; and after selecting said at least one representative device in said selection processing section, said selection processing section causing each communication device to communicate directly with the communication devices belonging to the same communication group and to communicate with a communication device belonging to a different communication group by first transmitting data to the at least one representative device of said same communication group and said selection processing section causing said at least one representative device to transfer part or the whole of said data to the at least one representative device of said different communication group;

further comprising means for detecting the updating of the communication environment information stored in said communication environment information storage means, wherein upon detection of the updating of the communication environment information, said communication environment information transmission means transmits the communication environment information stored in said communication environment information storage means.

16. A communication system comprising:

a grouping processing section for grouping communication devices belonging to a communication network into at least one communication group;

a selection processing section for selecting at least one representative device from each communication group grouped by said grouping processing section; and after selecting said at least one representative device in said selection processing section, said selection processing section causing each communication device to communicate directly with the communication devices belonging to the same communication group and to communicate with a communication device belonging to a different communication group by first transmitting data to the at least one representative device of said same communication group and said selection processing section causing said at least one representative device to transfer part or the whole of said data to the at least one representative device of said different communication group;

further comprising:
    means for receiving said communication environment information sent from a communication device arranged at a different terminal; and
    means for storing said received communication environment information.

17. A communication system comprising:

a grouping processing section for grouping communication devices belonging to a communication network into at least one communication group;

a selection processing section for selecting at least one representative device from each communication group grouped by said grouping processing section; and after selecting said at least one representative device in said selection processing section, said selection processing section causing each communication device to communicate directly with the communication devices belonging to the same communication group and to communicate with a communication device belonging to a different communication group by first transmitting data to the at least one representative device of said same communication group and said selection processing section causing said at least one representative device to transfer part or the whole of said data to the at least one representative device of said different communication group;

wherein said communication device includes:
    means for selecting a communication path used for communication from among a plurality of communication paths;
    communication path selection transmission means for transmitting the information to the communication path selected by said communication path selection means;
    communication path selection receiving means for receiving the information from the communication path selected by said communication path selection means and detecting the occupancy rate of a different communication device in the non-selected communication paths; and
    means for storing the information on the occupancy rate of the communication path detected by said communication path selection receiving means.

18. A communication system according to claim 17, wherein said communication path selection means includes the function of selecting a plurality of communication paths used for communication.

19. A communication system according to claim 17, wherein said communication path selection means selects a communication path used for communication from a plurality of communication paths usable by said present communication device, detects the presence or absence of a communication device that has selected the same communication path as said selected communication path based on the information stored in said communication path storage means, and reselects a communication path in the absence of a communication device.

20. A communication system according to claim 18, further comprising relay means for delivering, directly or after being appropriately processed, the information received by said communication path selection receiving means to said communication path selection transmission means so that the information received by said communication path selection receiving means is transmitted from a different communication path than the communication path that has received said information among a plurality of the communication paths selected by said communication path selection means.

21. A communication system according to claim 17, further comprising:
    means for generating the communication device ID information for identifying a present communication device and transmitting the generated communication device ID information through said communication path selection transmission means;
    means for identifying a communicable communication device based on the communication device ID information of different communication devices received from said communication path information receiving means;
    means for setting one or a plurality of communication devices in the same group of the communicable communication devices identified by said communicable device identification means; and
    means for selecting the same communication path anew for the communication devices in the same group set by said group setting means.

22. A communication system comprising:

a grouping processing section for grouping communication devices belonging to a communication network into at least one communication group;

a selection processing section for selecting at least one representative device from each communication group grouped by said grouping processing section; and after selecting said at least one representative device in said selection processing section, said selection processing section causing each communication device to communicate directly with the communication devices belonging to the same communication group and to communicate with a communication device belonging to a different communication group by first transmitting data to the at least one representative device of said same communication group and said selection processing section causing said at least one representative device to transfer part or the whole of said data to the at least one representative device of said different communication group;

comprising a first communication device, a second communication device and a third communication device coexisting with each other, wherein said first communication device transmits and receives the information using a single communication path for communication, wherein said second communication device includes communication path selection means capable of selecting a communication path for communication from among a plurality of communication paths, communication path selection transmission means for transmitting the information to the communication path selected by said communication path selection means, communication path selection receiving means for receiving the information from the communication path selected by said communication path selection means and detecting the occupancy rate of a communication device in the non-selected communication path, and communication path storage means for storing the information on the occupancy rate of the communication path detected by said communication path selection receiving means, and wherein said third communication device includes communication path selection means capable of selecting a plurality of communication paths for communication from among a plurality of communication paths, communication path selection transmission means for transmitting the information to the communication paths selected by said communication path selection means, communication path selection receiving means for receiving the information from the communication paths selected by said communication path selection means and detecting the occupancy rate of different communication devices in the non-selected communication paths, communication path storage means for storing the information on the occupancy rate of the communication paths detected by said communication path selection receiving means, and relay means for delivering, directly or after being processed appropriately, the information received by said communication path selection receiving means to said communication path selection transmission means so that the information received by said communication path selection receiving means is transmitted from different communication paths than the communication paths that have received said information among a plurality of the communication paths selected by said communication path selection means.

23. A communication system comprising:
a grouping processing section for grouping communication devices belonging to a communication network into at least one communication group;
a selection processing section for selecting at least one representative device from each communication group grouped by said grouping processing section; and
after selecting said at least one representative device in said selection processing section, said selection processing section causing each communication device to communicate directly with the communication devices belonging to the same communication group and to communicate with a communication device belonging to a different communication group by first transmitting data to the at least one representative device of said same communication group and said selection processing section causing said at least one representative device to transfer part or the whole of said data to the at least one representative device of said different communication group;
wherein said communication device includes:
a function for storing the management information including at least the identifier (ID) of a child device managed by said present communication device and the delivery acknowledgment information received from said child device;
a function for storing the ID of a parent device managing said present communication device;
an information communication section for transmitting and receiving the information with selected one of all the child devices stored by said management information storage function and said parent device stored by said ID storage function;
a delivery acknowledgment section for comparing the delivery acknowledgment information indicating the receipt of said information received from the child device that has transmitted the information through said information communication section with said management information and acknowledging the delivery of said transmitted information; and
delivery acknowledgment transmission section for transmitting the delivery acknowledgment information to said parent device when the information transmitted is acknowledged by said delivery acknowledgment section.

24. A communication system according to claim 23, wherein said communication device includes:
an information retransmission section for retransmitting said transmitted information in selected one of the cases where said delivery acknowledgment section fails to acknowledge the delivery and where the retransmission request information indicating the failure of correct receipt of the information is received;
wherein said information communication section retransmits said information from said parent device to all the child devices stored in said management information storage section; and
wherein said delivery acknowledgment transmission section transmits said delivery acknowledgment information to said parent device when said delivery acknowledgment section acknowledges the delivery of said retransmitted information from all the child devices.

25. A communication system according to claim 23, further comprising a management information transmission section for transmitting to other devices the management information excluding the management information on a predetermined number of child devices in the case where the number of the child devices stored by said management information storage function exceeds a standard,
wherein said management information storage function stores the management information received from different devices.

26. A computer-readable recording medium for storing a program executed for constructing a communication network, said program being used for executing the steps of:
forming grouping communication devices belonging to a communication network into at least one communication group;
selecting at least one representative device in each communication group thus grouped; and
after said selection step, causing each of the communication devices to communicate directly with the communication devices belonging to a same group and to communicate with the communication devices belonging to a different group by first transmitting data to the at least one representative device of said same group and then causing said representative device to transfer a part or the whole of the data to the at least one representative device of the different group;
wherein said each of the communication devices executes the steps of:
receiving the terminal ID information transmitted from a different terminal for identifying said different terminal;
receiving the communicable terminal information transmitted from a different terminal for indicating that said different terminal is a communicable terminal;

relating said terminal ID information and said communicable terminal information received from the same terminal to each other and storing both of said information; and operating said computer so that said stored communication environment information is transmitted to a different terminal.

27. A computer-readable recording medium for storing a program executed for constructing a communication network, said program being used for executing the steps of:

forming grouping communication devices belonging to a communication network into at least one communication group;

selecting at least one representative device in each communication group thus grouped; and after said selection step, causing each of the communication devices to communicate directly with the communication devices belonging to a same group and to communicate with the communication devices belonging to a different group by first transmitting data to the at least one representative device of said same group and then causing said representative device to transfer a part or the whole of the data to the at least one representative device of the different group;

wherein said each of the communication devices executes the steps of:

selecting one of a plurality of communication paths;

transmitting the information on the communication path selected by said present communication device;

receiving the information on the communication path selected by a different communication device;

storing the information on the communication path assigned by a different communication device; and comparing the information on the communication path selected by a different communication device and stored in said communication path storage step with the information on the communication path selected by the present communication device and upon judging that no communication device has selected the same communication path as the present communication device, reselecting a communication path other than the one selected by the present communication device from among a plurality of communication paths.

28. A computer-readable recording medium for storing a program executed for constructing a communication network, said program being used for executing the steps of:

forming grouping communication devices belonging to a communication network into at least one communication group;

selecting at least one representative device in each communication group thus grouped; and after said selection step, causing each of the communication devices to communicate directly with the communication devices belonging to a same group and to communicate with the communication devices belonging to a different group by first transmitting data to the at least one representative device of said same group and then causing said representative device to transfer a part or the whole of the data to the at least one representative device of the different group;

wherein said each of the communication devices executes the steps of:

storing the management information including at least the IDs of child devices stored by said present communication device and the delivery acknowledgment information received from said child devices;

storing the ID of a parent device managing said present communication device;

transmitting and receiving the information to and from selected one of all the child devices stored in said management information storage step and said parent device stored in said parent device ID storage step;

comparing the delivery acknowledgment information indicating the receipt of the information from a child device that has transmitted said information in said transmission/receiving step with the management information and acknowledging the delivery of said transmitted information; and transmitting the delivery acknowledgment information to said parent device when said transmitted information is acknowledged in said delivery acknowledgment step.

29. A computer-readable recording medium according to claim 28, wherein said communication device executes the step of:

retransmitting the transmitted information in selected one of the cases where the delivery cannot be acknowledged and where the retransmission request information is received indicating the failure of correct receipt of the information in said delivery acknowledgment step;

wherein said step of transmitting and receiving the information to and from said parent device includes the step of retransmitting said information from said parent device to all the child devices stored in said management information storage step; and wherein said delivery acknowledgment transmission step includes the step of transmitting the delivery acknowledgment information to said parent device in the case where the transmission of the information is acknowledged by all the child devices in said delivery acknowledgment step.

30. A computer-readable recording medium according to claim 28, wherein the management information excluding the management information on a predetermined number of child devices is transmitted to a different device in the case where the number of child devices stored in said management information storage step exceeds a standard; and wherein said management information storage step includes the step of storing the management information received from a different device.

* * * * *